US012769946B2

(12) United States Patent
Williams et al.

(10) Patent No.: US 12,769,946 B2
(45) Date of Patent: Oct. 20, 2026

(54) GENERATING AN UNAMBIGUOUS INTERPRETATION OF INGESTED CONTENT TO PRODUCE KNOWLEDGE

(71) Applicant: entigenlogic LLC, Schaumburg, IL (US)

(72) Inventors: Frank John Williams, Rossmoor, CA (US); Gary W. Grube, Barrington Hills, IL (US)

(73) Assignee: Entigenlogic LLC, Schaumburg, IL (US)

( * ) Notice: Subject to any disclaimer, the term of this patent is extended or adjusted under 35 U.S.C. 154(b) by 201 days.

(21) Appl. No.: 18/785,001

(22) Filed: Jul. 26, 2024

(65) Prior Publication Data

US 2024/0386206 A1 Nov. 21, 2024

Related U.S. Application Data

(63) Continuation of application No. 16/537,096, filed on Aug. 9, 2019, now Pat. No. 12,050,869.

(60) Provisional application No. 62/720,807, filed on Aug. 21, 2018.

(51) Int. Cl.

| | |
|---|---|
| ***G06F 40/284*** | (2020.01) |
| ***G06F 16/903*** | (2019.01) |
| ***G06F 16/906*** | (2019.01) |
| ***G06F 40/205*** | (2020.01) |
| ***G06N 5/04*** | (2023.01) |

(52) U.S. Cl.
CPC ...... *G06F 40/284* (2020.01); *G06F 16/90344* (2019.01); *G06F 16/906* (2019.01); *G06F 40/205* (2020.01); *G06N 5/04* (2013.01)

(58) Field of Classification Search
CPC ................. G06F 40/284; G06F 16/906; G06F 16/90344; G06F 40/205; G06N 5/04
See application file for complete search history.

(56) References Cited

U.S. PATENT DOCUMENTS

| | | | | |
|---|---|---|---|---|
| 6,175,834 | B1 | 1/2001 | Cai | |
| 8,600,922 | B2 | 12/2013 | Adriaansen | |
| 9,588,963 | B2 | 3/2017 | Williams | |
| 10,282,389 | B2 * | 5/2019 | Liang | G06F 40/295 |
| 10,515,314 | B2 | 12/2019 | Klebanov | |

(Continued)

OTHER PUBLICATIONS

Chakravarthy, Anil S., "Sense Disambiguation using Semantic Relations and Adjacency Information", 1995, 33rd Annual Meeting of the Association for Computational Linguistics, pp. 293-295. (Year: 1995).

(Continued)

*Primary Examiner* — James Boggs
(74) *Attorney, Agent, or Firm* — Gary W. Grube

(57) ABSTRACT

A method includes identifying identigens for each word of a phrase, where the identigens of a first word of the phrase includes one or more different meanings of the first word. The method further includes identifying two adjacent words of the phrase that are lacking an identigen pairing rule and determining whether the identigen pairing rule can be inferred for the two adjacent words based on known identigen pairings of other words of the trusted phrase. When the identigen pairing rule can be inferred for the two adjacent words, the method further includes adding to a knowledge database the identigen pairing rule of the two adjacent words.

18 Claims, 54 Drawing Sheets

(56) References Cited

U.S. PATENT DOCUMENTS

| | | | | |
|---|---|---|---|---|
| 10,984,318 | B2 | 4/2021 | Ock | |
| 2003/0097251 | A1 | 5/2003 | Yamada | |
| 2007/0136251 | A1 | 6/2007 | Colledge | |
| 2008/0208569 | A1 | 8/2008 | Simpson | |
| 2016/0147979 | A1 | 5/2016 | Kato | |
| 2018/0081871 | A1* | 3/2018 | Williams | G06F 16/31 |
| 2018/0329887 | A1 | 11/2018 | Bull | |

OTHER PUBLICATIONS

Justeson, J. S. and S. M. Katz, "Word Sense Disambiguation using an Untagged Corpus", 1992, IBM Technical Disclosure Bulletin, vol. 35, No. 6, pp. 220-223. (Year: 1992).
Karov, Yael and Shimon Edelman, "Learning Similarity-based Word Sense Disambiguation from Sparse Data", 1996, Fourth Workshop on Very Large Corpora, Association for Computational Linguistics, pp. 42-55. (Year: 1996).
Montoyo, Andrés, Manuel Palomar, German Rigau and A. Suarez, "Combining Knowledge- and Corpus-based Word-Sense-Disambiguation Methods", 2005, Journal of Artificial Intelligence Research 23, pp. 299-330. (Year: 2005).
Pedersen, Ted, "A Decision Tree of Bigrams is an Accurate Predictor of Word Sense", 2001, Second Meeting of the North American Chapter of the Association for Computational Linguistics 2001. (Year: 2001).
Pölitz, Christian, Thomas bartz, Katharina Morik, and Angelika Storrer, "Investigation of Word Senses over Time Using Linguistic Corpora", 2015, International conference on Text, Speech, and Dialogue 2015 (TSD 2015), Lecture Notes in Artificial Intelligence (LNAI) vol. 9302, pp. 191-198. (Year: 2015).

* cited by examiner

FIG. 7C

| synonym words table 570 | | | |
|---|---|---|---|
| textual words 572 | identigen 518 | | entigens 520 |
| | meaning ID 538 | instance ID 540 | |
| car | 50 | 001 | e1000 |
| automobile | | 002 | |
| auto | | 003 | |
| bil (Swedish) | | 004 | |
| carro (Spanish) | | 005 | |
| bil (Danish) | | 006 | |

FIG. 7D

| polysemous words table 576 | | | |
|---|---|---|---|
| textual words 572 | identigen 518 | | entigens 520 |
| | meaning ID 538 | instance ID 540 | |
| duck (bird) | 116937 | 001 | e2000 |
| duck (fabric) | 116938 | 001 | e2001 |
| duck (to submerge) | 112195 | 056 | e2002 |
| duck (to elude) | 010654 | 051 | e2003 |

| words table 580 | | | | |
|---|---|---|---|---|
| textual words 572 | identigen (IDN) 518 | | | entigens (ENI) 520 |
| | meaning ID 538 | instance ID 540 | type ID 542 | |
| pilot (flyer) | 150 | 001 | itenym (item) | e717 |
| pilot (to fly) | 291 | 001 | actenym (action) | e4320 |
| Tom (person) | 457 | 001 | itenym (item) | e61 |
| Tom (male animal) | 648 | 001 | itenym (item) | e930 |
| tall (attribute - height) | 823 | 001 | attrenym (attribute) | e90 |
| tall (attribute - unlikely) | 399 | 001 | attrenym (attribute) | e729 |

apply rules to identigens of word strings to validate

| | | | | |
|---|---|---|---|---|
| pilot (to fly) | Tom (male an) | IDN 291.001 | IDN 648.001 | X |
| pilot (flyer) | Tom (male an) | IDN 150.001 | IDN 648.001 | X |
| pilot (to fly) | Tom (person) | IDN 291.001 | IDN 457.001 | X |
| pilot (flyer) | Tom (person) | IDN 150.001 | IDN 457.001 | ✓ |

| | | | | |
|---|---|---|---|---|
| tall (attribute - height) | Tom (male an) | IDN 823.001 | IDN 648.001 | ✓ |
| tall (attribute - unlikely) | Tom (male an) | IDN 399.001 | IDN 648.001 | X |
| tall (attribute - height) | Tom (person) | IDN 823.001 | IDN 457.001 | ✓ |
| tall (attribute - unlikely) | Tom (person) | IDN 399.001 | IDN 457.001 | X |

list valid groupings

| groupings table 584 | | | | | | | |
|---|---|---|---|---|---|---|---|
| grouping ID 586 | word strings 588 | identigens (IDN) 518 | | | entigens (ENI) 520 | | |
| 3001 | pilot Tom | IDN 150.001 | IDN 457.001 | | e717 | e61 | |
| 3040 | tall Tom | IDN 823.001 | IDN 648.001 | | e90 | e930 | |
| 3041 | tall Tom | IDN 823.001 | IDN 457.001 | | e90 | e61 | |
| 3070 | tall pilot Tom | IDN 823.001 | IDN 150.001 | IDN 457.001 | e90 | e717 | e61 |

FIG. 7E groupings table 620

| grouping (GRP) ID 586 | word strings 588 | IF string 622 | | THEN string 624 | |
|---|---|---|---|---|---|
| | | IDN string 626 | ENI 628 | IDN string 626 | ENI 628 |
| 5493 | If someone has a tumor, then someone is sick. | someone has | 12aa | someone sick | 12js |
| | | tumor has | 06aa | | |
| 5494 | If someone is sick, then someone is possibly sad. | someone sick | 12js | someone sad | 12ja |

new knowledge inference 630

| | | | | | |
|---|---|---|---|---|---|
| 5495 | If someone has a tumor, then someone is possibly sad. | someone has | 12aa | someone sad | 12ja |
| | | tumor has | 06aa | possibly sad | 05b |

FIG. 8B

GENERATING AN UNAMBIGUOUS INTERPRETATION OF INGESTED CONTENT TO PRODUCE KNOWLEDGE

CROSS REFERENCE TO RELATED PATENTS

The present U.S. Utility patent application claims priority pursuant to 35 U.S.C. § 120 as a continuation of U.S. Utility application Ser. No. 16/537,096, entitled "GENERATING AN UNAMBIGUOUS INTERPRETATION OF INGESTED CONTENT TO PRODUCE KNOWLEDGE" filed Aug. 9, 2019, issuing Jul. 30, 2024 as U.S. Pat. No. 12,050,869, which claims priority pursuant to 35 U.S.C. § 119(e) to U.S. Provisional Application No. 62/720,807, entitled "GENERATING AN UNAMBIGUOUS INTERPRETATION OF INGESTED CONTENT TO PRODUCE KNOWLEDGE," filed Aug. 21, 2018, all of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates to computing systems and more particularly to generating data representations of data and analyzing the data utilizing the data representations.

Description of Related Art

It is known that data is stored in information systems, such as files containing text. It is often difficult to produce useful information from this stored data due to many factors. The factors include the volume of available data, accuracy of the data, and variances in how text is interpreted to express knowledge. For example, many languages and regional dialects utilize the same or similar words to represent different concepts.

Computers are known to utilize pattern recognition techniques and apply statistical reasoning to process text to express an interpretation in an attempt to overcome ambiguities inherent in words. One pattern recognition technique includes matching a word pattern of a query to a word pattern of the stored data to find an explicit textual answer. Another pattern recognition technique classifies words into major grammatical types such as functional words, nouns, adjectives, verbs and adverbs. Grammar based techniques then utilize these grammatical types to study how words should be distributed within a string of words to form a properly constructed grammatical sentence where each word is forced to support a grammatical operation without necessarily identifying what the word is actually trying to describe.

BRIEF DESCRIPTION OF THE SEVERAL VIEWS OF THE DRAWING(S)

FIG. 7C is a diagram of an embodiment of a synonym words table within a computing system in accordance with the present invention;

FIG. 7D is a diagram of an embodiment of a polysemous words table within a computing system in accordance with the present invention;

FIG. 7E is a diagram of an embodiment of transforming words into groupings within a computing system in accordance with the present invention;

FIG. 8B is a diagram of an embodiment of a groupings table within a computing system in accordance with the present invention;

DETAILED DESCRIPTION OF THE INVENTION

Figure 1:
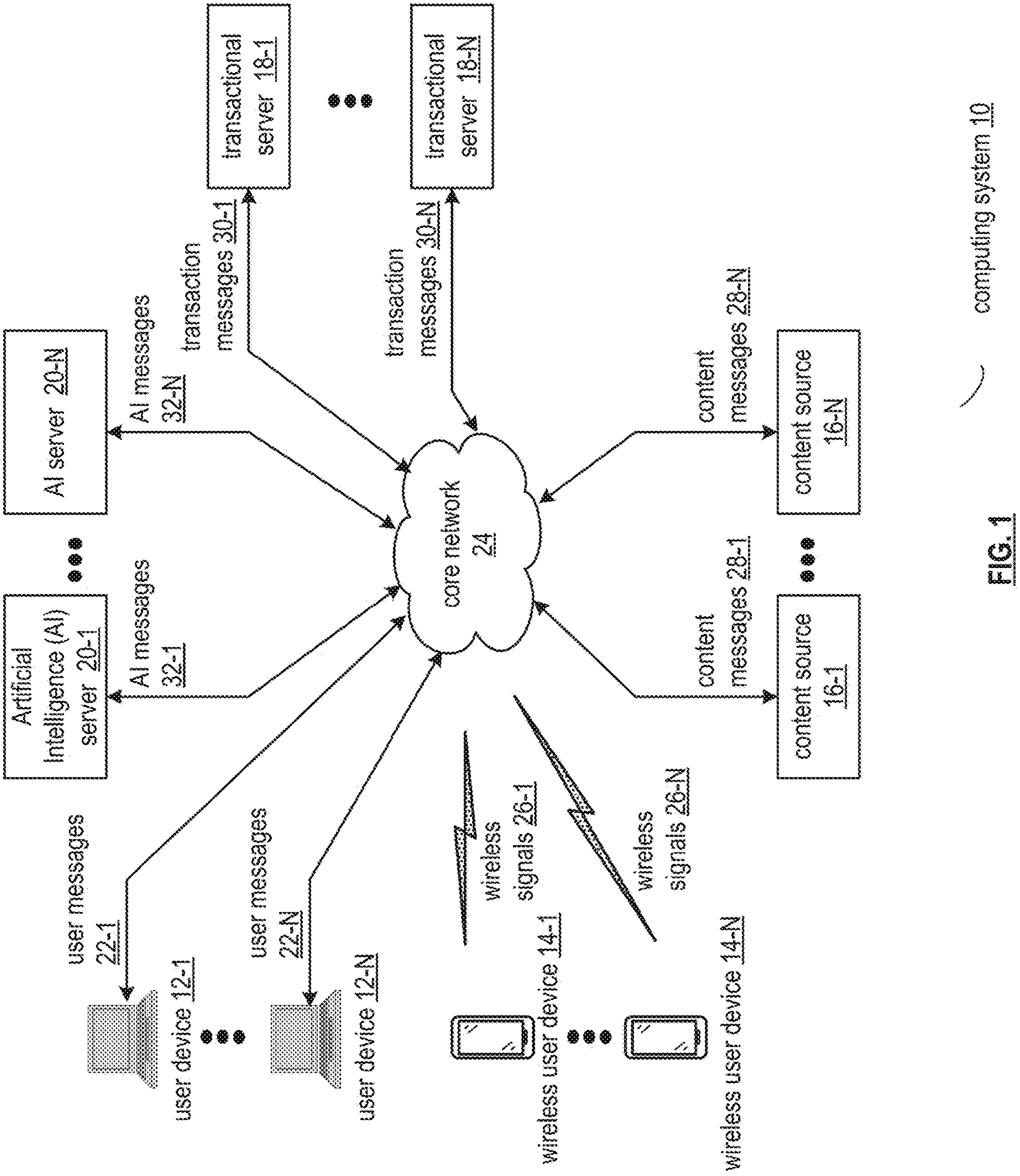
FIG. 1 is a schematic block diagram of an embodiment of a computing system in accordance with the present invention.

FIG. 1 is a schematic block diagram of an embodiment of a computing system 10 that includes a plurality of user devices 12-1 through 12-N, a plurality of wireless user devices 14-1 through 14-N, a plurality of content sources 16-1 through 16-N, a plurality of transactional servers 18-1 through 18-N, a plurality of artificial intelligence (AI) servers 20-1 through 20-N, and a core network 24. The core network 24 includes at least one of the Internet, a public radio access network (RAN), and any private network. Hereafter, the computing system 10 may be interchangeably referred to as a data network, a data communication network, a system, a communication system, and a data communication system. Hereafter, the user device and the wireless user device may be interchangeably referred to as user devices, and each of the transactional servers and the AI servers may be interchangeably referred to as servers.

Each user device, wireless user device, transactional server, and AI server includes a computing device that includes a computing core. In general, a computing device is any electronic device that can communicate data, process data, and/or store data. A further generality of a computing device is that it includes one or more of a central processing unit (CPU), a memory system, a sensor (e.g., internal or external), user input/output interfaces, peripheral device interfaces, communication elements, and an interconnecting bus structure.

As further specific examples, each of the computing devices may be a portable computing device and/or a fixed computing device. A portable computing device may be an embedded controller, a smart sensor, a smart pill, a social networking device, a gaming device, a cell phone, a smart phone, a robot, a personal digital assistant, a digital music player, a digital video player, a laptop computer, a handheld computer, a tablet, a video game controller, an engine controller, a vehicular controller, an aircraft controller, a maritime vessel controller, and/or any other portable device that includes a computing core. A fixed computing device may be security camera, a sensor device, a household appliance, a machine, a robot, an embedded controller, a personal computer (PC), a computer server, a cable set-top box, a satellite receiver, a television set, a printer, a fax machine, home entertainment equipment, a camera controller, a video game console, a critical infrastructure controller, and/or any type of home or office computing equipment that includes a computing core. An embodiment of the various servers is discussed in greater detail with reference to FIG. 2. An embodiment of the various devices is discussed in greater detail with reference to FIG. 3.

Each of the content sources 16-1 through 16-N includes any source of content, where the content includes one or more of data files, a data stream, a tech stream, a text file, an audio stream, an audio file, a video stream, a video file, etc. Examples of the content sources include a weather service, a multi-language online dictionary, a fact server, a big data storage system, the Internet, social media systems, an email server, a news server, a schedule server, a traffic monitor, a security camera system, audio monitoring equipment, an information server, a service provider, a data aggregator, and airline traffic server, a shipping and logistics server, a banking server, a financial transaction server, etc. Alternatively, or in addition to, one or more of the various user devices may provide content. For example, a wireless user device may provide content (e.g., issued as a content message) when the wireless user device is able to capture data (e.g., text input, sensor input, etc.).

Generally, an embodiment of this invention presents solutions where the computing system 10 supports the generation and utilization of knowledge extracted from content. For example, the AI servers 20-1 through 20-N ingest content from the content sources 16-1 through 16-N by receiving, via the core network 24 content messages 28-1 through 28-N as AI messages 32-1 through 32-N, extract the knowledge from the ingested content, and interact with the various user devices to utilize the extracted knowledge by facilitating the issuing, via the core network 24, user messages 22-1 through 22-N to the user devices 12-1 through 12-N and wireless signals 26-1 through 26-N to the wireless user devices 14-1 through 14-N.

Each content message 28-1 through 28-N includes a content request (e.g., requesting content related to a topic, content type, content timing, one or more domains, etc.) or a content response, where the content response includes real-time or static content such as one or more of dictionary information, facts, non-facts, weather information, sensor data, news information, blog information, social media content, user daily activity schedules, traffic conditions, community event schedules, school schedules, user schedules airline records, shipping records, logistics records, banking records, census information, global financial history information, etc. Each AI message 32-1 through 32-N includes one or more of content messages, user messages (e.g., a query request, a query response that includes an answer to a query request), and transaction messages (e.g., transaction information, requests and responses related to transactions). Each user message 22-1 through 22-N includes one or more of a query request, a query response, a trigger request, a trigger response, a content collection, control information, software information, configuration information, security information, routing information, addressing information, presence information, analytics information, protocol information, all types of media, sensor data, statistical data, user data, error messages, etc.

When utilizing a wireless signal capability of the core network 24, each of the wireless user devices 14-1 through 14-N encodes/decodes data and/or information messages (e.g., user messages such as user messages 22-1 through 22-N) in accordance with one or more wireless standards for local wireless data signals (e.g., Wi-Fi®, Bluetooth®, ZIGBEE®) and/or for wide area wireless data signals (e.g., 2G, 3G, 4G, 5G, satellite, point-to-point, etc.) to produce wireless signals 26-1 through 26-N. Having encoded/decoded the data and/or information messages, the wireless user devices 14-1 through 14-N and/receive the wireless signals to/from the wireless capability of the core network 24.

As another example of the generation and utilization of knowledge, the transactional servers 18-1 through 18-N communicate, via the core network 24, transaction messages 30-1 through 30-N as further AI messages 32-1 through 32-N to facilitate ingesting of transactional type content (e.g., real-time crypto currency transaction information) and to facilitate handling of utilization of the knowledge by one or more of the transactional servers (e.g., for a transactional function) in addition to the utilization of the knowledge by the various user devices. Each transaction message 30-1 through 30-N includes one or more of a query request, a query response, a trigger request, a trigger response, a content message, and transactional information, where the transactional information may include one or more of consumer purchasing history, crypto currency ledgers, stock market trade information, other investment transaction information, etc.

In another specific example of operation of the generation and utilization of knowledge extracted from the content, the user device 12-1 issues a user message 22-1 to the AI server 20-1, where the user message 22-1 includes a query request and where the query request includes a question related to a first domain of knowledge. The issuing includes generating the user message 22-1 based on the query request (e.g., the question), selecting the AI server 20-1 based on the first domain of knowledge, and sending, via the core network 24, the user message 22-1 as a further AI message 32-1 to the AI server 20-1. Having received the AI message 32-1, the AI server 20-1 analyzes the question within the first domain, generates further knowledge, generates a preliminary answer, generates a quality level indicator of the preliminary answer, and determines to gather further content when the quality level indicator is below a minimum quality threshold level.

When gathering the further content, the AI server 20-1 issues, via the core network 24, a still further AI message 32-1 as a further content message 28-1 to the content source 16-1, where the content message 28-1 includes a content request for more content associated with the first domain of knowledge and in particular the question. Alternatively, or in addition to, the AI server 20-1 issues the content request to another AI server to facilitate a response within a domain associated with the other AI server. Further alternatively, or in addition to, the AI server 20-1 issues the content request to one or more of the various user devices to facilitate a response from a subject matter expert.

Having received the content message 28-1, the contents or 16-1 issues, via the core network 24, a still further content message 28-1 to the AI server 20-1 as a yet further AI message 32-1, where the still further content message 28-1 includes requested content. The AI server 20-1 processes the received content to generate further knowledge. Having generated the further knowledge, the AI server 20-1 re-analyzes the question, generates still further knowledge, generates another preliminary answer, generates another quality level indicator of the other preliminary answer, and determines to issue a query response to the user device 12-1 when the quality level indicator is above the minimum quality threshold level. When issuing the query response, the AI server 20-1 generates an AI message 32-1 that includes another user message 22-1, where the other user message 22-1 includes the other preliminary answer as a query response including the answer to the question. Having generated the AI message 32-1, the AI server 20-1 sends, via the core network 24, the AI message 32-1 as the user message 22-1 to the user device 12-1 thus providing the answer to the original question of the query request.

Figure 2:
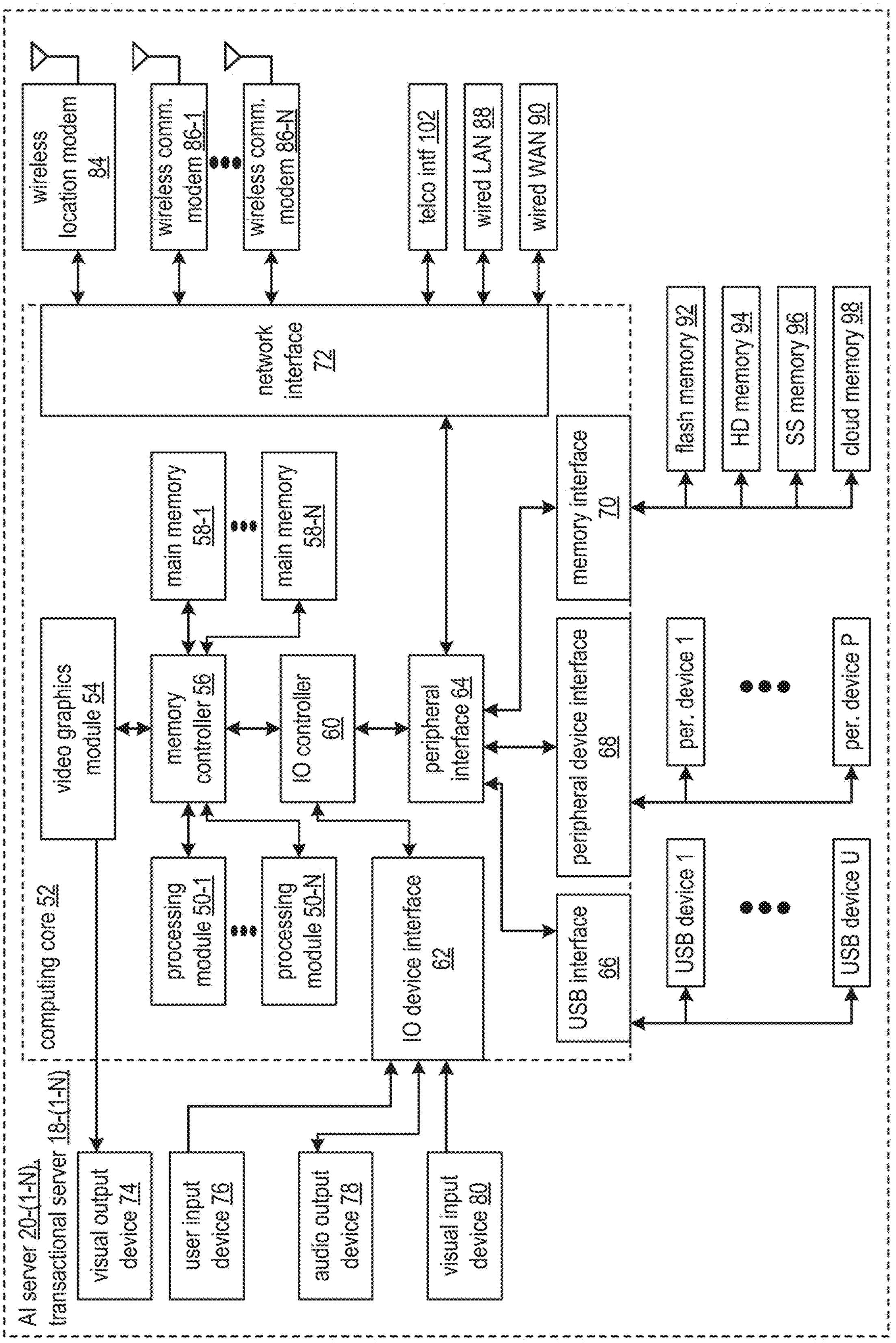
FIG. 2 is a schematic block diagram of an embodiment of various servers of a computing system in accordance with the present invention.

FIG. 2 is a schematic block diagram of an embodiment of the AI servers 20-1 through 20-N and the transactional servers 18-1 through 18-N of the computing system 10 of FIG. 1. The servers include a computing core 52, one or more visual output devices 74 (e.g., video graphics display, touchscreen, LED, etc.), one or more user input devices 76 (e.g., keypad, keyboard, touchscreen, voice to text, a push button, a microphone, a card reader, a door position switch, a biometric input device, etc.), one or more audio output devices 78 (e.g., speaker(s), headphone jack, a motor, etc.), and one or more visual input devices 80 (e.g., a still image camera, a video camera, photocell, etc.).

The servers further include one or more universal serial bus (USB) devices (USB devices 1-U), one or more peripheral devices (e.g., peripheral devices 1-P), one or more memory devices (e.g., one or more flash memory devices 92, one or more hard drive (HD) memories 94, and one or more solid state (SS) memory devices 96, and/or cloud memory 98). The servers further include one or more wireless location modems 84 (e.g., global positioning satellite (GPS), Wi-Fi®, angle of arrival, time difference of arrival, signal strength, dedicated wireless location, etc.), one or more wireless communication modems 86-1 through 86-N (e.g., a cellular network transceiver, a wireless data network transceiver, a Wi-Fi® transceiver, a Bluetooth® transceiver, a 315 MHz transceiver, a ZIGBEE® transceiver, a 60 GHz transceiver, etc.), a telco interface 102 (e.g., to interface to a public switched telephone network), and a wired local area network (LAN) 88 (e.g., optical, electrical), and a wired wide area network (WAN) 90 (e.g., optical, electrical).

The computing core 52 includes a video graphics module 54, one or more processing modules 50-1 through 50-N (e.g., which may include one or more secure co-processors), a memory controller 56 and one or more main memories 58-1 through 58-N (e.g., RAM serving as local memory). The computing core 52 further includes one or more input/output (I/O) device interfaces 62, an input/output (I/O) controller 60, a peripheral interface 64, one or more USB interfaces 66, one or more network interfaces 72, one or more memory interfaces 70, and/or one or more peripheral device interfaces 68.

The processing modules may be a single processing device or a plurality of processing devices where the processing device may further be referred to as one or more of a "processing circuit", a "processor", and/or a "processing unit". Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network).

Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Each of the interfaces 62, 66, 68, 70, and 72 includes a combination of hardware (e.g., connectors, wiring, etc.) and may further include operational instructions stored on memory (e.g., driver software) that are executed by one or more of the processing modules 50-1 through 50-N and/or a processing circuit within the interface. Each of the interfaces couples to one or more components of the servers. For example, one of the IO device interfaces 62 couples to an audio output device 78. As another example, one of the memory interfaces 70 couples to flash memory 92 and another one of the memory interfaces 70 couples to cloud memory 98 (e.g., an on-line storage system and/or on-line backup system). In other embodiments, the servers may include more or less devices and modules than shown in this example embodiment of the servers.

Figure 3:
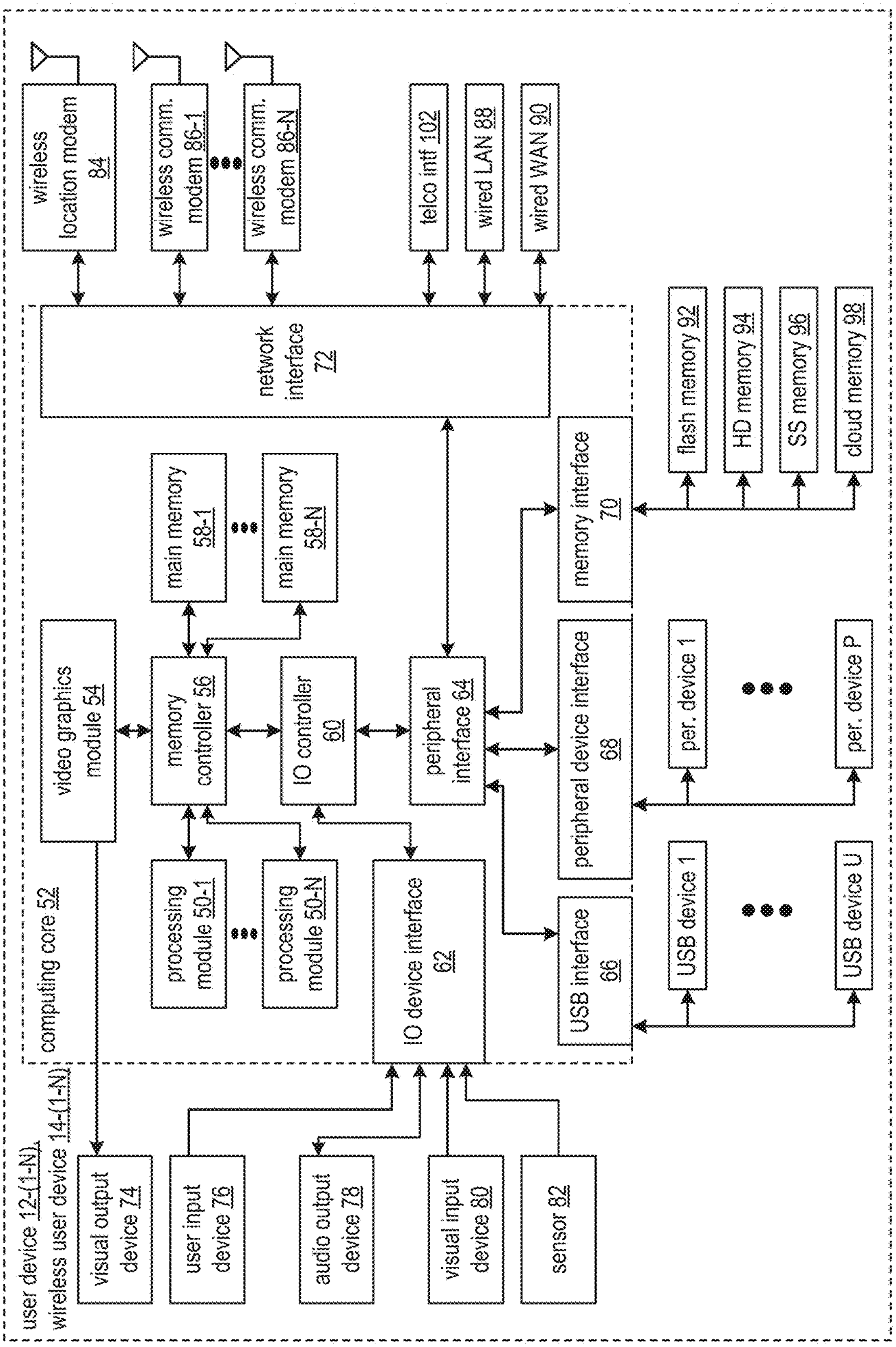
FIG. 3 is a schematic block diagram of an embodiment of various devices of a computing system in accordance with the present invention.

FIG. 3 is a schematic block diagram of an embodiment of the various devices of the computing system 10 of FIG. 1, including the user devices 12-1 through 12-N and the wireless user devices 14-1 through 14-N. The various devices include the visual output device 74 of FIG. 2, the user input device 76 of FIG. 2, the audio output device 78 of FIG. 2, the visual input device 80 of FIG. 2, and one or more sensors 82.

The sensor may be implemented internally and/or externally to the device. Example sensors includes a still camera, a video camera, servo motors associated with a camera, a position detector, a smoke detector, a gas detector, a motion sensor, an accelerometer, velocity detector, a compass, a gyro, a temperature sensor, a pressure sensor, an altitude sensor, a humidity detector, a moisture detector, an imaging sensor, and a biometric sensor. Further examples of the sensor include an infrared sensor, an audio sensor, an ultrasonic sensor, a proximity detector, a magnetic field detector, a biomaterial detector, a radiation detector, a weight detector, a density detector, a chemical analysis detector, a fluid flow volume sensor, a DNA reader, a wind speed sensor, a wind direction sensor, and an object detection sensor.

Further examples of the sensor include an object identifier sensor, a motion recognition detector, a battery level detector, a room temperature sensor, a sound detector, a smoke detector, an intrusion detector, a motion detector, a door position sensor, a window position sensor, and a sunlight detector. Still further sensor examples include medical category sensors including: a pulse rate monitor, a heart rhythm monitor, a breathing detector, a blood pressure monitor, a blood glucose level detector, blood type, an electrocardiogram sensor, a body mass detector, an imaging sensor, a microphone, body temperature, etc.

The various devices further include the computing core 52 of FIG. 2, the one or more universal serial bus (USB) devices (USB devices 1-U) of FIG. 2, the one or more peripheral devices (e.g., peripheral devices 1-P) of FIG. 2, and the one or more memories of FIG. 2 (e.g., flash memories 92, HD memories 94, SS memories 96, and/or cloud memories 98). The various devices further include the one or more wireless location modems 84 of FIG. 2, the one or more wireless communication modems 86-1 through 86-N of FIG. 2, the telco interface 102 of FIG. 2, the wired local area network (LAN) 88 of FIG. 2, and the wired wide area network (WAN) 90 of FIG. 2. In other embodiments, the various devices may include more or less internal devices and modules than shown in this example embodiment of the various devices.

Figure 4A:
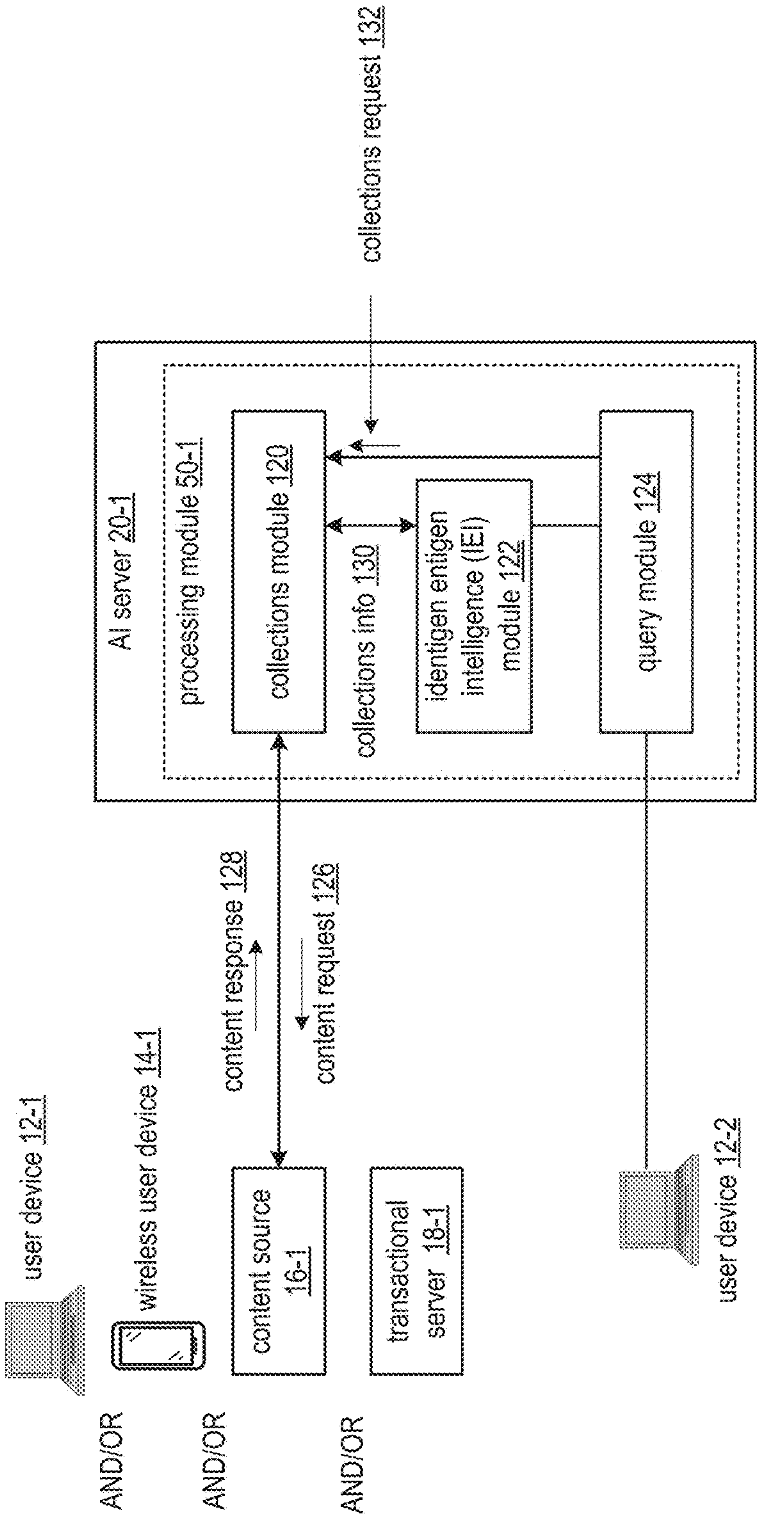
FIGS. 4A and 4B are schematic block diagrams of another embodiment of a computing system in accordance with the present invention.
Figure 4B:
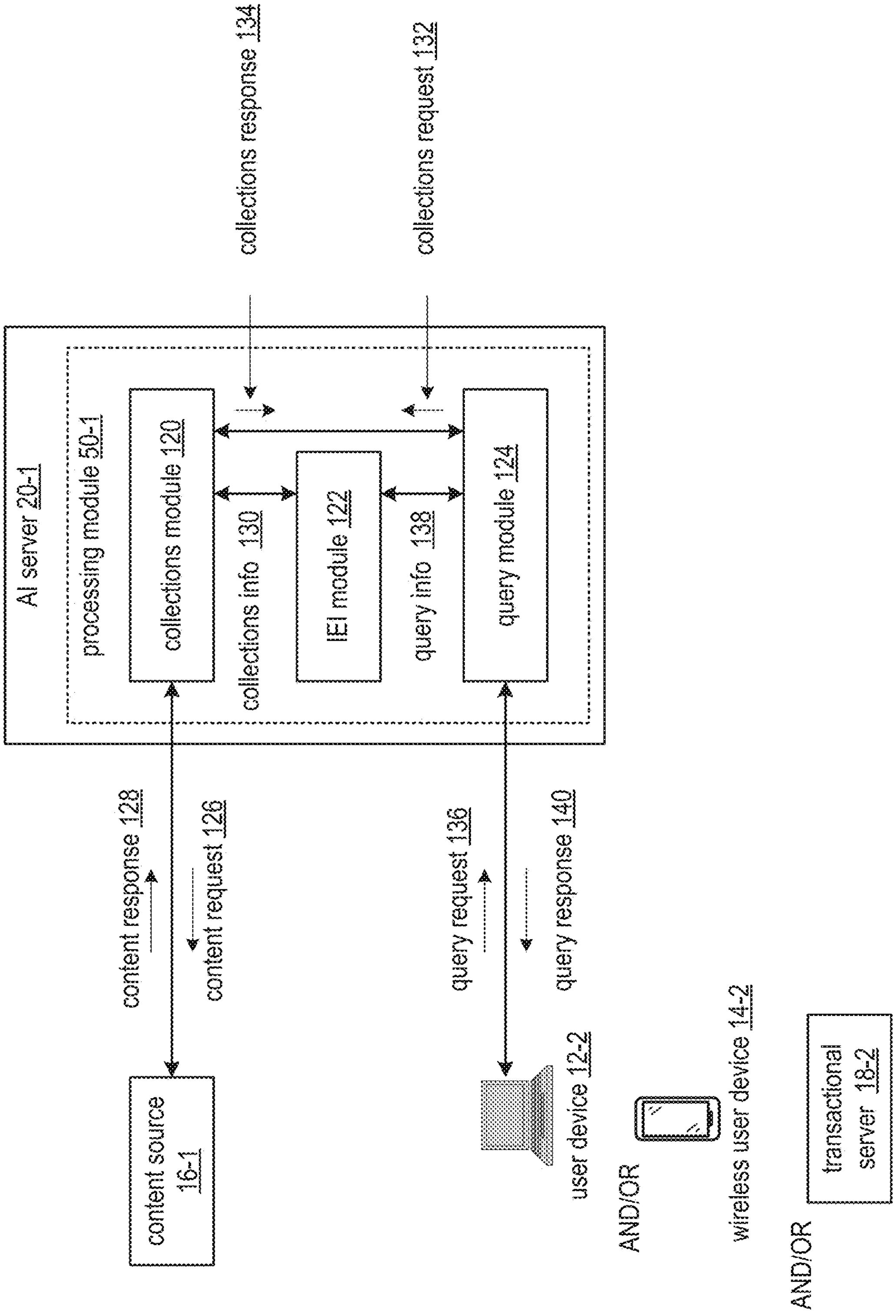

FIGS. 4A and 4B are schematic block diagrams of another embodiment of a computing system that includes one or more of the user device 12-1 of FIG. 1, the wireless user device 14-1 of FIG. 1, the content source 16-1 of FIG. 1, the transactional server 18-1 of FIG. 1, the user device 12-2 of FIG. 1, and the AI server 20-1 of FIG. 1. The AI server 20-1 includes the processing module 50-1 (e.g., associated with the servers) of FIG. 2, where the processing module 50-1 includes a collections module 120, an identigen entigen intelligence (IEI) module 122, and a query module 124. Alternatively, the collections module 120, the IEI module 122, and the query module 124 may be implemented by the processing module 50-1 (e.g., associated with the various user devices) of FIG. 3. The computing system functions to interpret content to produce a response to a query.

FIG. 4A illustrates an example of the interpreting of the content to produce the response to the query where the collections module 120 interprets (e.g., based on an interpretation approach such as rules) at least one of a collections request 132 from the query module 124 and a collections request within collections information 130 from the IEI module 122 to produce content request information (e.g., potential sources, content descriptors of desired content). Alternatively, or in addition to, the collections module 120 may facilitate gathering further content based on a plurality of collection requests from a plurality of devices of the computing system 10 of FIG. 1.

The collections request 132 is utilized to facilitate collection of content, where the content may be received in a real-time fashion once or at desired intervals, or in a static fashion from previous discrete time frames. For instance, the query module 124 issues the collections request 132 to facilitate collection of content as a background activity to support a long-term query (e.g., how many domestic airline flights over the next seven days include travelers between the age of 18 and 35 years old). The collections request 132 may include one or more of a requester identifier (ID), a content type (e.g., language, dialect, media type, topic, etc.), a content source indicator, security credentials (e.g., an authorization level, a password, a user ID, parameters utilized for encryption, etc.), a desired content quality level, trigger information (e.g., parameters under which to collect content based on a pre-event, an event (i.e., content quality level reaches a threshold to cause the trigger, trueness), or a timeframe), a desired format, and a desired timing associated with the content.

Having interpreted the collections request 132, the collections module 120 selects a source of content based on the content request information. The selecting includes one or more of identifying one or more potential sources based on the content request information, selecting the source of content from the potential sources utilizing a selection approach (e.g., favorable history, a favorable security level, favorable accessibility, favorable cost, favorable performance, etc.). For example, the collections module 120 selects the content source 16-1 when the content source 16-1 is known to provide a favorable content quality level for a domain associated with the collections request 132.

Having selected the source of content, the collections module 120 issues a content request 126 to the selected source of content. The issuing includes generating the content request 126 based on the content request information for the selected source of content and sending the content request 126 to the selected source of content. The content request 126 may include one or more of a content type indicator, a requester ID, security credentials for content access, and any other information associated with the collections request 132. For example, the collections module 120 sends the content request 126, via the core network 24 of FIG. 1, to the content source 16-1. Alternatively, or in addition to, the collections module 120 may send a similar content request 126 to one or more of the user device 12-1, the wireless user device 14-1, and the transactional server 18-1 to facilitate collecting of further content.

In response to the content request 126, the collections module 120 receives one or more content responses 128. The content response 128 includes one or more of content associated with the content source, a content source identifier, security credential processing information, and any other information pertaining to the desired content. Having received the content response 128, the collections module 120 interprets the received content response 128 to produce collections information 130, where the collections information 130 further includes a collections response from the collections module 120 to the IEI module 122.

The collections response includes one or more of transformed content (e.g., completed sentences and paragraphs), timing information associated with the content, a content source ID, and a content quality level. Having generated the collections response of the collections information 130, the collections module 120 sends the collections information 130 to the IEI module 122. Having received the collections information 130 from the collections module 120, the IEI module 122 interprets the further content of the content response to generate further knowledge, where the further knowledge is stored in a memory associated with the IEI module 122 to facilitate subsequent answering of questions posed in received queries.

FIG. 4B further illustrates the example of the interpreting of the content to produce the response to the query where, the query module 124 interprets a received query request 136 from a requester to produce an interpretation of the query request. For example, the query module 124 receives the query request 136 from the user device 12-2, and/or from one or more of the wireless user device 14-2 and the transactional server 18-2. The query request 136 includes one or more of an identifier (ID) associated with the request (e.g., requester ID, ID of an entity to send a response to), a question, question constraints (e.g., within a timeframe, within a geographic area, within a domain of knowledge, etc.), and content associated with the question (e.g., which may be analyzed for new knowledge itself).

The interpreting of the query request 136 includes determining whether to issue a request to the IEI module 122 (e.g., a question, perhaps with content) and/or to issue a request to the collections module 120 (e.g., for further background content). For example, the query module 124 produces the interpretation of the query request to indicate to send the request directly to the IEI module 122 when the question is associated with a simple non-time varying function answer (e.g., question: "how many hydrogen atoms does a molecule of water have?").

Having interpreted the query request 136, the query module 124 issues at least one of an IEI request as query information 138 to the IEI module 122 (e.g., when receiving a simple new query request) and a collections request 132 to the collections module 120 (e.g., based on two or more query requests 136 requiring more substantive content gathering). The IEI request of the query information 138 includes one or more of an identifier (ID) of the query module 124, an ID of the requester (e.g., the user device 12-2), a question (e.g., with regards to content for analysis, with regards to knowledge minded by the AI server from general content), one or more constraints (e.g., assumptions, restrictions, etc.) associated with the question, content for analysis of the question, and timing information (e.g., a date range for relevance of the question).

Having received the query information 138 that includes the IEI request from the query module 124, the IEI module 122 determines whether a satisfactory response can be generated based on currently available knowledge, including that of the query request 136. The determining includes indicating that the satisfactory response cannot be generated when an estimated quality level of an answer falls below a minimum quality threshold level. When the satisfactory response cannot be generated, the IEI module 122 facilitates collecting more content. The facilitating includes issuing a collections request to the collections module 120 of the AI server 20-1 and/or to another server or user device, and interpreting a subsequent collections response 134 of collections information 130 that includes further content to produce further knowledge to enable a more favorable answer.

When the IEI module 122 indicates that the satisfactory response can be generated, the IEI module 122 issues an IEI response as query information 138 to the query module 124. The IEI response includes one or more of one or more answers, timing relevance of the one or more answers, an estimated quality level of each answer, and one or more assumptions associated with the answer. The issuing includes generating the IEI response based on the collections response 134 of the collections information 130 and the IEI request, and sending the IEI response as the query information 138 to the query module 124. Alternatively, or in addition to, at least some of the further content collected by the collections module 120 is utilized to generate a collections response 134 issued by the collections module 120 to the query module 124. The collections response 134 includes one or more of further content, a content availability indicator (e.g., when, where, required credentials, etc.), a content freshness indicator (e.g., timestamps, predicted time availability), content source identifiers, and a content quality level.

Having received the query information 138 from the IEI module 122, the query module 124 issues a query response 140 to the requester based on the IEI response and/or the collections response 134 directly from the collections module 120, where the collection module 120 generates the collections response 134 based on collected content and the collections request 132. The query response 140 includes one or more of an answer, answer timing, an answer quality level, and answer assumptions.

Figure 4C:
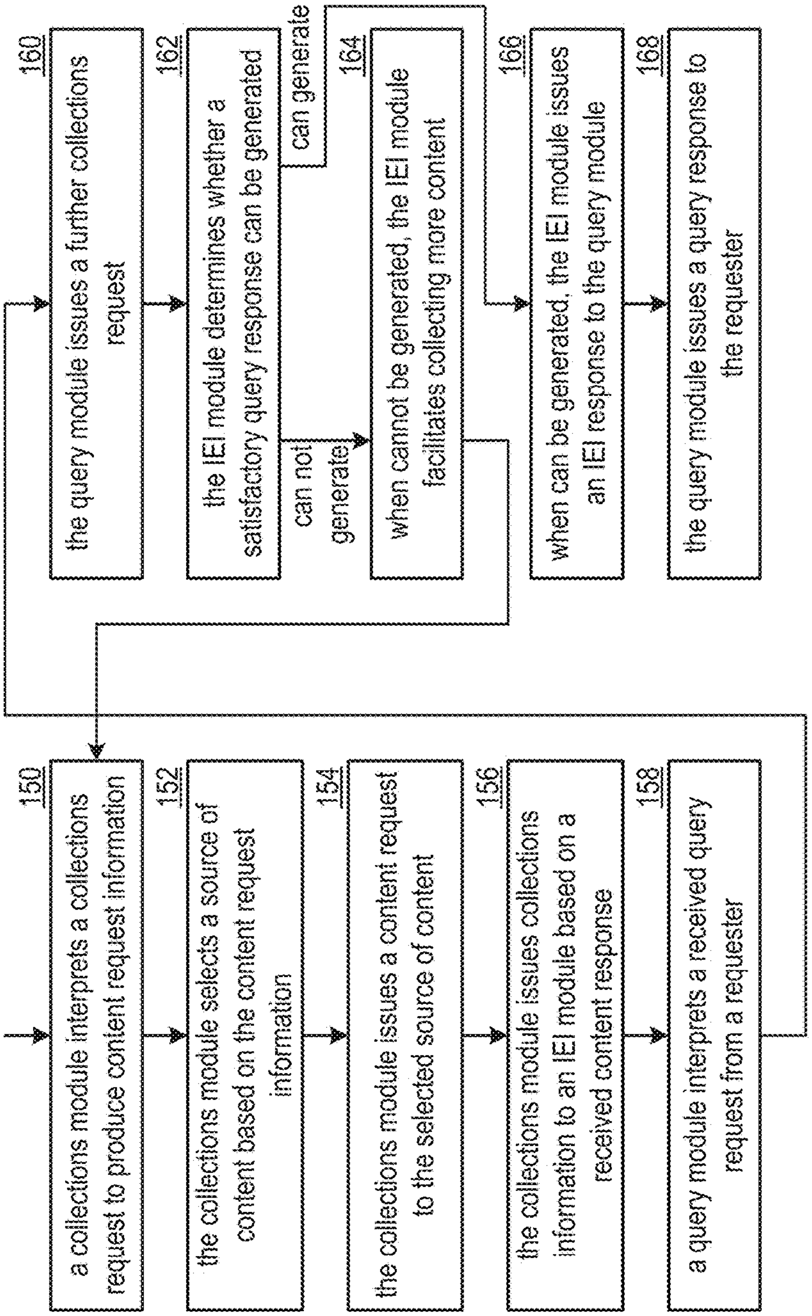
FIG. 4C is a logic diagram of an embodiment of a method for interpreting content to produce a response to a query within a computing system in accordance with the present invention.

FIG. 4C is a logic diagram of an embodiment of a method for interpreting content to produce a response to a query within a computing system. In particular, a method is presented for use in conjunction with one or more functions and features described in conjunction with FIGS. 1-3, 4A-4B, and also FIG. 4C. The method includes step 150 where a collections module of a processing module of one or more computing devices (e.g., of one or more servers) interprets a collections request to produce content request information. The interpreting may include one or more of identifying a desired content source, identifying a content type, identifying a content domain, and identifying content timing requirements.

The method continues at step 152 where the collections module selects a source of content based on the content request information. For example, the collections module identifies one or more potential sources based on the content request information and selects the source of content from the potential sources utilizing a selection approach (e.g., based on one or more of favorable history, a favorable security level, favorable accessibility, favorable cost, favorable performance, etc.). The method continues at step 154 where the collections module issues a content request to the selected source of content. The issuing includes generating a content request based on the content request information for the selected source of content and sending the content request to the selected source of content.

The method continues at step 156 where the collections module issues collections information to an identigen entigen intelligence (IEI) module based on a received content response, where the IEI module extracts further knowledge from newly obtained content from the one or more received content responses. For example, the collections module generates the collections information based on newly obtained content from the one or more received content responses of the selected source of content.

The method continues at step 158 where a query module interprets a received query request from a requester to produce an interpretation of the query request. The interpreting may include determining whether to issue a request to the IEI module (e.g., a question) or to issue a request to the collections module to gather further background content. The method continues at step 160 where the query module issues a further collections request. For example, when receiving a new query request, the query module generates a request for the IEI module. As another example, when receiving a plurality of query requests for similar questions, the query module generates a request for the collections module to gather further background content.

The method continues at step 162 where the IEI module determines whether a satisfactory query response can be generated when receiving the request from the query module. For example, the IEI module indicates that the satisfactory query response cannot be generated when an estimated quality level of an answer is below a minimum answer quality threshold level. The method branches to step 166 when the IEI module determines that the satisfactory query response can be generated. The method continues to step 164 when the IEI module determines that the satisfactory query response cannot be generated. When the satisfactory query response cannot be generated, the method continues at step 164 where the IEI module facilitates collecting more content. The method loops back to step 150.

When the satisfactory query response can be generated, the method continues at step 166 where the IEI module issues an IEI response to the query module. The issuing includes generating the IEI response based on the collections response and the IEI request, and sending the IEI response to the query module. The method continues at step 168 where the query module issues a query response to the requester. For example, the query module generates the query response based on the IEI response and/or a collections response from the collections module and sends the query response to the requester, where the collections module generates the collections response based on collected content and the collections request.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5A:
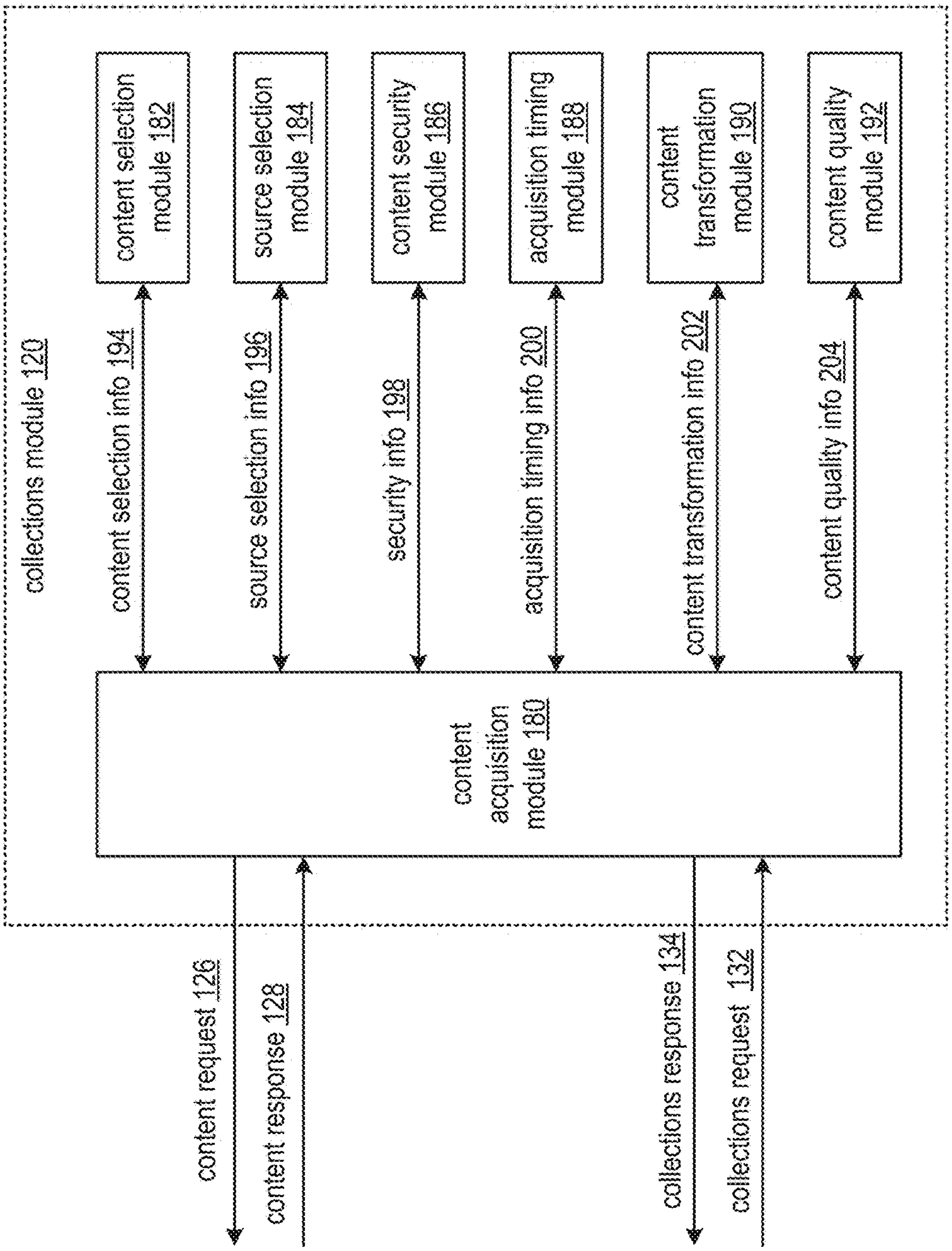
FIG. 5A is a schematic block diagram of an embodiment of a collections module of a computing system in accordance with the present invention.

FIG. 5A is a schematic block diagram of an embodiment of the collections module 120 of FIG. 4A that includes a content acquisition module 180, a content selection module 182, a source selection module 184, a content security module 186, an acquisition timing module 188, a content transformation module 190, and a content quality module 192. Generally, an embodiment of this invention presents solutions where the collections module 120 supports collecting content.

In an example of operation of the collecting of the content, the content acquisition module 180 receives a collections request 132 from a requester. The content acquisition module 180 obtains content selection information 194 based on the collections request 132. The content selection information 194 includes one or more of content requirements, a desired content type indicator, a desired content source identifier, a content type indicator, a candidate source identifier (ID), and a content profile (e.g., a template of typical parameters of the content). For example, the content acquisition module 180 receives the content selection information 194 from the content selection module 182, where the content selection module 182 generates the content selection information 194 based on a content selection information request from the content acquisition module 180 and where the content acquisition module 180 generates the content selection information request based on the collections request 132.

The content acquisition module 180 obtains source selection information 196 based on the collections request 132. The source selection information 196 includes one or more of candidate source identifiers, a content profile, selected sources, source priority levels, and recommended source access timing. For example, the content acquisition module 180 receives the source selection information 196 from the source selection module 184, where the source selection module 184 generates the source selection information 196 based on a source selection information request from the content acquisition module 180 and where the content acquisition module 180 generates the source selection information request based on the collections request 132.

The content acquisition module 180 obtains acquisition timing information 200 based on the collections request 132. The acquisition timing information 200 includes one or more of recommended source access timing, confirmed source access timing, source access testing results, estimated velocity of content update's, content precious, timestamps, predicted time availability, required content acquisition triggers, content acquisition trigger detection indicators, and a duplicative indicator with a pending content request. For example, the content acquisition module 180 receives the acquisition timing information 200 from the acquisition timing module 188, where the acquisition timing module 188 generates the acquisition timing information 200 based on an acquisition timing information request from the content acquisition module 180 and where the content acquisition module 180 generates the acquisition timing information request based on the collections request 132.

Having obtained the content selection information 194, the source selection information 196, and the acquisition timing information 200, the content acquisition module 180 issues a content request 126 to a content source utilizing security information 198 from the content security module 186, where the content acquisition module 180 generates the content request 126 in accordance with the content selection information 194, the source selection information 196, and the acquisition timing information 200. The security information 198 includes one or more of source priority requirements, requester security information, available security procedures, and security credentials for trust and/or encryption. For example, the content acquisition module 180 generates the content request 126 to request a particular content type in accordance with the content selection information 194 and to include security parameters of the security information 198, initiates sending of the content request 126 in accordance with the acquisition timing information 200, and sends the content request 126 to a particular targeted content source in accordance with the source selection information 196.

In response to receiving a content response 128, the content acquisition module 180 determines the quality level of received content extracted from the content response 128. For example, the content acquisition module 180 receives content quality information 204 from the content quality module 192, where the content quality module 192 generates the quality level of the received content based on receiving a content quality request from the content acquisition module 180 and where the content acquisition module 180 generates the content quality request based on content extracted from the content response 128. The content quality information includes one or more of a content reliability threshold range, a content accuracy threshold range, a desired content quality level, a predicted content quality level, and a predicted level of trust.

When the quality level is below a minimum desired quality threshold level, the content acquisition module 180 facilitates acquisition of further content. The facilitating includes issuing another content request 126 to a same content source and/or to another content source to receive and interpret further received content. When the quality level is above the minimum desired quality threshold level, the content acquisition module 180 issues a collections response 134 to the requester. The issuing includes processing the content in accordance with a transformation approach to produce transformed content, generating the collections response 134 to include the transformed content, and sending the collections response 134 to the requester. The processing of the content to produce the transformed content includes receiving content transformation information 202 from the content transformation module 190, where the content transformation module 190 transforms the content in accordance with the transformation approach to produce the transformed content. The content transformation information includes a desired format, available formats, recommended formatting, the received content, transformation instructions, and the transformed content.

Figure 5B:
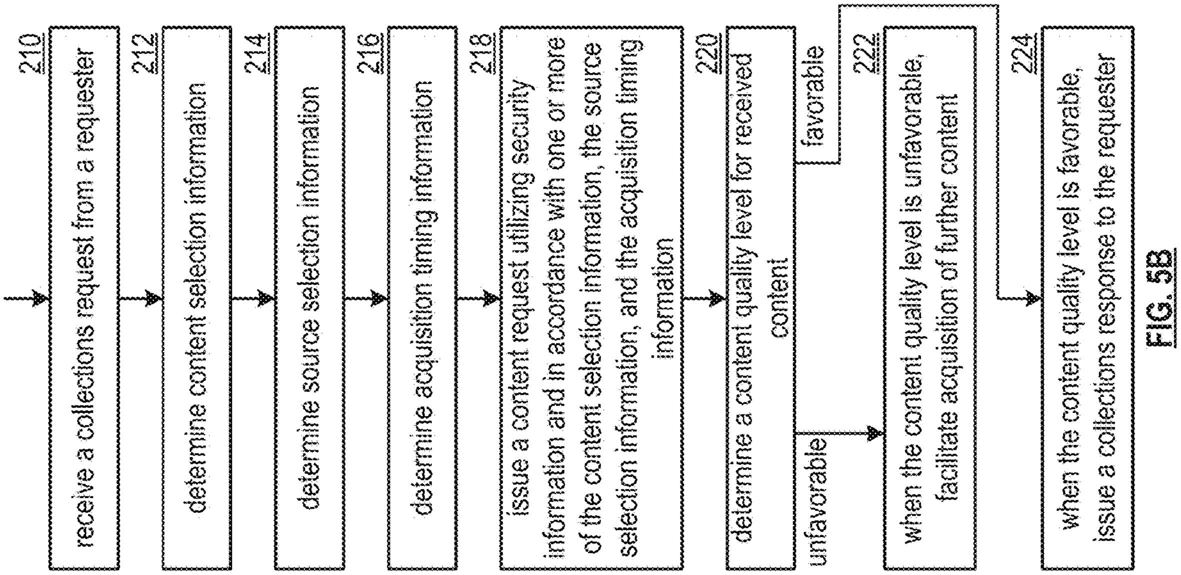
FIG. 5B is a logic diagram of an embodiment of a method for obtaining content within a computing system in accordance with the present invention.

FIG. 5B is a logic diagram of an embodiment of a method for obtaining content within a computing system. In particular, a method is presented for use in conjunction with one or more functions and features described in conjunction with FIGS. 1-3, 4A-4C, 5A, and also FIG. 5B. The method includes step 210 where a processing module of one or more processing modules of one or more computing devices of the computing system receives a collections request from the requester. The method continues at step 212 where the processing module determines content selection information. The determining includes interpreting the collections request to identify requirements of the content.

The method continues at step 214 where the processing module determines source selection information. The determining includes interpreting the collections request to identify and select one or more sources for the content to be collected. The method continues at step 216 where the processing module determines acquisition timing information. The determining includes interpreting the collections request to identify timing requirements for the acquisition of the content from the one or more sources. The method continues at step 218 where the processing module issues a content request utilizing security information and in accordance with one or more of the content selection information, the source selection information, and the acquisition timing information. For example, the processing module issues the content request to the one or more sources for the content in accordance with the content requirements, where the sending of the request is in accordance with the acquisition timing information.

The method continues at step 220 where the processing module determines a content quality level for received content area the determining includes receiving the content from the one or more sources, obtaining content quality information for the received content based on a quality analysis of the received content. The method branches to step 224 when the content quality level is favorable and the method continues to step 222 when the quality level is unfavorable. For example, the processing module determines that the content quality level is favorable when the content quality level is equal to or above a minimum quality threshold level and determines that the content quality level is unfavorable when the content quality level is less than the minimum quality threshold level.

When the content quality level is unfavorable, the method continues at step 222 where the processing module facilitates acquisition and further content. For example, the processing module issues further content requests and receives further content for analysis. When the content quality level is favorable, the method continues at step 224 where the processing module issues a collections response to the requester. The issuing includes generating the collections response and sending the collections response to the requester. The generating of the collections response may include transforming the received content into transformed content in accordance with a transformation approach (e.g., reformatting, interpreting absolute meaning and translating into another language in accordance with the absolute meaning, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5C:
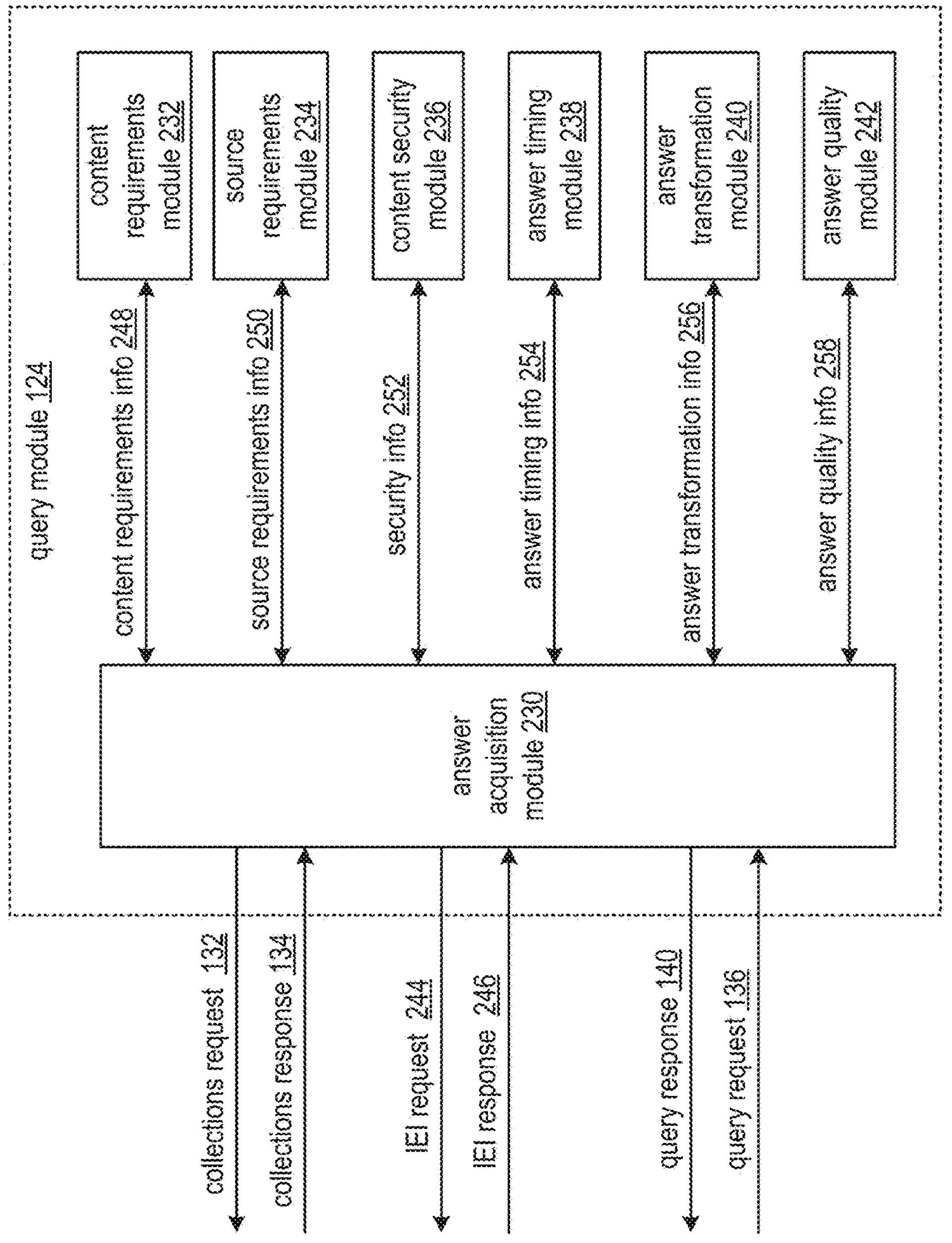
FIG. 5C is a schematic block diagram of an embodiment of a query module of a computing system in accordance with the present invention.

FIG. 5C is a schematic block diagram of an embodiment of the query module 124 of FIG. 4A that includes an answer acquisition module 230, a content requirements module 232 a source requirements module 234, a content security module 236, an answer timing module 238, an answer transformation module 240, and an answer quality module 242. Generally, an embodiment of this invention presents solutions where the query module 124 supports responding to a query.

In an example of operation of the responding to the query, the answer acquisition module 230 receives a query request 136 from a requester. The answer acquisition module 230 obtains content requirements information 248 based on the query request 136. The content requirements information 248 includes one or more of content parameters, a desired content type, a desired content source if any, a content type if any, candidate source identifiers, a content profile, and a question of the query request 136. For example, the answer acquisition module 230 receives the content requirements information 248 from the content requirements module 232, where the content requirements module 232 generates the content requirements information 248 based on a content requirements information request from the answer acquisition module 230 and where the answer acquisition module 230 generates the content requirements information request based on the query request 136.

The answer acquisition module 230 obtains source requirements information 250 based on the query request 136. The source requirements information 250 includes one or more of candidate source identifiers, a content profile, a desired source parameter, recommended source parameters, source priority levels, and recommended source access timing. For example, the answer acquisition module 230 receives the source requirements information 250 from the source requirements module 234, where the source requirements module 234 generates the source requirements information 250 based on a source requirements information request from the answer acquisition module 230 and where the answer acquisition module 230 generates the source requirements information request based on the query request 136.

The answer acquisition module 230 obtains answer timing information 254 based on the query request 136. The answer timing information 254 includes one or more of requested answer timing, confirmed answer timing, source access testing results, estimated velocity of content updates, content freshness, timestamps, predicted time available, requested content acquisition trigger, and a content acquisition trigger detected indicator. For example, the answer acquisition module 230 receives the answer timing information 254 from the answer timing module 238, where the answer timing module 238 generates the answer timing information 254 based on an answer timing information request from the answer acquisition module 230 and where the answer acquisition module 230 generates the answer timing information request based on the query request 136.

Having obtained the content requirements information 248, the source requirements information 250, and the answer timing information 254, the answer acquisition module 230 determines whether to issue an IEI request 244 and/or a collections request 132 based on one or more of the content requirements information 248, the source requirements information 250, and the answer timing information 254. For example, the answer acquisition module 230 selects the IEI request 244 when an immediate answer to a simple query request 136 is required and is expected to have a favorable quality level. As another example, the answer acquisition module 230 selects the collections request 132 when a longer-term answer is required as indicated by the answer timing information to before and/or when the query request 136 has an unfavorable quality level.

When issuing the IEI request 244, the answer acquisition module 230 generates the IEI request 244 in accordance with security information 252 received from the content security module 236 and based on one or more of the content requirements information 248, the source requirements information 250, and the answer timing information 254. Having generated the IEI request 244, the answer acquisition module 230 sends the IEI request 244 to at least one IEI module.

When issuing the collections request 132, the answer acquisition module 230 generates the collections request 132 in accordance with the security information 252 received from the content security module 236 and based on one or more of the content requirements information 248, the source requirements information 250, and the answer timing information 254. Having generated the collections request 132, the answer acquisition module 230 sends the collections request 132 to at least one collections module. Alternatively, the answer acquisition module 230 facilitates sending of the collections request 132 to one or more various user devices (e.g., to access a subject matter expert).

The answer acquisition module 230 determines a quality level of a received answer extracted from a collections response 134 and/or an IEI response 246. For example, the answer acquisition module 230 extracts the quality level of the received answer from answer quality information 258 received from the answer quality module 242 in response to an answer quality request from the answer acquisition module 230. When the quality level is unfavorable, the answer acquisition module 230 facilitates obtaining a further answer. The facilitation includes issuing at least one of a further IEI request 244 and a further collections request 132 to generate a further answer for further quality testing. When the quality level is favorable, the answer acquisition module 230 issues a query response 140 to the requester. The issuing includes generating the query response 140 based on answer transformation information 256 received from the answer transformation module 240, where the answer transformation module 240 generates the answer transformation information 256 to include a transformed answer based on receiving the answer from the answer acquisition module 230. The answer transformation information 256 further includes the question, a desired format of the answer, available formats, recommended formatting, received IEI responses, transformation instructions, and transformed IEI responses into an answer.

Figure 5D:
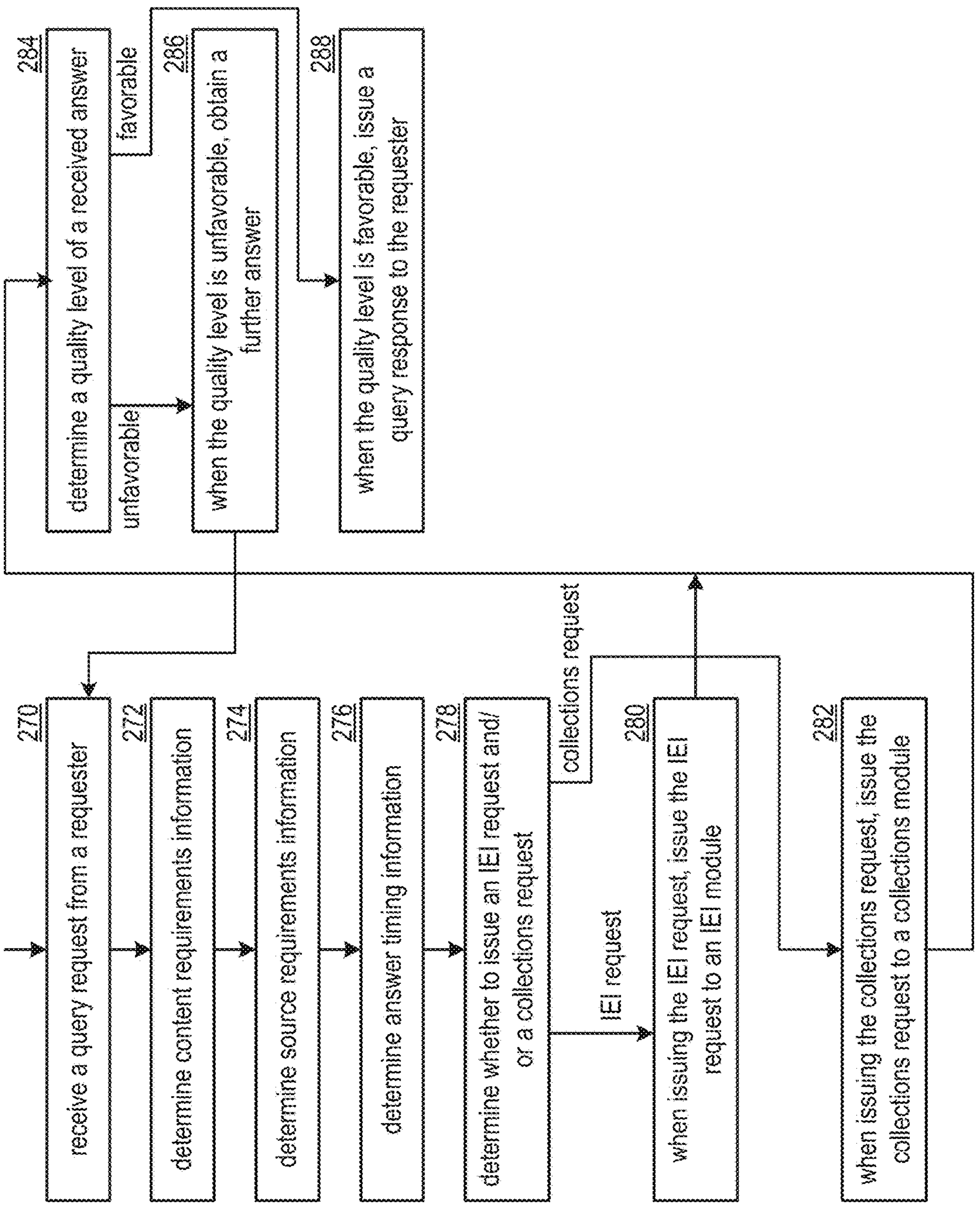
FIG. 5D is a logic diagram of an embodiment of a method for providing a response to a query within a computing system in accordance with the present invention.

FIG. 5D is a logic diagram of an embodiment of a method for providing a response to a query within a computing system. In particular, a method is presented for use in conjunction with one or more functions and features described in conjunction with FIGS. 1-3, 4A-4C, 5C, and also FIG. 5D. The method includes step 270 where a processing module of one or more processing modules of one or more computing devices of the computing system receives a query request (e.g., a question) from a requester. The method continues at step 272 where the processing module determines content requirements information. The determining includes interpreting the query request to produce the content requirements. The method continues at step 274 where the processing module determines source requirements information. The determining includes interpreting the query request to produce the source requirements. The method continues at step 276 where the processing module determines answer timing information. The determining includes interpreting the query request to produce the answer timing information.

The method continues at step 278 the processing module determines whether to issue an IEI request and/or a collections request. For example, the determining includes selecting the IEI request when the answer timing information indicates that a simple one-time answer is appropriate. As another example, the processing module selects the collections request when the answer timing information indicates that the answer is associated with a series of events over an event time frame.

When issuing the IEI request, the method continues at step 280 where the processing module issues the IEI request to an IEI module. The issuing includes generating the IEI request in accordance with security information and based on one or more of the content requirements information, the source requirements information, and the answer timing information.

When issuing the collections request, the method continues at step 282 where the processing module issues the collections request to a collections module. The issuing includes generating the collections request in accordance with the security information and based on one or more of the content requirements information, the source requirements information, and the answer timing information. Alternatively, the processing module issues both the IEI request and the collections request when a satisfactory partial answer may be provided based on a corresponding IEI response and a further more generalized and specific answer may be provided based on a corresponding collections response and associated further IEI response.

The method continues at step 284 where the processing module determines a quality level of a received answer. The determining includes extracting the answer from the collections response and/or the IEI response and interpreting the answer in accordance with one or more of the content requirements information, the source requirements information, the answer timing information, and the query request to produce the quality level. The method branches to step 288 when the quality level is favorable and the method continues to step 286 when the quality level is unfavorable. For example, the processing module indicates that the quality level is favorable when the quality level is equal to or greater than a minimum answer quality threshold level. As another example, the processing module indicates that the quality level is unfavorable when the quality level is less than the minimum answer quality threshold level.

When the quality level is unfavorable, the method continues at step 286 where the processing module obtains a further answer. The obtaining includes at least one of issuing a further IEI request and a further collections request to facilitate obtaining of a further answer for further answer quality level testing as the method loops back to step 270. When the quality level is favorable, the method continues at step 288 where the processing module issues a query response to the requester. The issuing includes transforming the answer into a transformed answer in accordance with an answer transformation approach (e.g., formatting, further interpretations of the virtual question in light of the answer and further knowledge) and sending the transformed answer to the requester as the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5E:
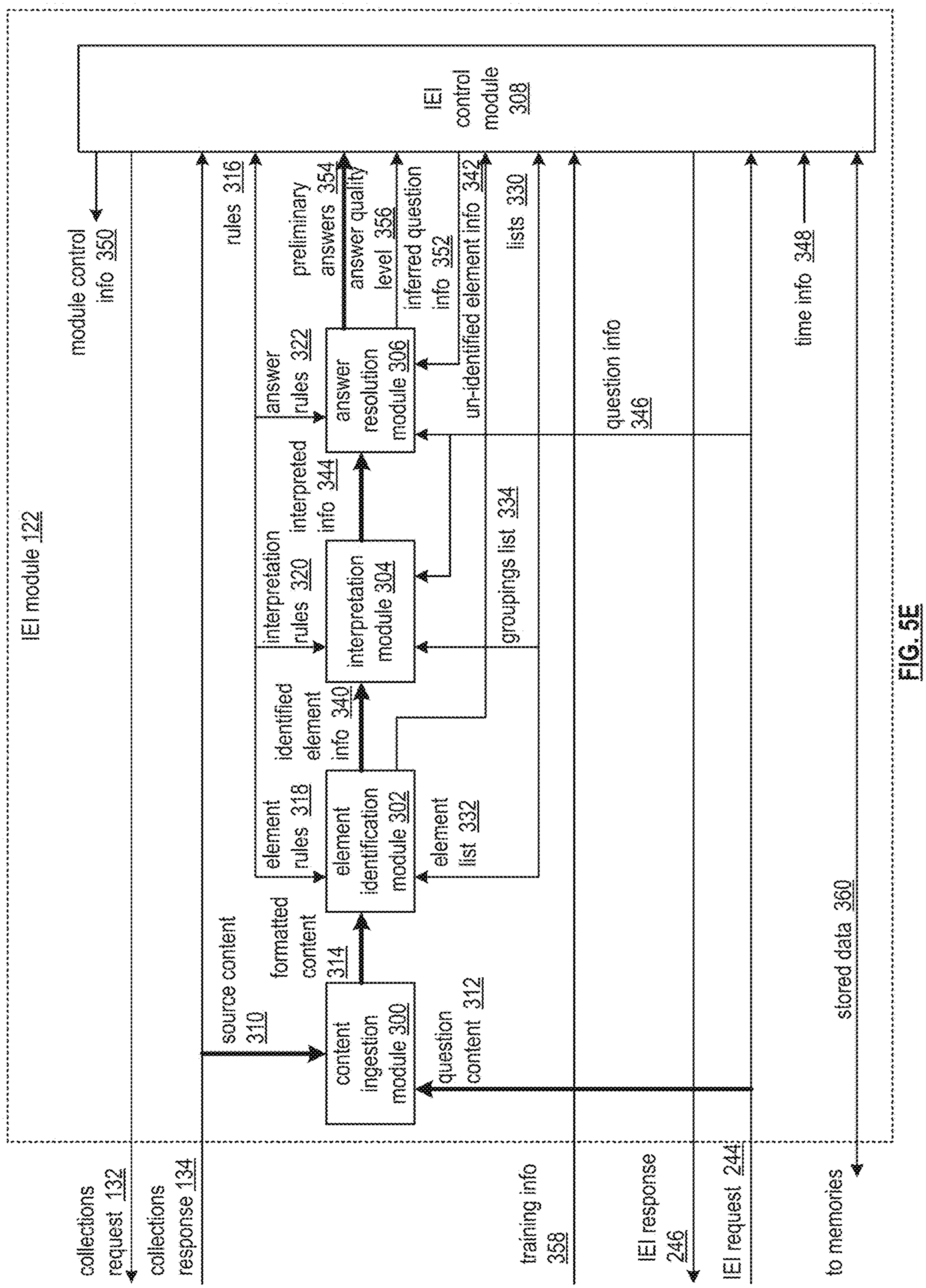
FIG. 5E is a schematic block diagram of an embodiment of an identigen entigen intelligence (IEI) module of a computing system in accordance with the present invention.

FIG. 5E is a schematic block diagram of an embodiment of the identigen entigen intelligence (IEI) module 122 of FIG. 4A that includes a content ingestion module 300, an element identification module 302, and interpretation module 304, and answer resolution module 306, and an IEI control module 308. Generally, an embodiment of this invention presents solutions where the IEI module 122 supports interpreting content to produce knowledge that may be utilized to answer questions.

In an example of operation of the producing and utilizing of the knowledge, the content ingestion module 300 generates formatted content 314 based on question content 312 and/or source content 310, where the IEI module 122 receives an IEI request 244 that includes the question content 312 and the IEI module 122 receives a collections response 134 that includes the source content 310. The source content 310 includes content from a source extracted from the collections response 134. The question content 312 includes content extracted from the IEI request 244 (e.g., content paired with a question). The content ingestion module 300 generates the formatted content 314 in accordance with a formatting approach (e.g., creating proper sentences from words of the content). The formatted content 314 includes modified content that is compatible with subsequent element identification (e.g., complete sentences, combinations of words and interpreted sounds and/or inflection cues with temporal associations of words).

The element identification module 302 processes the formatted content 314 based on element rules 318 and an element list 332 to produce identified element information 340. Rules 316 includes the element rules 318 (e.g., match, partial match, language translation, etc.). Lists 330 includes the element list 332 (e.g., element ID, element context ID, element usage ID, words, characters, symbols etc.). The IEI control module 308 may provide the rules 316 and the lists 330 by accessing stored data 360 from a memory associated with the IEI module 122. Generally, an embodiment of this invention presents solutions where the stored data 360 may further include one or more of a descriptive dictionary, categories, representations of element sets, element list, sequence data, pending questions, pending request, recognized elements, unrecognized elements, errors, etc.

The identified element information 340 includes one or more of identifiers of elements identified in the formatted content 314, may include ordering and/or sequencing and grouping information. For example, the element identification module 302 compares elements of the formatted content 314 to known elements of the element list 332 to produce identifiers of the known elements as the identified element information 340 in accordance with the element rules 318. Alternatively, the element identification module 302 outputs un-identified element information 342 to the IEI control module 308, where the un-identified element information 342 includes temporary identifiers for elements not identifiable from the formatted content 314 when compared to the element list 332.

The interpretation module 304 processes the identified element information 340 in accordance with interpretation rules 320 (e.g., potentially valid permutations of various combinations of identified elements), question information 346 (e.g., a question extracted from the IEI request to hundred 44 which may be paired with content associated with the question), and a groupings list 334 (e.g., representations of associated groups of representations of things, a set of element identifiers, valid element usage IDs in accordance with similar, an element context, permutations of sets of identifiers for possible interpretations of a sentence or other) to produce interpreted information 344. The interpreted information 344 includes potentially valid interpretations of combinations of identified elements. Generally, an embodiment of this invention presents solutions where the interpretation module 304 supports producing the interpreted information 344 by considering permutations of the identified element information 340 in accordance with the interpretation rules 320 and the groupings list 334.

The answer resolution module 306 processes the interpreted information 344 based on answer rules 322 (e.g., guidance to extract a desired answer), the question information 346, and inferred question information 352 (e.g., posed by the IEI control module or analysis of general collections of content or refinement of a stated question from a request) to produce preliminary answers 354 and an answer quality level 356. The answer generally lies in the interpreted information 344 as both new content received and knowledge based on groupings list 334 generated based on previously received content. The preliminary answers 354 includes an answer to a stated or inferred question that subject further refinement. The answer quality level 356 includes a determination of a quality level of the preliminary answers 354 based on the answer rules 322. The inferred question information 352 may further be associated with time information 348, where the time information includes one or more of current real-time, a time reference associated with entity submitting a request, and a time reference of a collections response.

When the IEI control module 308 determines that the answer quality level 356 is below an answer quality threshold level, the IEI control module 308 facilitates collecting of further content (e.g., by issuing a collections request 132 and receiving corresponding collections responses 134 for analysis). When the answer quality level 356 compares favorably to the answer quality threshold level, the IEI control module 308 issues an IEI response 246 based on the preliminary answers 354. When receiving training information 358, the IEI control module 308 facilitates updating of one or more of the lists 330 and the rules 316 and stores the updated list 330 and the updated rules 316 in the memories as updated stored data 360.

Figure 5F:
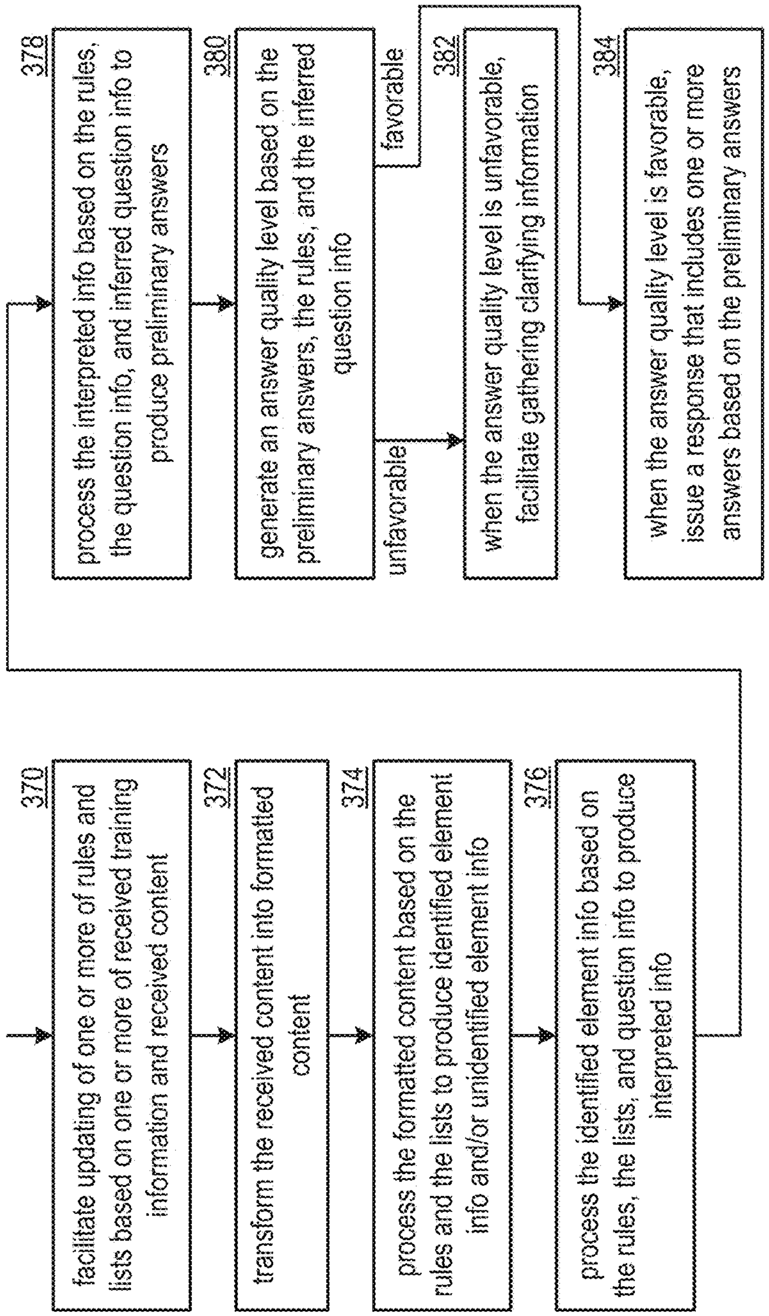
FIG. 5F is a logic diagram of an embodiment of a method for analyzing content within a computing system in accordance with the present invention.

FIG. 5F is a logic diagram of an embodiment of a method for analyzing content within a computing system. In particular, a method is presented for use in conjunction with one or more functions and features described in conjunction with FIGS. 1-3, 4A-4C, 5E, and also FIG. 5F. The method includes step 370 where a processing module of one or more processing modules of one or more computing devices of the computing system facilitates updating of one or more rules and lists based on one or more of received training information and received content. For example, the processing module updates rules with received rules to produce updated rules and updates element lists with received elements to produce updated element lists. As another example, the processing module interprets the received content to identify a new word for at least temporary inclusion in the updated element list.

The method continues at step 372 where the processing module transforms at least some of the received content into formatted content. For example, the processing module processes the received content in accordance with a transformation approach to produce the formatted content, where the formatted content supports compatibility with subsequent element identification (e.g., typical sentence structures of groups of words).

The method continues at step 374 where the processing module processes the formatted content based on the rules and the lists to produce identified element information and/or an identified element information. For example, the processing module compares the formatted content to element lists to identify a match producing identifiers for identified elements or new identifiers for unidentified elements when there is no match.

The method continues at step 376 with a processing module processes the identified element information based on rules, the lists, and question information to produce interpreted information. For example, the processing module compares the identified element information to associated groups of representations of things to generate potentially valid interpretations of combinations of identified elements.

The method continues at step 378 where the processing module processes the interpreted information based on the rules, the question information, and inferred question information to produce preliminary answers. For example, the processing module matches the interpreted information to one or more answers (e.g., embedded knowledge based on a fact base built from previously received content) with highest correctness likelihood levels that is subject to further refinement.

The method continues at step 380 where the processing module generates an answer quality level based on the preliminary answers, the rules, and the inferred question information. For example, the processing module predicts the answer correctness likelihood level based on the rules, the inferred question information, and the question information. The method branches to step 384 when the answer quality level is favorable and the method continues to step 382 when the answer quality level is unfavorable. For example, the generating of the answer quality level further includes the processing module indicating that the answer quality level is favorable when the answer quality level is greater than or equal to a minimum answer quality threshold level. As another example, the generating of the answer quality level further includes the processing module indicating that the answer quality level is unfavorable when the answer quality level is less than the minimum answer quality threshold level.

When the answer quality level is unfavorable, the method continues at step 382 where the processing module facilitates gathering clarifying information. For example, the processing module issues a collections request to facilitate receiving further content and or request question clarification from a question requester. When the answer quality level is favorable, the method continues at step 384 where the processing module issues a response that includes one or more answers based on the preliminary answers and/or further updated preliminary answers based on gathering further content. For example, the processing module generates a response that includes one or more answers and the answer quality level and issues the response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6A:
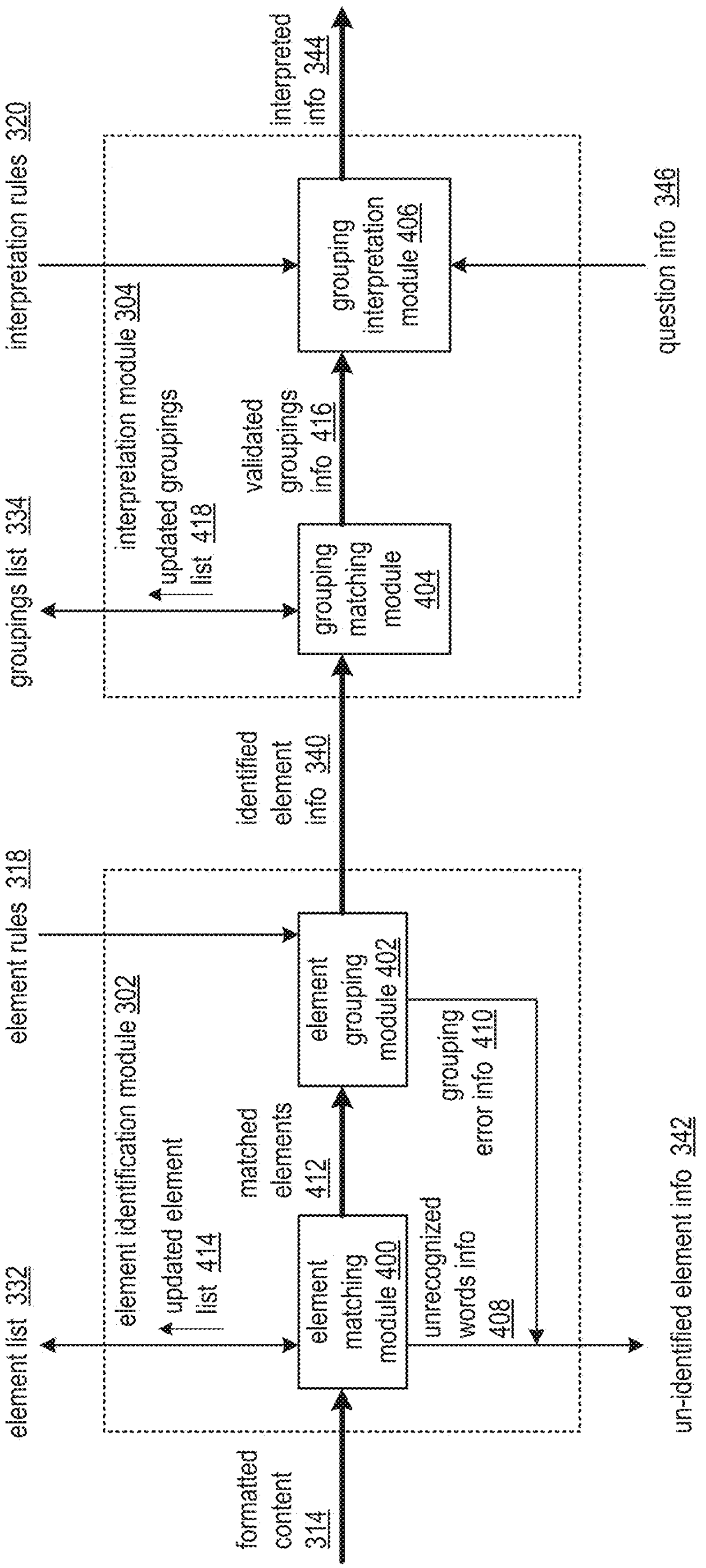
FIG. 6A is a schematic block diagram of an embodiment of an element identification module and an interpretation module of a computing system in accordance with the present invention.

FIG. 6A is a schematic block diagram of an embodiment of the element identification module 302 of FIG. 5A and the interpretation module 304 of FIG. 5A. The element identification module 302 includes an element matching module 400 and an element grouping module 402. The interpretation module 304 includes a grouping matching module 404 and a grouping interpretation module 406. Generally, an embodiment of this invention presents solutions where the element identification module 302 supports identifying potentially valid permutations of groupings of elements while the interpretation module 304 interprets the potentially valid permutations of groupings of elements to produce interpreted information that includes the most likely of groupings based on a question.

In an example of operation of the identifying of the potentially valid permutations of groupings of elements, when matching elements of the formatted content 314, the element matching module 400 generates matched elements 412 (e.g., identifiers of elements contained in the formatted content 314) based on the element list 332. For example, the element matching module 400 matches a received element to an element of the element list 332 and outputs the matched elements 412 to include an identifier of the matched element. When finding elements that are unidentified, the element matching module 400 outputs unrecognized words information 408 (e.g., words not in the element list 332, may temporarily add) as part of un-identified element information 342. For example, the element matching module 400 indicates that a match cannot be made between a received element of the formatted content 314, generates the unrecognized words info 408 to include the received element and/or a temporary identifier, and issues and updated element list 414 that includes the temporary identifier and the corresponding unidentified received element.

The element grouping module 402 analyzes the matched elements 412 in accordance with element rules 318 to produce grouping error information 410 (e.g., incorrect sentence structure indicators) when a structural error is detected. The element grouping module 402 produces identified element information 340 when favorable structure is associated with the matched elements in accordance with the element rules 318. The identified element information 340 may further include grouping information of the plurality of permutations of groups of elements (e.g., several possible interpretations), where the grouping information includes one or more groups of words forming an associated set and/or super-group set of two or more subsets when subsets share a common core element.

In an example of operation of the interpreting of the potentially valid permutations of groupings of elements to produce the interpreted information, the grouping matching module 404 analyzes the identified element information 340 in accordance with a groupings list 334 to produce validated groupings information 416. For example, the grouping matching module 404 compares a grouping aspect of the identified element information 340 (e.g., for each permutation of groups of elements of possible interpretations), generates the validated groupings information 416 to include identification of valid permutations aligned with the groupings list 334. Alternatively, or in addition to, the grouping matching module 404 generates an updated groupings list 418 when determining a new valid grouping (e.g., has favorable structure and interpreted meaning) that is to be added to the groupings list 334.

The grouping interpretation module 406 interprets the validated groupings information 416 based on the question information 346 and in accordance with the interpretation rules 320 to produce interpreted information 344 (e.g., most likely interpretations, next most likely interpretations, etc.). For example, the grouping interpretation module 406 obtains context, obtains favorable historical interpretations, processes the validated groupings based on interpretation rules 320, where each interpretation is associated with a correctness likelihood level.

Figure 6B:
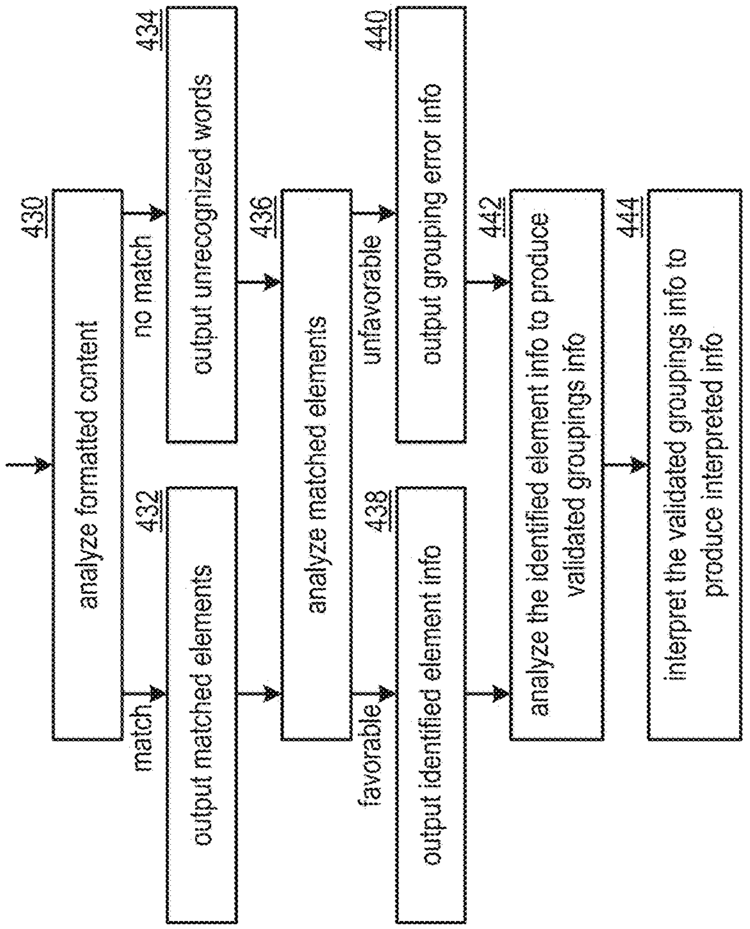
FIG. 6B is a logic diagram of an embodiment of a method for interpreting information within a computing system in accordance with the present invention.

FIG. 6B is a logic diagram of an embodiment of a method for interpreting information within a computing system. In particular, a method is presented for use in conjunction with one or more functions and features described in conjunction with FIGS. 1-3, 4A-4C, 5E-5F, 6A, and also FIG. 6B. The method includes step 430 where a processing module of one or more processing modules of one or more computing devices of the computing system analyzes formatted content. For example, the processing module attempt to match a received element of the formatted content to one or more elements of an elements list. When there is no match, the method branches to step 434 and when there is a match, the method continues to step 432. When there is a match, the method continues at step 432 where the processing module outputs matched elements (e.g., to include the matched element and/or an identifier of the matched element). When there is no match, the method continues at step 434 where the processing module outputs unrecognized words (e.g., elements and/or a temporary identifier for the unmatched element).

The method continues at step 436 where the processing module analyzes matched elements. For example, the processing module attempt to match a detected structure of the matched elements (e.g., chained elements as in a received sequence) to favorable structures in accordance with element rules. The method branches to step 440 when the analysis is unfavorable and the method continues to step 438 when the analysis is favorable. When the analysis is favorable matching a detected structure to the favorable structure of the element rules, the method continues at step 438 where the processing module outputs identified element information (e.g., an identifier of the favorable structure, identifiers of each of the detected elements). When the analysis is unfavorable matching a detected structure to the favorable structure of the element rules, the method continues at step 440 where the processing module outputs grouping error information (e.g., a representation of the incorrect structure, identifiers of the elements of the incorrect structure, a temporary new identifier of the incorrect structure).

The method continues at step 442 where the processing module analyzes the identified element information to produce validated groupings information. For example, the processing module compares a grouping aspect of the identified element information and generates the validated groupings information to include identification of valid permutations that align with the groupings list. Alternatively, or in addition to, the processing module generates an updated groupings list when determining a new valid grouping.

The method continues at step 444 where the processing module interprets the validated groupings information to produce interpreted information. For example, the processing module obtains one or more of context and historical interpretations and processes the validated groupings based on interpretation rules to generate the interpreted information, where each interpretation is associated with a correctness likelihood level (e.g., a quality level).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6C:
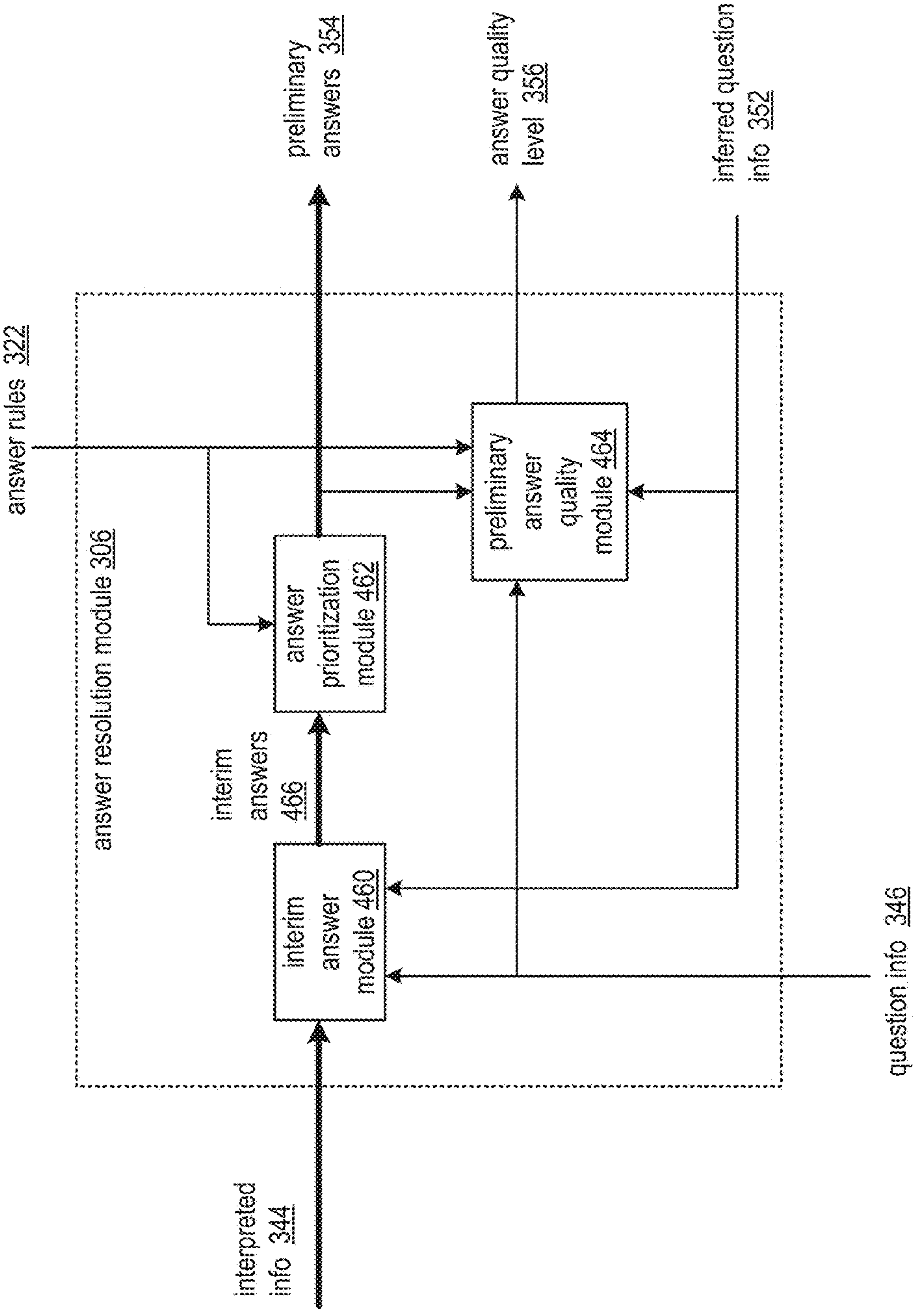
FIG. 6C is a schematic block diagram of an embodiment of an answer resolution module of a computing system in accordance with the present invention.

FIG. 6C is a schematic block diagram of an embodiment of the answer resolution module 306 of FIG. 5A that includes an interim answer module 460, and answer prioritization module 462, and a preliminary answer quality module 464. Generally, an embodiment of this invention presents solutions where the answer resolution module 306 supports producing an answer for interpreted information 344.

In an example of operation of the providing of the answer, the interim answer module 460 analyzes the interpreted information 344 based on question information 346 and inferred question information 352 to produce interim answers 466 (e.g., answers to stated and/or inferred questions without regard to rules that is subject to further refinement). The answer prioritization module 462 analyzes the interim answers 466 based on answer rules 322 to produce preliminary answer 354. For example, the answer prioritization module 462 identifies all possible answers from the interim answers 466 that conform to the answer rules 322.

The preliminary answer quality module 464 analyzes the preliminary answers 354 in accordance with the question information 346, the inferred question information 352, and the answer rules 322 to produce an answer quality level 356. For example, for each of the preliminary answers 354, the preliminary answer quality module 464 may compare a fit of the preliminary answer 354 to a corresponding previous answer and question quality level, calculate the answer quality level 356 based on a level of conformance to the answer rules 322, calculate the answer quality level 356 based on alignment with the inferred question information 352, and determine the answer quality level 356 based on an interpreted correlation with the question information 346.

Figure 6D:
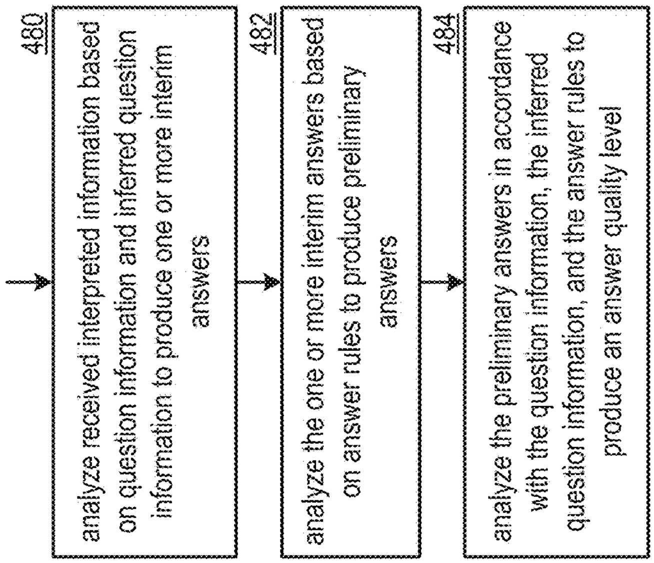
FIG. 6D is a logic diagram of an embodiment of a method for producing an answer within a computing system in accordance with the present invention.

FIG. 6D is a logic diagram of an embodiment of a method for producing an answer within a computing system. In particular, a method is presented for use in conjunction with one or more functions and features described in conjunction with FIGS. 1-3, 4A-4C, 5E-5F, 6C, and also FIG. 6D. The method includes step 480 where a processing module of one or more processing modules of one or more computing devices of the computing system analyzes received interpreted information based on question information and inferred question information to produce one or more interim answers. For example, the processing module generates potential answers based on patterns consistent with previously produced knowledge and likelihood of correctness.

The method continues at step 482 where the processing module analyzes the one or more interim answers based on answer rules to produce preliminary answers. For example, the processing module identifies all possible answers from the interim answers that conform to the answer rules. The method continues at step 484 where the processing module analyzes the preliminary answers in accordance with the question information, the inferred question information, and the answer rules to produce an answer quality level. For example, for each of the elementary answers, the processing module may compare a fit of the preliminary answer to a corresponding previous answer-and-answer quality level, calculate the answer quality level based on performance to the answer rules, calculate answer quality level based on alignment with the inferred question information, and determine the answer quality level based on interpreted correlation with the question information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 7A:
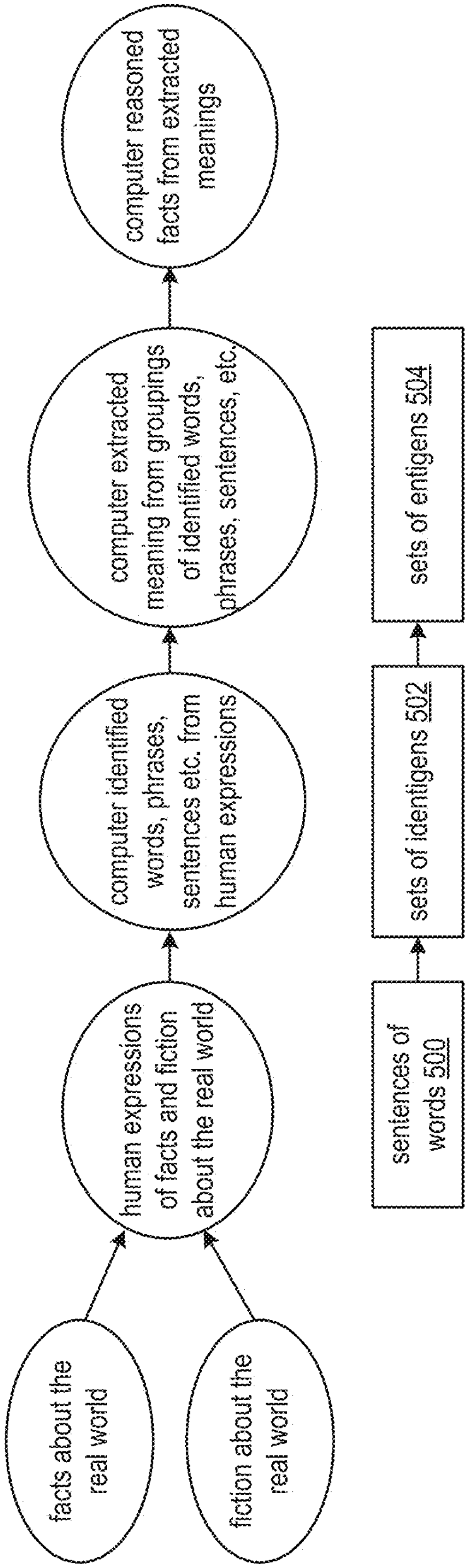
FIG. 7A is an information flow diagram for interpreting information within a computing system in accordance with the present invention.

FIG. 7A is an information flow diagram for interpreting information within a computing system, where sets of entigens 504 are interpreted from sets of identigens 502 which are interpreted from sentences of words 500. Such identigen entigen intelligence (IEI) processing of the words (e.g., to IEI process) includes producing one or more of interim knowledge, a preliminary answer, and an answer quality level. For example, the IEI processing includes identifying permutations of identigens of a phrase of a sentence (e.g., interpreting human expressions to produce identigen groupings for each word of ingested content), reducing the permutations of identigens (e.g., utilizing rules to eliminate unfavorable permutations), mapping the reduced permutations of identigens to at least one set of entigens (e.g., most likely identigens become the entigens) to produce the interim knowledge, processing the knowledge in accordance with a knowledge database (e.g., comparing the set of entigens to the knowledge database) to produce a preliminary answer, and generating the answer quality level based on the preliminary answer for a corresponding domain.

Human expressions are utilized to portray facts and fiction about the real world. The real-world includes items, actions, and attributes. The human expressions include textual words, textual symbols, images, and other sensorial information (e.g., sounds). It is known that many words, within a given language, can mean different things based on groupings and orderings of the words. For example, the sentences of words 500 can include many different forms of sentences that mean vastly different things even when the words are very similar.

The present invention presents solutions where the computing system 10 supports producing a computer-based representation of a truest meaning possible of the human expressions given the way that multitudes of human expressions relate to these meanings. As a first step of the flow diagram to transition from human representations of things to a most precise computer representation of the things, the computer identifies the words, phrases, sentences, etc. from the human expressions to produce the sets of identigens 502. Each identigen includes an identifier of their meaning and an identifier of an instance for each possible language, culture, etc. For example, the words car and automobile share a common meaning identifier but have different instance identifiers since they are different words and are spelled differently. As another example, the word duck is associated both with a bird and an action to elude even though they are spelled the same. In this example the bird duck has a different meaning than the elude duck and as such each has a different meaning identifier of the corresponding identigens.

As a second step of the flow diagram to transition from human representations of things to the most precise computer representation of the things, the computer extracts meaning from groupings of the identified words, phrases, sentences, etc. to produce the sets of entigens 504. Each entigen includes an identifier of a single conceivable and perceivable thing in space and time (e.g., independent of language and other aspects of the human expressions). For example, the words car and automobile are different instances of the same meaning and point to a common shared entigen. As another example, the word duck for the bird meaning has an associated unique entigen that is different than the entigen for the word duck for the elude meaning.

As a third step of the flow diagram to transition from human expressions of things to the most precise computer representation of the things, the computer reasons facts from the extracted meanings. For example, the computer maintains a fact-based of the valid meanings from the valid groupings or sets of entigens so as to support subsequent inferences, deductions, rationalizations of posed questions to produce answers that are aligned with a most factual view. As time goes on, and as an entigen has been identified, it can encounter an experience transformations in time, space, attributes, actions, and words which are used to identify it without creating contradictions or ever losing its identity.

Figure 7B:
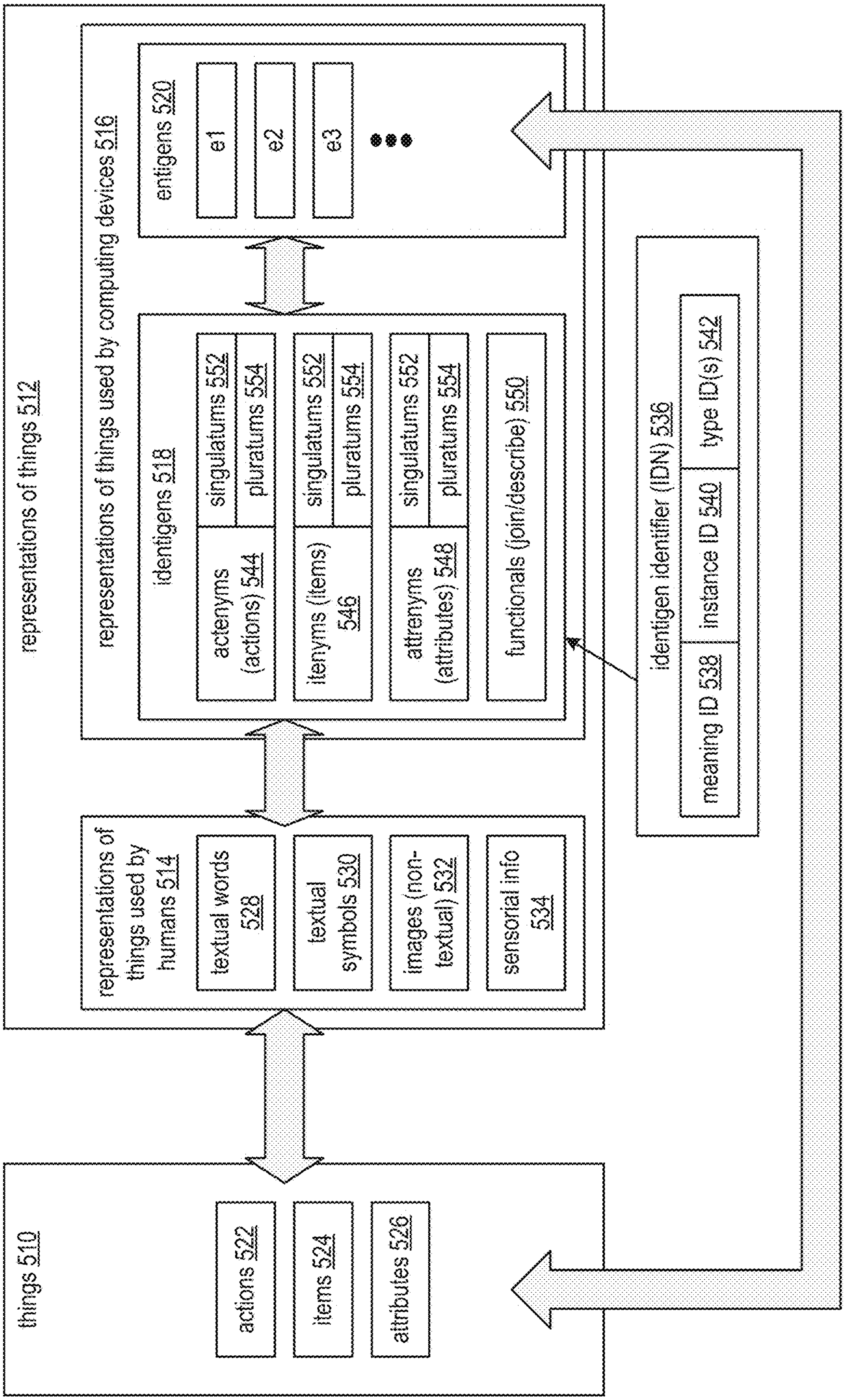
FIG. 7B is a relationship block diagram illustrating an embodiment of relationships between things and representations of things within a computing system in accordance with the present invention.

FIG. 7B is a relationship block diagram illustrating an embodiment of relationships between things 510 and representations of things 512 within a computing system. The things 510 includes conceivable and perceivable things including actions 522, items 524, and attributes 526. The representation of things 512 includes representations of things used by humans 514 and representation of things used by computing devices 516 of embodiments of the present invention. The things 510 relates to the representations of things used by humans 514 where the invention presents solutions where the computing system 10 supports mapping the representations of things used by humans 514 to the representations of things used by computing devices 516, where the representations of things used by computing devices 516 map back to the things 510.

The representations of things used by humans 514 includes textual words 528, textual symbols 530, images (e.g., non-textual) 532, and other sensorial information 534 (e.g., sounds, sensor data, electrical fields, voice inflections, emotion representations, facial expressions, whistles, etc.). The representations of things used by computing devices 516 includes identigens 518 and entigens 520. The representations of things used by humans 514 maps to the identigens 518 and the identigens 518 map to the entigens 520. The entigens 520 uniquely maps back to the things 510 in space and time, a truest meaning the computer is looking for to create knowledge and answer questions based on the knowledge.

To accommodate the mapping of the representations of things used by humans 514 to the identigens 518, the identigens 518 is partitioned into actenyms 544 (e.g., actions), itenyms 546 (e.g., items), attrenyms 548 (e.g., attributes), and functionals 550 (e.g., that join and/or describe). Each of the actenyms 544, itenyms 546, and attrenyms 548 may be further classified into singulatums 552 (e.g., identify one unique entigen) and pluratums 554 (e.g., identify a plurality of entigens that have similarities).

Each identigen 518 is associated with an identigens identifier (IDN) 536. The IDN 536 includes a meaning identifier (ID) 538 portion, an instance ID 540 portion, and a type ID 542 portion. The meaning ID 538 includes an identifier of common meaning. The instance ID 540 includes an identifier of a particular word and language. The type ID 542 includes one or more identifiers for actenyms, itenyms, attrenyms, singulatums, pluratums, a time reference, and any other reference to describe the IDN 536. The mapping of the representations of things used by humans 514 to the identigens 518 by the computing system of the present invention includes determining the identigens 518 in accordance with logic and instructions for forming groupings of words.

Generally, an embodiment of this invention presents solutions where the identigens 518 map to the entigens 520. Multiple identigens may map to a common unique entigen. The mapping of the identigens 518 to the entigens 520 by the computing system of the present invention includes determining entigens in accordance with logic and instructions for forming groupings of identigens.

FIG. 7C is a diagram of an embodiment of a synonym words table 570 within a computing system, where the synonym words table 570 includes multiple fields including textual words 572, identigens 518, and entigens 520. The identigens 518 includes fields for the meaning identifier (ID) 538 and the instance ID 540. The computing system of the present invention may utilize the synonym words table 570 to map textual words 572 to identigens 518 and map the identigens 518 to entigens 520. For example, the words car, automobile, auto, bil (Swedish), carro (Spanish), and bil (Danish) all share a common meaning but are different instances (e.g., different words and languages). The words map to a common meaning ID but to individual unique instant identifiers. Each of the different identigens map to a common entigen since they describe the same thing.

FIG. 7D is a diagram of an embodiment of a polysemous words table 576 within a computing system, where the polysemous words table 576 includes multiple fields including textual words 572, identigens 518, and entigens 520. The identigens 518 includes fields for the meaning identifier (ID) 538 and the instance ID 540. The computing system of the present invention may utilize the polysemous words table 576 to map textual words 572 to identigens 518 and map the identigens 518 to entigens 520. For example, the word duck maps to four different identigens since the word duck has four associated different meanings (e.g., bird, fabric, to submerge, to elude) and instances. Each of the identigens represent different things and hence map to four different entigens.

FIG. 7E is a diagram of an embodiment of transforming words into groupings within a computing system that includes a words table 580, a groupings of words section to validate permutations of groupings, and a groupings table 584 to capture the valid groupings. The words table 580 includes multiple fields including textual words 572, identigens 518, and entigens 520. The identigens 518 includes fields for the meaning identifier (ID) 538, the instance ID 540, and the type ID 542. The computing system of the present invention may utilize the words table 580 to map textual words 572 to identigens 518 and map the identigens 518 to entigens 520. For example, the word pilot may refer to a flyer and the action to fly. Each meaning has a different identigen and different entigen.

The computing system the present invention may apply rules to the fields of the words table 580 to validate various groupings of words. Those that are invalid are denoted with an "X" while those that are valid are associated with a check mark. For example, the grouping "pilot Tom" is invalid when the word pilot refers to flying and Tom refers to a person. The identigen combinations for the flying pilot and the person Tom are denoted as invalid by the rules. As another example, the grouping "pilot Tom" is valid when the word pilot refers to a flyer and Tom refers to the person. The identigen combinations for the flyer pilot and the person Tom are denoted as valid by the rules.

The groupings table 584 includes multiple fields including grouping ID 586, word strings 588, identigens 518, and entigens 520. The computing system of the present invention may produce the groupings table 584 as a stored fact base for valid and/or invalid groupings of words identified by their corresponding identigens. For example, the valid grouping "pilot Tom" referring to flyer Tom the person is represented with a grouping identifier of 3001 and identity and identifiers 150.001 and 457.001. The entigen field 520 may indicate associated entigens that correspond to the identigens. For example, entigen e717 corresponds to the flyer pilot meaning and entigen e61 corresponds to the time the person meaning. Alternatively, or in addition to, the entigen field 520 may be populated with a single entigen identifier (ENI).

The word strings field 588 may include any number of words in a string. Different ordering of the same words can produce multiple different strings and even different meanings and hence entigens. More broadly, each entry (e.g., role) of the groupings table 584 may refer to groupings of words, two or more word strings, an idiom, just identigens, just entigens, and/or any combination of the preceding elements. Each entry has a unique grouping identifier. An idiom may have a unique grouping ID and include identifiers of original word identigens and replacing identigens associated with the meaning of the idiom not just the meaning of the original words. Valid groupings may still have ambiguity on their own and may need more strings and/or context to select a best fit when interpreting a truest meaning of the grouping.

Figure 8A:
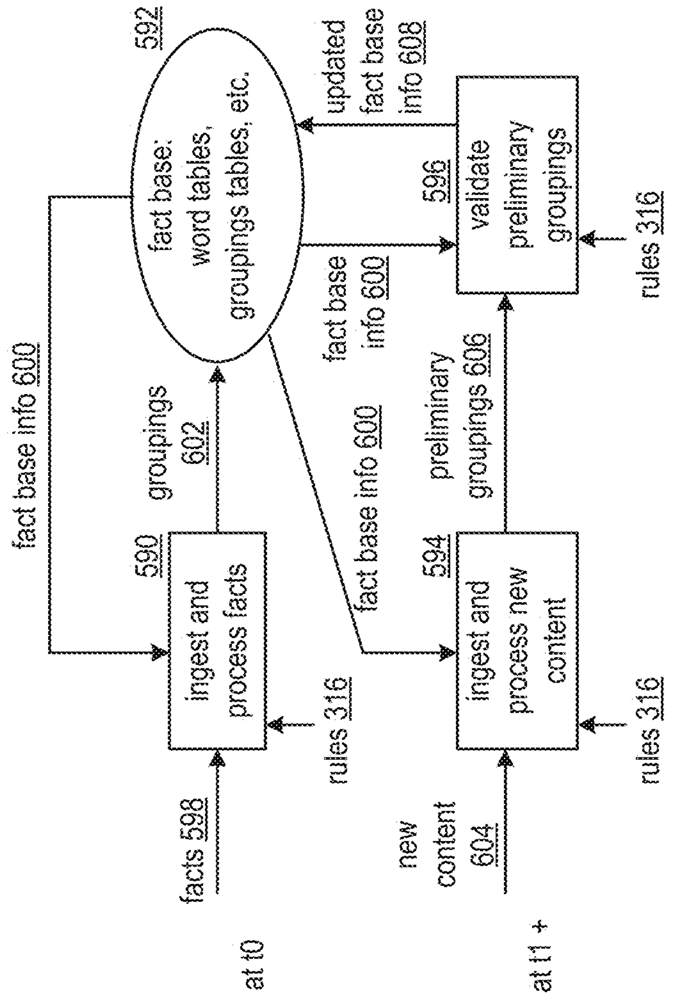
FIG. 8A is a data flow diagram for accumulating knowledge within a computing system in accordance with the present invention.

FIG. 8A is a data flow diagram for accumulating knowledge within a computing system, where a computing device, at a time=t0, ingests and processes facts 598 at a step 590 based on rules 316 and fact base information 600 to produce groupings 602 for storage in a fact base 592 (e.g., words, phrases, word groupings, identigens, entigens, quality levels). The facts 598 may include information from books, archive data, Central intelligence agency (CIA) world fact book, trusted content, etc. The ingesting may include filtering to organize and promote better valid groupings detection (e.g., considering similar domains together). The groupings 602 includes one or more of groupings identifiers, identigen identifiers, entigen identifiers, and estimated fit quality levels. The processing step 590 may include identifying identigens from words of the facts 598 in accordance with the rules 316 and the fact base info 600 and identifying groupings utilizing identigens in accordance with rules 316 and fact base info 600.

Subsequent to ingestion and processing of the facts 598 to establish the fact base 592, at a time=t1+, the computing device ingests and processes new content 604 at a step 594 in accordance with the rules 316 and the fact base information 600 to produce preliminary grouping 606. The new content may include updated content (e.g., timewise) from periodicals, newsfeeds, social media, etc. The preliminary grouping 606 includes one or more of preliminary groupings identifiers, preliminary identigen identifiers, preliminary entigen identifiers, estimated fit quality levels, and representations of unidentified words.

The computing device validates the preliminary groupings 606 at a step 596 based on the rules 316 and the fact base info 600 to produce updated fact base info 608 for storage in the fact base 592. The validating includes one or more of reasoning a fit of existing fact base info 600 with the new preliminary grouping 606, discarding preliminary groupings, updating just time frame information associated with an entry of the existing fact base info 600 (e.g., to validate knowledge for the present), creating new entigens, and creating a median entigen to summarize portions of knowledge within a median indicator as a quality level indicator (e.g., suggestive not certain).

Storage of the updated fact base information 608 captures patterns that develop by themselves instead of searching for patterns as in prior art artificial intelligence systems. Growth of the fact base 592 enables subsequent reasoning to create new knowledge including deduction, induction, inference, and inferential sentiment (e.g., a chain of sentiment sentences). Examples of sentiments includes emotion, beliefs, convictions, feelings, judgments, notions, opinions, and views.

FIG. 8B is a diagram of an embodiment of a groupings table 620 within a computing system. The groupings table 620 includes multiple fields including grouping ID 586, word strings 588, an IF string 622 and a THEN string 624. Each of the fields for the IF string 622 and the THEN string 624 includes fields for an identigen (IDN) string 626, and an entigen (ENI) string 628. The computing system of the present invention may produce the groupings table 620 as a stored fact base to enable IF THEN based inference to generate a new knowledge inference 630.

As a specific example, grouping 5493 points out the logic of IF someone has a tumor, THEN someone is sick and the grouping 5494 points of the logic that IF someone is sick, THEN someone is sad. As a result of utilizing inference, the new knowledge inference 630 may produce grouping 5495 where IF someone has a tumor, THEN someone is possibly sad (e.g., or is sad).

Figure 8C:
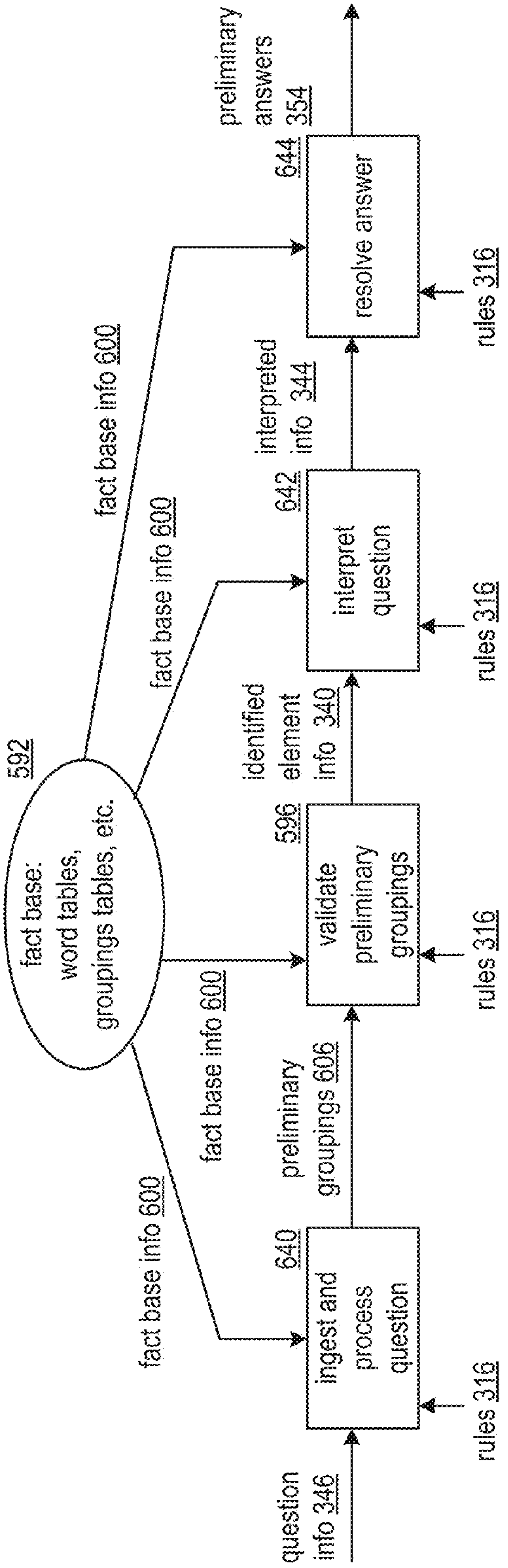
FIG. 8C is a data flow diagram for answering questions utilizing accumulated knowledge within a computing system in accordance with the present invention.

FIG. 8C is a data flow diagram for answering questions utilizing accumulated knowledge within a computing system, where a computing device ingests and processes question information 346 at a step 640 based on rules 316 and fact base info 600 from a fact base 592 to produce preliminary grouping 606. The ingesting and processing questions step 640 includes identifying identigens from words of a question in accordance with the rules 316 and the fact base information 600 and may also include identifying groupings from the identified identigens in accordance with the rules 316 and the fact base information 600.

The computing device validates the preliminary grouping 606 at a step 596 based on the rules 316 and the fact base information 600 to produce identified element information 340. For example, the computing device reasons fit of existing fact base information with new preliminary groupings 606 to produce the identified element information 340 associated with highest quality levels. The computing device interprets a question of the identified element information 340 at a step 642 based on the rules 316 and the fact base information 600. The interpreting of the question may include separating new content from the question and reducing the question based on the fact base information 600 and the new content.

The computing device produces preliminary answers 354 from the interpreted information 344 at a resolve answer step 644 based on the rules 316 and the fact base information 600. For example, the computing device compares the interpreted information 344 two the fact base information 600 to produce the preliminary answers 354 with highest quality levels utilizing one or more of deduction, induction, inferencing, and applying inferential sentiments logic. Alternatively, or in addition to, the computing device may save new knowledge identified from the question information 346 to update the fact base 592.

Figure 8D:
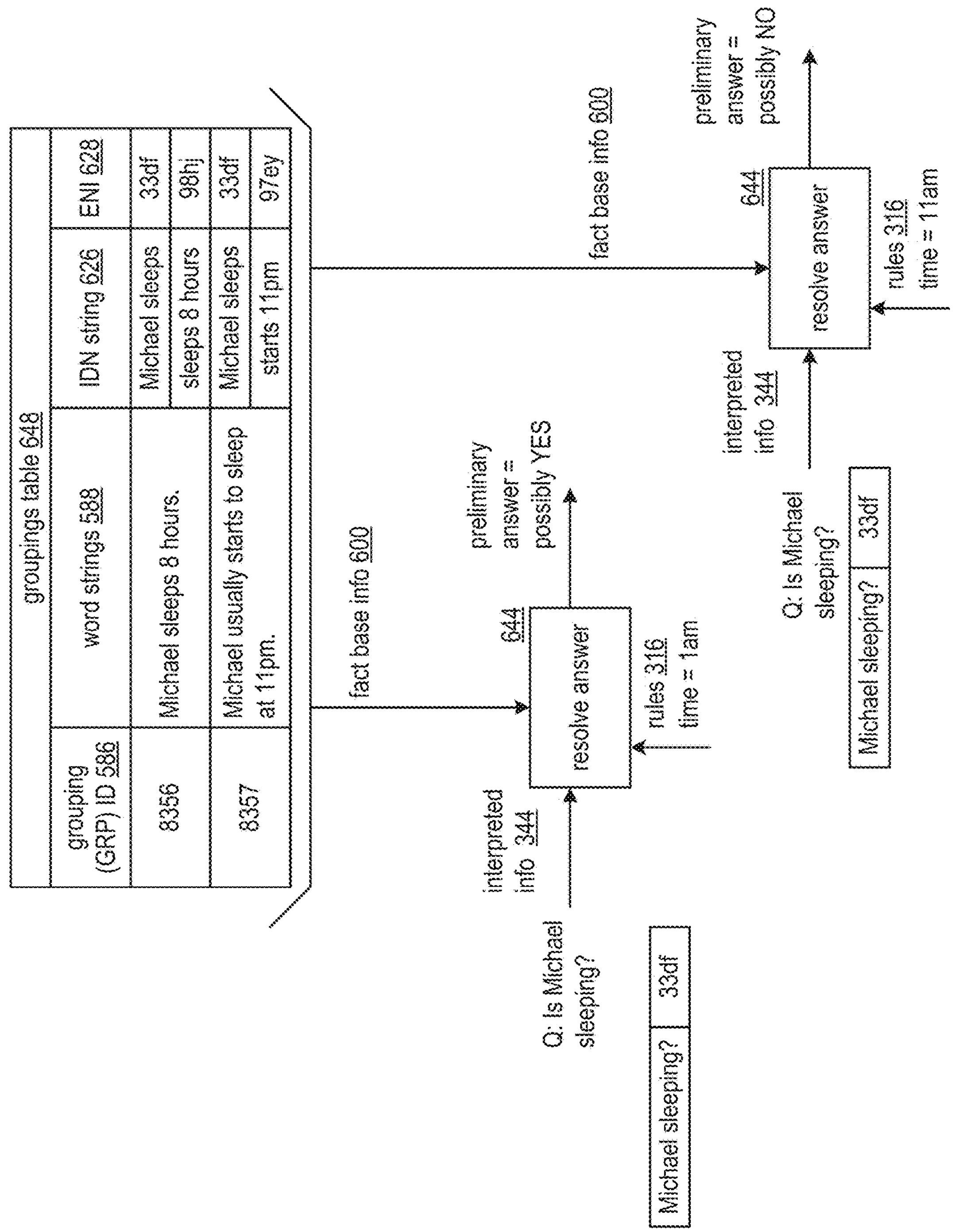
FIG. 8D is a data flow diagram for answering questions utilizing interference within a computing system in accordance with the present invention.

FIG. 8D is a data flow diagram for answering questions utilizing interference within a computing system that includes a groupings table 648 and the resolve answer step 644 of FIG. 8C. The groupings table 648 includes multiple fields including fields for a grouping (GRP) identifier (ID) 586, word strings 588, an identigen (IDN) string 626, and an entigen (ENI) 628. The groupings table 648 may be utilized to build a fact base to enable resolving a future question into an answer. For example, the grouping 8356 notes knowledge that Michael sleeps eight hours and grouping 8357 notes that Michael usually starts to sleep at 11 PM.

In a first question example that includes a question "Michael sleeping?", the resolve answer step 644 analyzes the question from the interpreted information 344 in accordance with the fact base information 600, the rules 316, and a real-time indicator that the current time is 1 AM to produce a preliminary answer of "possibly YES" when inferring that Michael is probably sleeping at 1 AM when Michael usually starts sleeping at 11 PM and Michael usually sleeps for a duration of eight hours.

In a second question example that includes the question "Michael sleeping?", the resolve answer step 644 analyzes the question from the interpreted information 344 in accordance with the fact base information 600, the rules 316, and a real-time indicator that the current time is now 11 AM to produce a preliminary answer of "possibly NO" when inferring that Michael is probably not sleeping at 11 AM when Michael usually starts sleeping at 11 PM and Michael usually sleeps for a duration of eight hours.

Figure 8E:
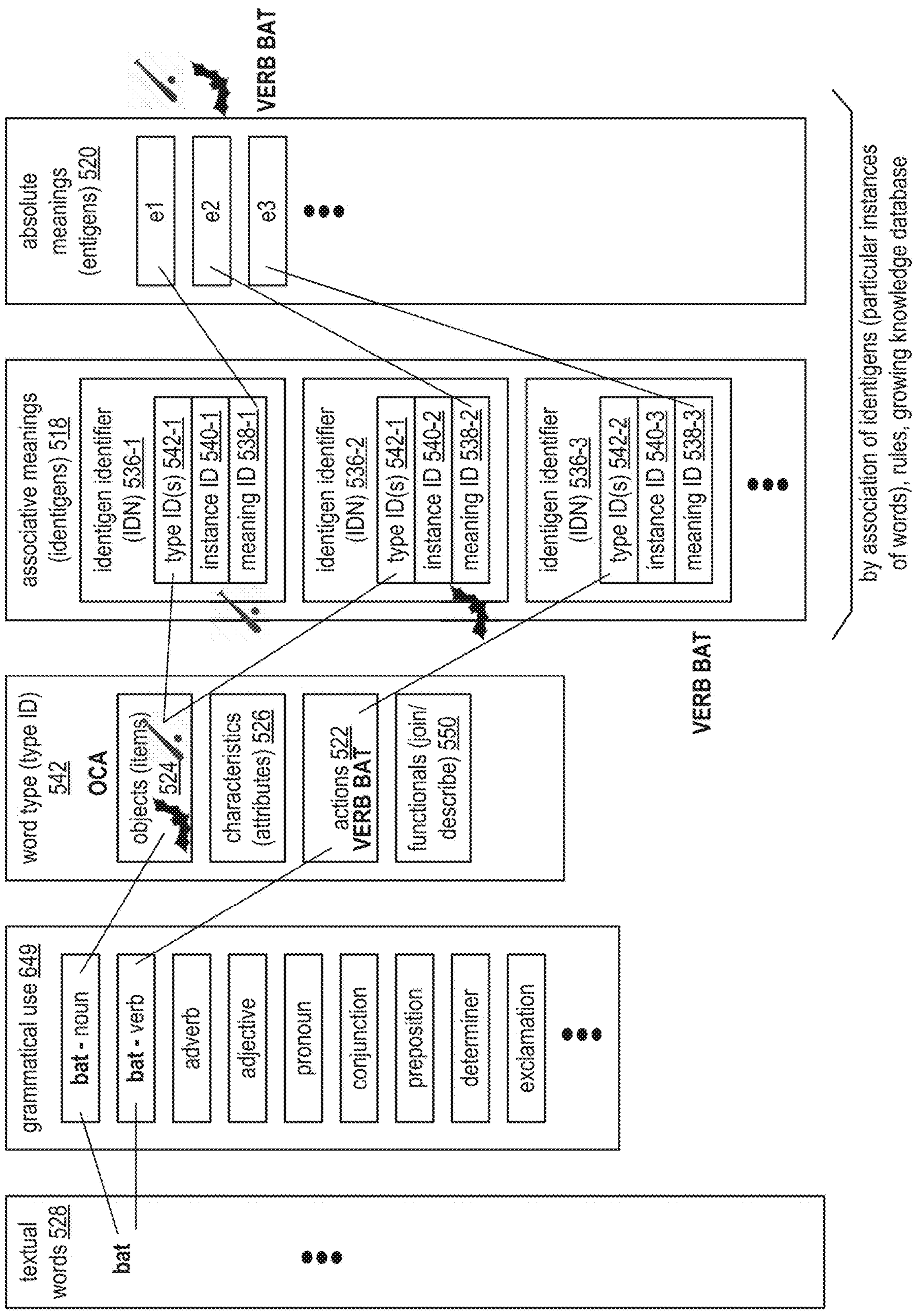
FIG. 8E is a relationship block diagram illustrating another embodiment of relationships between things and representations of things within a computing system in accordance with the present invention.

FIG. 8E is a relationship block diagram illustrating another embodiment of relationships between things and representations of things within a computing system. While things in the real world are described with words, it is often the case that a particular word has multiple meanings in isolation. Interpreting the meaning of the particular word may hinge on analyzing how the word is utilized in a phrase, a sentence, multiple sentences, paragraphs, and even whole documents or more. Describing and stratifying the use of words, word types, and possible meanings help in interpreting a true meaning.

Humans utilize textual words 528 to represent things in the real world. Quite often a particular word has multiple instances of different grammatical use when part of a phrase of one or more sentences. The grammatical use 649 of words includes the nouns and the verbs, and also includes adverbs, adjectives, pronouns, conjunctions, prepositions, determiners, exclamations, etc.

As an example of multiple grammatical use, the word "bat" in the English language can be utilized as a noun or a verb. For instance, when utilized as a noun, the word "bat" may apply to a baseball bat or may apply to a flying "bat." As another instance, when utilized as a verb, the word "bat" may apply to the action of hitting or batting an object, i.e., "bat the ball."

To stratify word types by use, the words are associated with a word type (e.g., type identifier 542). The word types include objects (e.g., items 524), characteristics (e.g., attributes 526), actions 522, and the functionals 550 for joining other words and describing words. For example, when the word "bat" is utilized as a noun, the word is describing the object of either the baseball bat or the flying bat. As another example, when the word "bat" is utilized as a verb, the word is describing the action of hitting.

To determine possible meanings, the words, by word type, are mapped to associative meanings (e.g., identigens 518). For each possible associative meaning, the word type is documented with the meaning and further with an identifier (ID) of the instance (e.g., an identigen identifier).

For the example of the word "bat" when utilized as a noun for the baseball bat, a first identigen identifier 536-1 includes a type ID 542-1 associated with the object 524, an instance ID 540-1 associated with the first identigen identifier (e.g., unique for the baseball bat), and a meaning ID 538-1 associated with the baseball bat. For the example of the word "bat" when utilized as a noun for the flying bat, a second identigen identifier 536-2 includes a type ID 542-1 associated with the object 524, an instance ID 540-2 associated with the second identigen identifier (e.g., unique for the flying bat), and a meaning ID 538-2 associated with the flying bat. For the example of the word "bat" when utilized as a verb for the bat that hits, a third identigen identifier 536-3 includes a type ID 542-2 associated with the actions 522, an instance ID 540-3 associated with the third identigen identifier (e.g., unique for the bat that hits), and a meaning ID 538-3 associated with the bat that hits.

With the word described by a type and possible associative meanings, a combination of full grammatical use of the word within the phrase etc., application of rules, and utilization of an ever-growing knowledge database that represents knowledge by linked entigens, the absolute meaning (e.g., entigen 520) of the word is represented as a unique entigen. For example, a first entigen e1 represents the absolute meaning of a baseball bat (e.g., a generic baseball bat not a particular baseball bat that belongs to anyone), a second entigen e2 represents the absolute meaning of the flying bat (e.g., a generic flying bat not a particular flying bat), and a third entigen e3 represents the absolute meaning of the verb bat (e.g., to hit).

An embodiment of methods to ingest text to produce absolute meanings for storage in a knowledge database are discussed in greater detail with reference to FIGS. 8F-H. Those embodiments further discuss the discerning of the grammatical use, the use of the rules, and the utilization of the knowledge database to definitively interpret the absolute meaning of a string of words.

Another embodiment of methods to respond to a query to produce an answer based on knowledge stored in the knowledge database are discussed in greater detail with reference to FIGS. 8J-L. Those embodiments further discuss the discerning of the grammatical use, the use of the rules, and the utilization of the knowledge database to interpret the query. The query interpretation is utilized to extract the answer from the knowledge database to facilitate forming the query response.

Figure 8F:
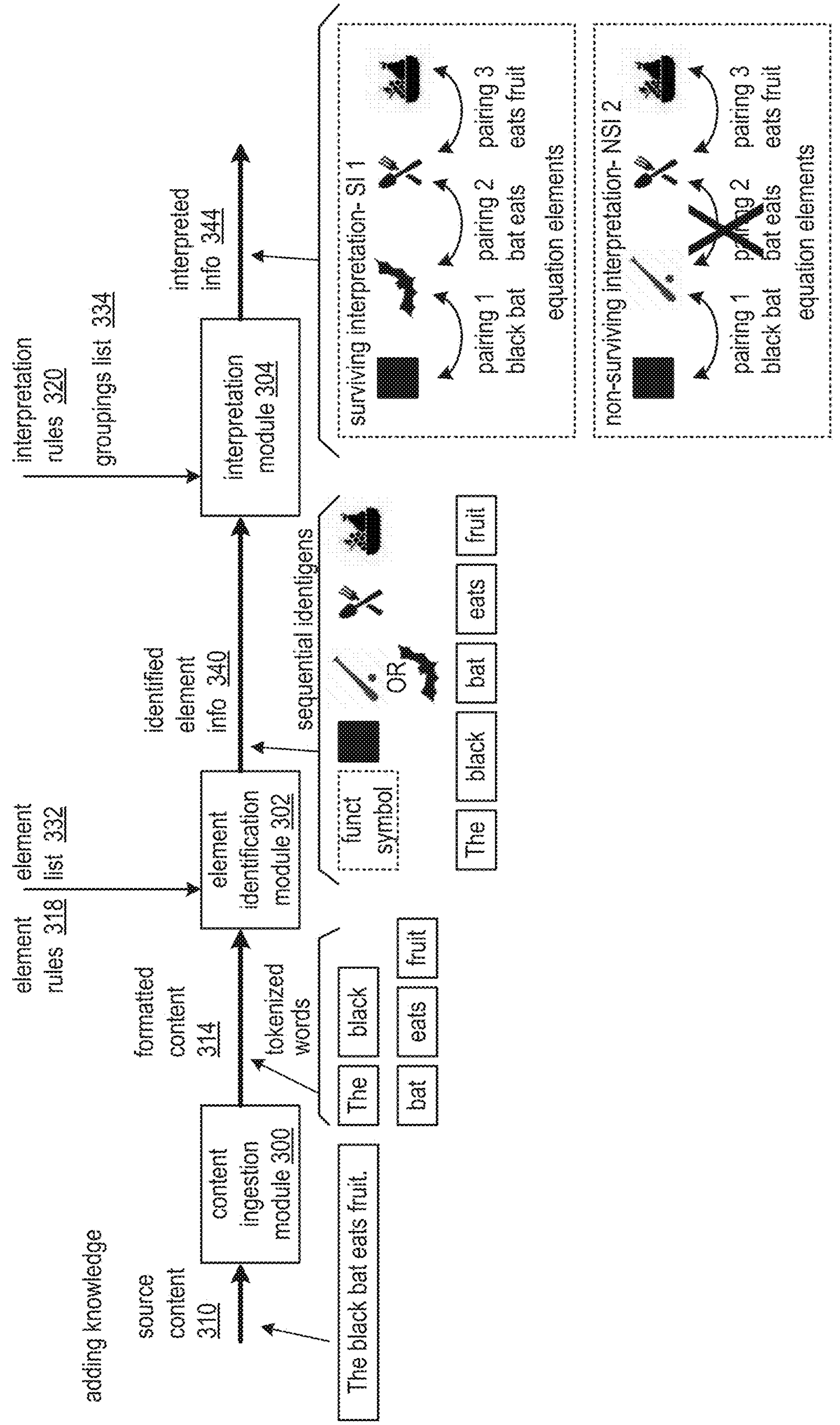
FIGS. 8F and 8G are schematic block diagrams of another embodiment of a computing system in accordance with the present invention.
Figure 8G:
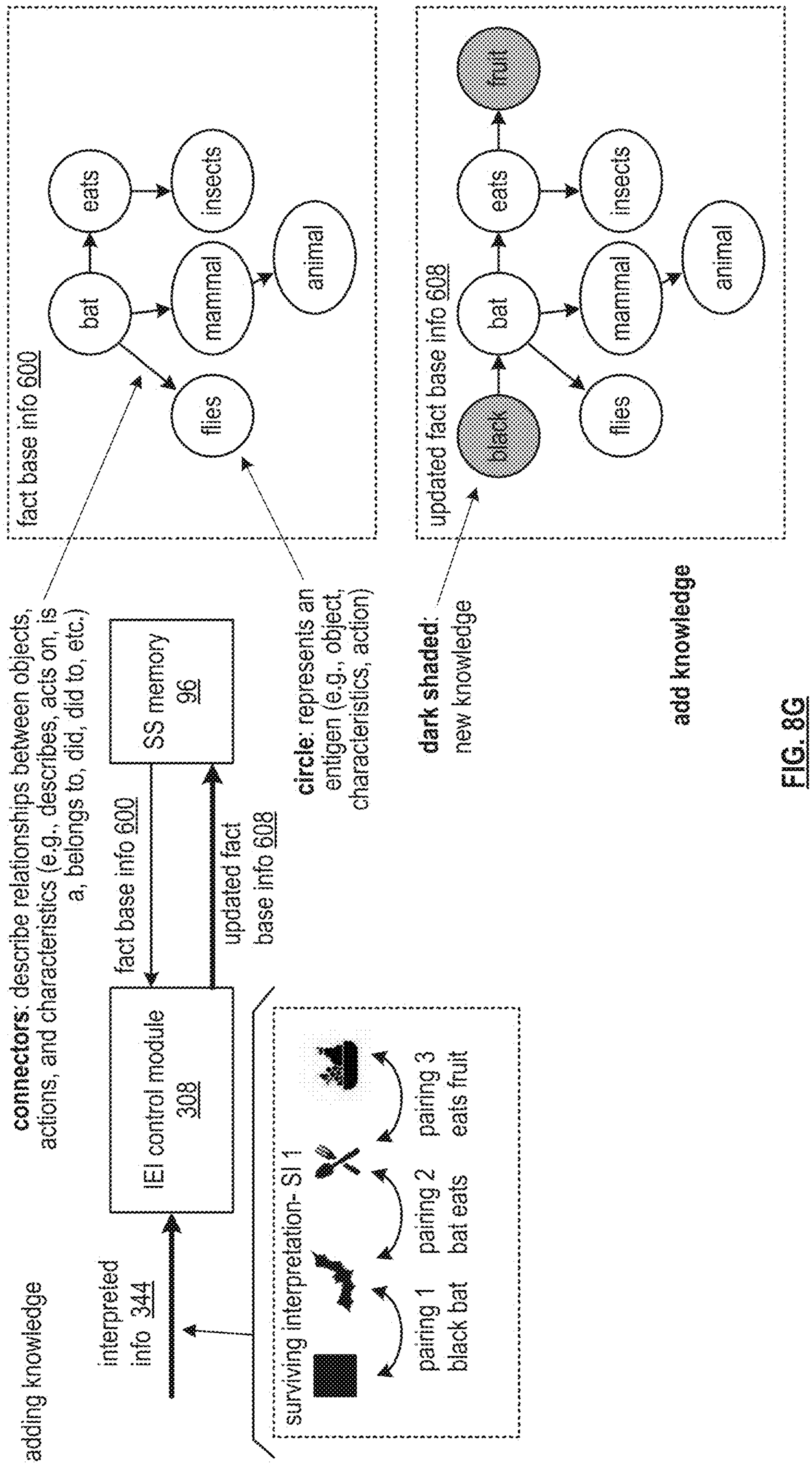

FIGS. 8F and 8G are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention provides presents solutions where the computing system 10 supports processing content to produce knowledge for storage in a knowledge database.

The processing of the content to produce the knowledge includes a series of steps. For example, a first step includes identifying words of an ingested phrase to produce tokenized words. As depicted in FIG. 8F, a specific example of the first step includes the content ingestion module 300 comparing words of source content 310 to dictionary entries to produce formatted content 314 that includes identifiers of known words. Alternatively, when a comparison is unfavorable, the temporary identifier may be assigned to an unknown word. For instance, the content ingestion module 300 produces identifiers associated with the words "the", "black", "bat", "eats", and "fruit" when the ingested phrase includes "The black bat eats fruit", and generates the formatted content 314 to include the identifiers of the words.

A second step of the processing of the content to produce the knowledge includes, for each tokenized word, identifying one or more identigens that correspond the tokenized word, where each identigen describes one of an object, a characteristic, and an action. As depicted in FIG. 8F, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and the action (OCA) associated with the tokenized word (e.g. sequential identigens). For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit." When at least one tokenized word is associated with multiple identigens, two or more permutations of sequential combinations of identigens for each tokenized word result. For example, when "bat" is associated with two identigens, two permutations of sequential combinations of identigens result for the ingested phrase.

A third step of the processing of the content to produce the knowledge includes, for each permutation of sequential combinations of identigens, generating a corresponding equation package (i.e., candidate interpretation), where the equation package includes a sequential linking of pairs of identigens (e.g., relationships), where each sequential linking pairs a preceding identigen to a next identigen, and where an equation element describes a relationship between paired identigens (OCAs) such as describes, acts on, is a, belongs to, did, did to, etc. Multiple OCAs occur for a common word when the word has multiple potential meanings (e.g., a baseball bat, a flying bat).

As depicted in FIG. 8F, a specific example of the third step includes the interpretation module 304, for each permutation of identigens of each tokenized word of the identified element information 340, the interpretation module 304 generates, in accordance with interpretation rules 320 and a groupings list 334, an equation package to include one or more of the identifiers of the tokenized words, a list of identifiers of the identigens of the equation package, a list of pairing identifiers for sequential pairs of identigens, and a quality metric associated with each sequential pair of identigens (e.g., likelihood of a proper interpretation). For instance, the interpretation module 304 produces a first equation package that includes a first identigen pairing of a black bat (e.g., flying bat with a higher quality metric level), the second pairing of bat eats (e.g., the flying bat eats, with a higher quality metric level), and a third pairing of eats fruit, and the interpretation module 304 produces a second equation package that includes a first pairing of a black bat (e.g., baseball bat, with a neutral quality metric level), the second pairing of bat eats (e.g., the baseball bat eats, with a lower quality metric level), and a third pairing of eats fruit.

A fourth step of the processing of the content to produce the knowledge includes selecting a surviving equation package associated with a most favorable confidence level. As depicted in FIG. 8F, a specific example of the fourth step includes the interpretation module 304 applying interpretation rules 320 (i.e., inference, pragmatic engine, utilizing the identifiers of the identigens to match against known valid combinations of identifiers of entigens) to reduce a number of permutations of the sequential combinations of identigens to produce interpreted information 344 that includes identification of at least one equation package as a surviving interpretation SI (e.g., higher quality metric level).

Non-surviving equation packages are eliminated that compare unfavorably to pairing rules and/or are associated with an unfavorable quality metric levels to produce a non-surviving interpretation NSI 2 (e.g., lower quality metric level), where an overall quality metric level may be assigned to each equation package based on quality metric levels of each pairing, such that a higher quality metric level of an equation package indicates a higher probability of a most favorable interpretation. For instance, the interpretation module 304 eliminates the equation package that includes the second pairing indicating that the "baseball bat eats" which is inconsistent with a desired quality metric level of one or more of the groupings list 334 and the interpretation rules 320 and selects the equation package associated with the "flying bat eats" which is favorably consistent with the one or more of the quality metric levels of the groupings list 334 and the interpretation rules 320.

A fifth step of the processing of the content to produce the knowledge utilizing the confidence level includes integrating knowledge of the surviving equation package into a knowledge database. For example, integrating at least a portion of the reduced OCA combinations into a graphical database to produce updated knowledge. As another example, the portion of the reduced OCA combinations may be translated into rows and columns entries when utilizing a rows and columns database rather than a graphical database. When utilizing the rows and columns approach for the knowledge database, subsequent access to the knowledge database may utilize structured query language (SQL) queries.

As depicted in FIG. 8G, a specific example of the fifth step includes the IEI control module 308 recovering fact base information 600 from SS memory 96 to identify a portion of the knowledge database for potential modification utilizing the OCAs of the surviving interpretation SI 1 (i.e., compare a pattern of relationships between the OCAs of the surviving interpretation SI 1 from the interpreted information 344 to relationships of OCAs of the portion of the knowledge database including potentially new quality metric levels).

The fifth step further includes determining modifications (e.g., additions, subtractions, further clarifications required when information is complex, etc.) to the portion of the knowledge database based on the new quality metric levels. For instance, the IEI control module 308 causes adding the element "black" as a "describes" relationship of an existing bat OCA and adding the element "fruit" as an eats "does to" relationship to implement the modifications to the portion of the fact base information 600 to produce updated fact base information 608 for storage in the SS memory 96.

Figure 8H:
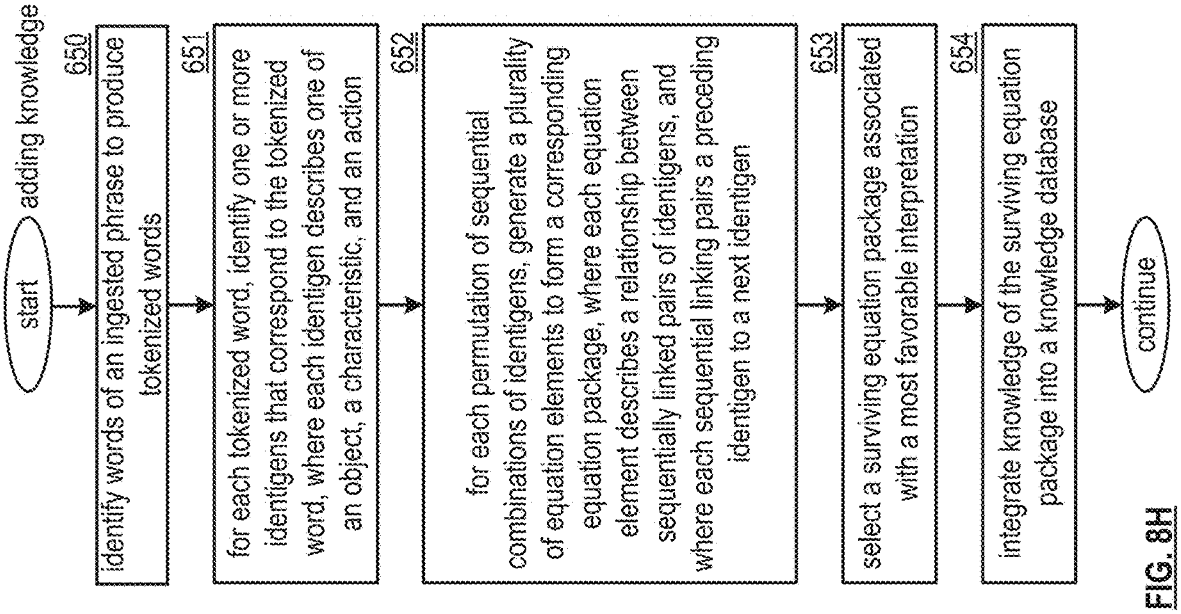
FIG. 8H is a logic diagram of an embodiment of a method for processing content to produce knowledge within a computing system in accordance with the present invention.

FIG. 8H is a logic diagram of an embodiment of a method for processing content to produce knowledge for storage within a computing system. In particular, a method is presented for use in conjunction with one or more functions and features described in conjunction with FIGS. 1-8E, 8F, and also FIG. 8G. The method includes step 650 where a processing module of one or more processing modules of one or more computing devices of the computing system identifies words of an ingested phrase to produce tokenized words. The identified includes comparing words to known words of dictionary entries to produce identifiers of known words.

For each tokenized word, the method continues at step 651 where the processing module identifies one or more identigens that corresponds to the tokenized word, where each identigen describes one of an object, a characteristic, and an action (e.g., OCA). The identifying includes performing a lookup of identifiers of the one or more identigens associated with each tokenized word, where the different identifiers associated with each of the potential object, the characteristic, and the action associated with the tokenized word.

The method continues at step 652 where the processing module, for each permutation of sequential combinations of identigens, generates a plurality of equation elements to form a corresponding equation package, where each equation element describes a relationship between sequentially linked pairs of identigens, where each sequential linking pairs a preceding identigen to a next identigen. For example, for each permutation of identigens of each tokenized word, the processing module generates the equation package to include a plurality of equation elements, where each equation element describes the relationship (e.g., describes, acts on, is a, belongs to, did, did too, etc.) between sequentially adjacent identigens of a plurality of sequential combinations of identigens. Each equation element may be further associated with a quality metric to evaluate a favorability level of an interpretation in light of the sequence of identigens of the equation package.

The method continues at step 653 where the processing module selects a surviving equation package associated with most favorable interpretation. For example, the processing module applies rules (i.e., inference, pragmatic engine, utilizing the identifiers of the identigens to match against known valid combinations of identifiers of entigens), to reduce the number of permutations of the sequential combinations of identigens to identify at least one equation package, where non-surviving equation packages are eliminated the compare unfavorably to pairing rules and/or are associated with an unfavorable quality metric levels to produce a non-surviving interpretation, where an overall quality metric level is assigned to each equation package based on quality metric levels of each pairing, such that a higher quality metric level indicates an equation package with a higher probability of favorability of correctness.

The method continues at step 654 where the processing module integrates knowledge of the surviving equation package into a knowledge database. For example, the processing module integrates at least a portion of the reduced OCA combinations into a graphical database to produce updated knowledge. The integrating may include recovering fact base information from storage of the knowledge database to identify a portion of the knowledge database for potential modifications utilizing the OCAs of the surviving equation package (i.e., compare a pattern of relationships between the OCAs of the surviving equation package to relationships of the OCAs of the portion of the knowledge database including potentially new quality metric levels). The integrating further includes determining modifications (e.g., additions, subtractions, further clarifications required when complex information is presented, etc.) to produce the updated knowledge database that is based on fit of acceptable quality metric levels, and implementing the modifications to the portion of the fact base information to produce the updated fact base information for storage in the portion of the knowledge database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 8J:
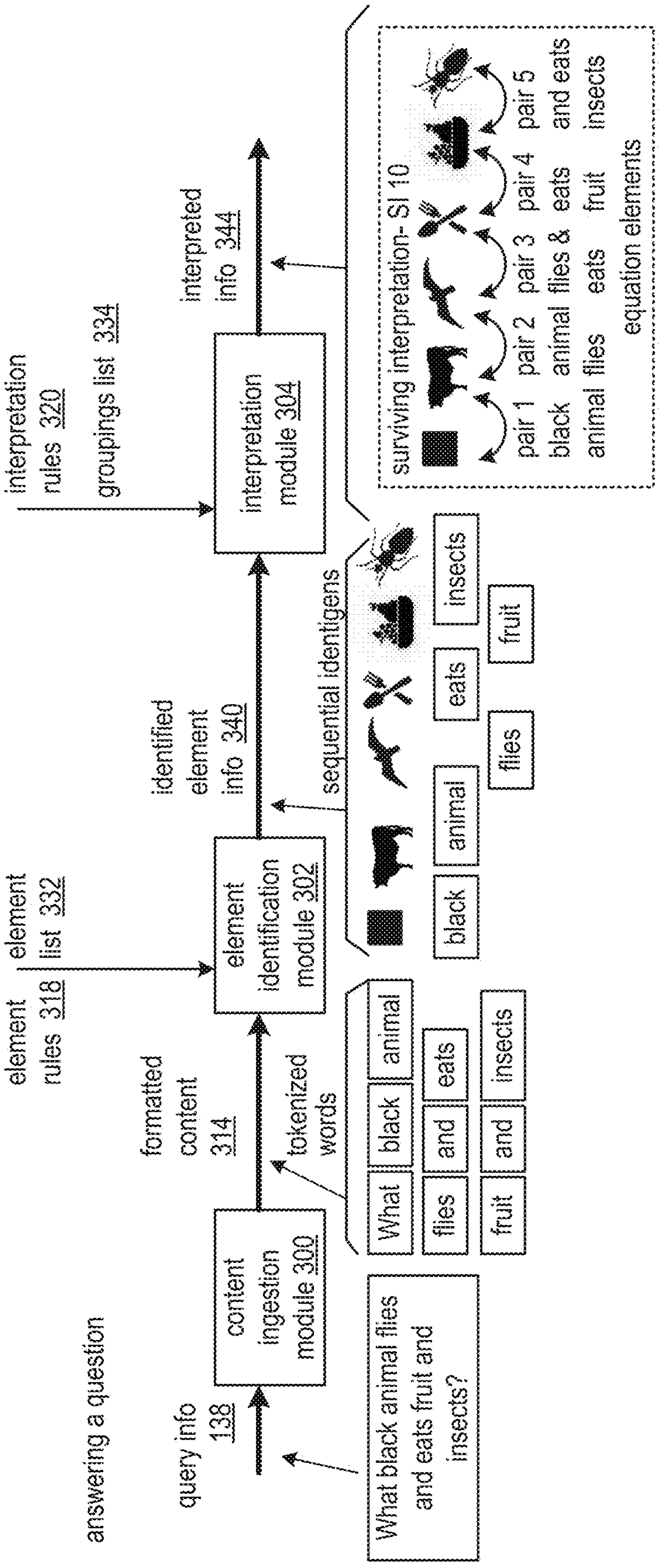
FIGS. 8J and 8K are schematic block diagrams another embodiment of a computing system in accordance with the present invention.
Figure 8K:
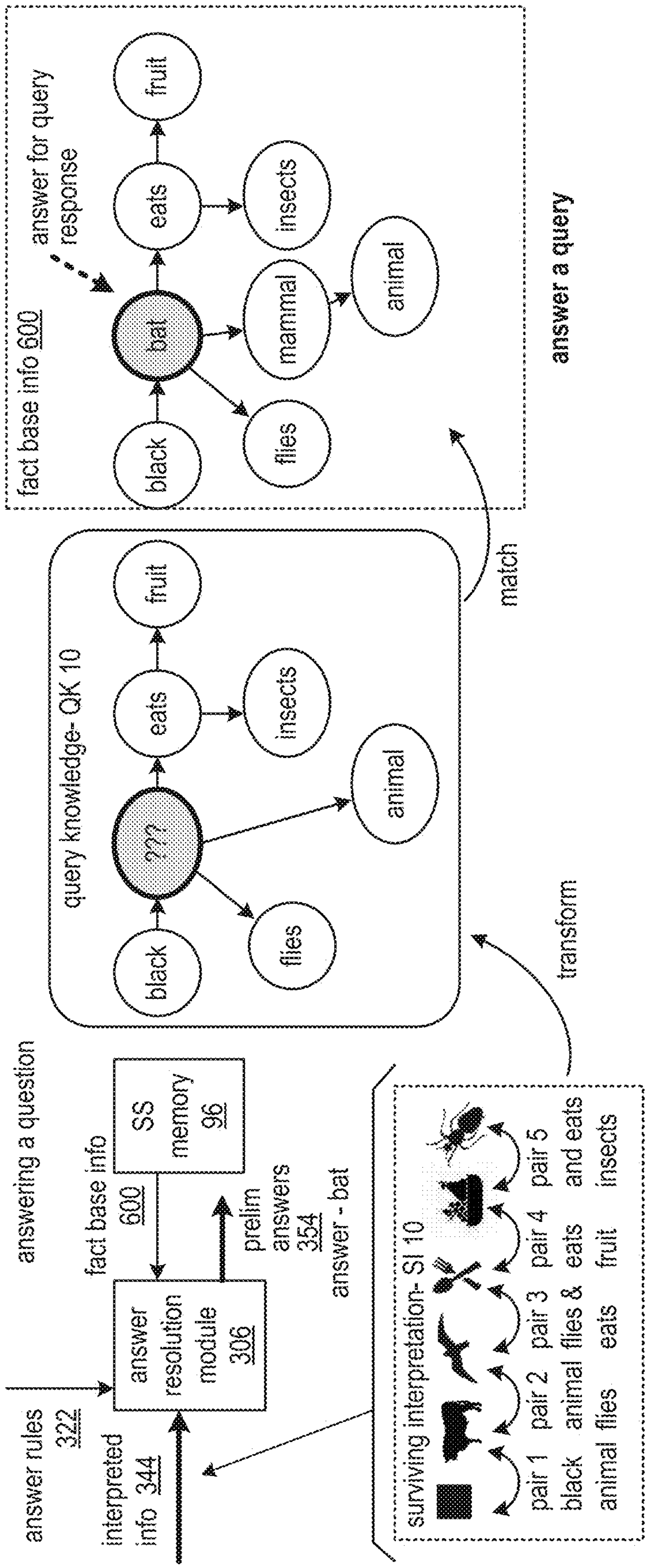

FIGS. 8J and 8K are schematic block diagrams of another embodiment of a computing system that includes the content ingestion module 300 of FIG. 5E, the element identification module 302 of FIG. 5E, the interpretation module 304 of FIG. 5E, the answer resolution module 306 of FIG. 5E, and the SS memory 96 of FIG. 2. Generally, an embodiment of this invention provides solutions where the computing system 10 supports for generating a query response to a query utilizing a knowledge database.

The generating of the query response to the query includes a series of steps. For example, a first step includes identifying words of an ingested query to produce tokenized words. As depicted in FIG. 8J, a specific example of the first step includes the content ingestion module 300 comparing words of query info 138 to dictionary entries to produce formatted content 314 that includes identifiers of known words. For instance, the content ingestion module 300 produces identifiers for each word of the query "what black animal flies and eats fruit and insects?"

A second step of the generating of the query response to the query includes, for each tokenized word, identifying one or more identigens that correspond the tokenized word, where each identigen describes one of an object, a characteristic, and an action (OCA). As depicted in FIG. 8J, a specific example of the second step includes the element identification module 302 performing a look up of identifiers, utilizing an element list 332 and in accordance with element rules 318, of the one or more identigens associated with each tokenized word of the formatted content 314 to produce identified element information 340. A unique identifier is associated with each of the potential object, the characteristic, and the action associated with a particular tokenized word. For instance, the element identification module 302 produces a single identigen identifier for each of the black color, an animal, flies, eats, fruit, and insects.

A third step of the generating of the query response to the query includes, for each permutation of sequential combinations of identigens, generating a corresponding equation package (i.e., candidate interpretation). The equation package includes a sequential linking of pairs of identigens, where each sequential linking pairs a preceding identigen to a next identigen. An equation element describes a relationship between paired identigens (OCAs) such as describes, acts on, is a, belongs to, did, did to, etc.

As depicted in FIG. 8J, a specific example of the third step includes the interpretation module 304, for each permutation of identigens of each tokenized word of the identified element information 340, generating the equation packages in accordance with interpretation rules 320 and a groupings list 334 to produce a series of equation elements that include pairings of identigens. For instance, the interpretation module 304 generates a first pairing to describe a black animal, a second pairing to describe an animal that flies, a third pairing to describe flies and eats, a fourth pairing to describe eats fruit, and a fifth pairing to describe eats fruit and insects.

A fourth step of the generating the query response to the query includes selecting a surviving equation package associated with a most favorable interpretation. As depicted in FIG. 8J, a specific example of the fourth step includes the interpretation module 304 applying the interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344. The interpreted information 344 includes identification of at least one equation package as a surviving interpretation SI 10, where non-surviving equation packages, if any, are eliminated that compare unfavorably to pairing rules to produce a non-surviving interpretation.

A fifth step of the generating the query response to the query includes utilizing a knowledge database, generating a query response to the surviving equation package of the query, where the surviving equation package of the query is transformed to produce query knowledge for comparison to a portion of the knowledge database. An answer is extracted from the portion of the knowledge database to produce the query response.

As depicted in FIG. 8K, a specific example of the fifth step includes the answer resolution module 306 interpreting the surviving interpretation SI 10 of the interpreted information 344 in accordance with answer rules 322 to produce query knowledge QK 10 (i.e., a graphical representation of knowledge when the knowledge database utilizes a graphical database). For example, the answer resolution module 306 accesses fact base information 600 from the SS memory 96 to identify the portion of the knowledge database associated with a favorable comparison of the query knowledge QK 10 (e.g., by comparing attributes of the query knowledge QK 10 to attributes of the fact base information 600), and generates preliminary answers 354 that includes the answer to the query. For instance, the answer is "bat" when the associated OCAs of bat, such as black, eats fruit, eats insects, is an animal, and flies, aligns with OCAs of the query knowledge.

Figure 8L:
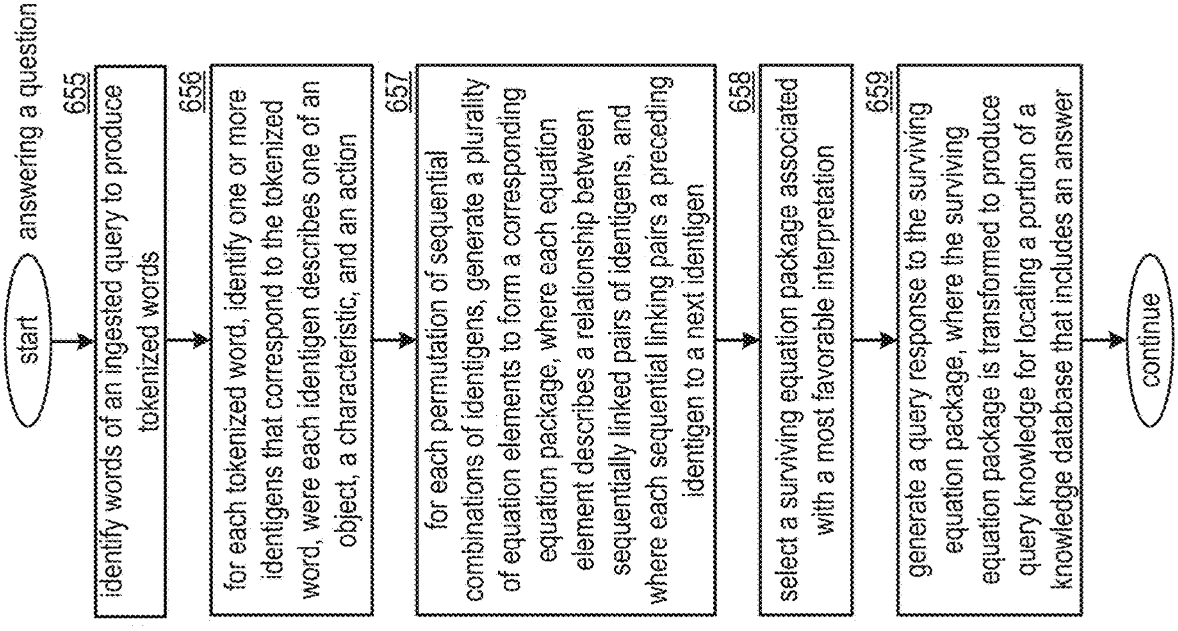
FIG. 8L is a logic diagram of an embodiment of a method for generating a query response to a query within a computing system in accordance with the present invention.

FIG. 8L is a logic diagram of an embodiment of a method for generating a query response to a query utilizing knowledge within a knowledge database within a computing system. In particular, a method is presented for use in conjunction with one or more functions and features described in conjunction with FIGS. 1-8D, 8J, and also FIG. 8K. The method includes step 655 where a processing module of one or more processing modules of one or more computing devices of the computing system identifies words of an ingested query to produce tokenized words. For example, the processing module compares words to known words of dictionary entries to produce identifiers of known words.

For each tokenized word, the method continues at step 656 where the processing module identifies one or more identigens that correspond to the tokenized word, where each identigen describes one of an object, a characteristic, and an action. For example, the processing module performs a lookup of identifiers of the one or more identigens associated with each tokenized word, where different identifiers associated with each permutation of a potential object, characteristic, and action associated with the tokenized word.

For each permutation of sequential combinations of identigens, the method continues at step 657 where the processing module generates a plurality of equation elements to form a corresponding equation package, where each equation element describes a relationship between sequentially linked pairs of identigens. Each sequential linking pairs a preceding identigen to a next identigen. For example, for each permutation of identigens of each tokenized word, the processing module includes all other permutations of all other tokenized words to generate the equation packages. Each equation package includes a plurality of equation elements describing the relationships between sequentially adjacent identigens of a plurality of sequential combinations of identigens.

The method continues at step 658 where the processing module selects a surviving equation package associated with a most favorable interpretation. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated the compare unfavorably to pairing rules.

The method continues at step 659 where the processing module generates a query response to the surviving equation package, where the surviving equation package is transformed to produce query knowledge for locating the portion of a knowledge database that includes an answer to the query. As an example of generating the query response, the processing module interprets the surviving the equation package in accordance with answer rules to produce the query knowledge (e.g., a graphical representation of knowledge when the knowledge database utilizes a graphical database format).

The processing module accesses fact base information from the knowledge database to identify the portion of the knowledge database associated with a favorable comparison of the query knowledge (e.g., favorable comparison of attributes of the query knowledge to the portion of the knowledge database, aligning favorably comparing entigens without conflicting entigens). The processing module extracts an answer from the portion of the knowledge database to produce the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 9A:
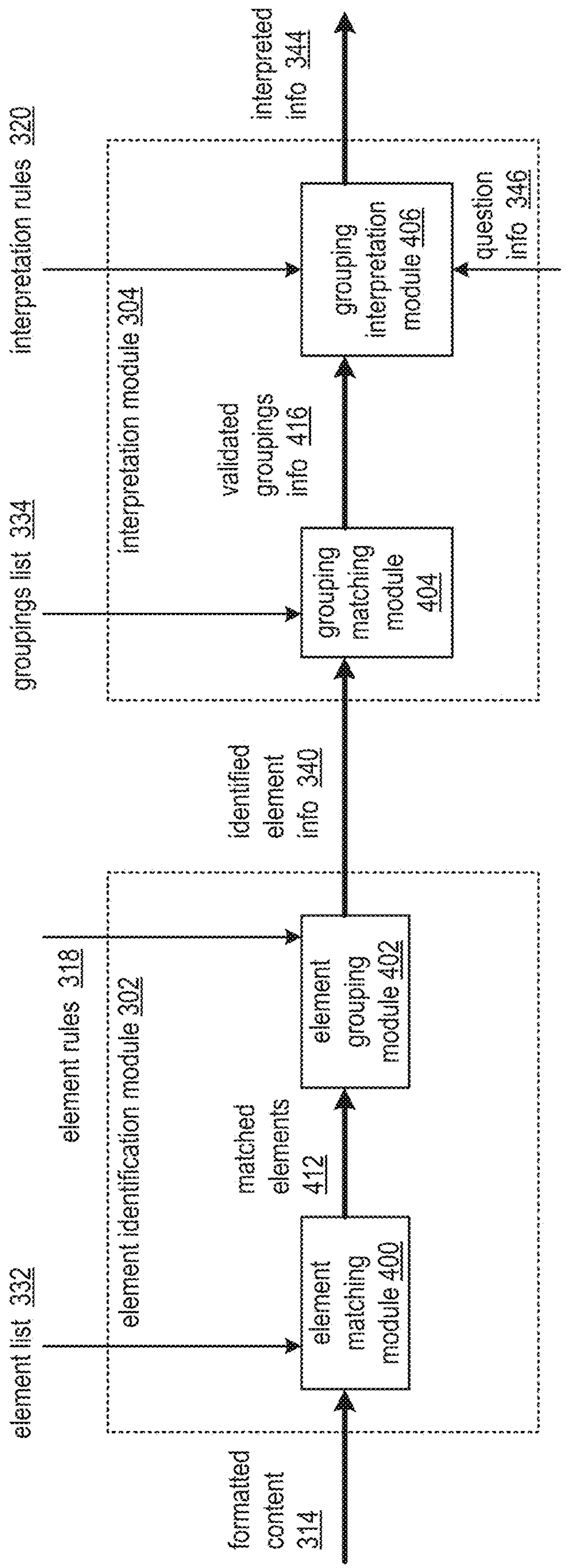
FIG. 9A is a schematic block diagram of another embodiment of a computing system in accordance with the present invention.

FIG. 9A is a schematic block diagram of another embodiment of a computing system that includes the element identification module 302 of FIG. 5E and the interpretation module 304 of FIG. 5E. The element identification module 302 includes the element matching module 400 of FIG. 6A and the element grouping module 402 of FIG. 6A. The interpretation module 304 includes the grouping matching module 404 of FIG. 6A and the grouping interpretation module 406 of FIG. 6A. Generally, an embodiment of the invention presents solutions where the computing system 10 supports generating an unambiguous interpretation of ingested content.

In an example of operation of the generating of the unambiguous interpretation of ingested content, the element matching module 400 interprets formatted content 314 that includes a phrase of ingested words to produce matched elements 412, where the matched elements 412 includes a wordgroup of a group of known words. The interpreting includes matching a received element to an element of an element list 332 (e.g., a dictionary), where the element list 332 further includes identification of known words and one or more identigens per word and an associated identifier of each matched element.

The element grouping module 402 analyzes the matched elements 412 in accordance with element rules 318 (e.g., concept identification rules), that further includes element word group rules, to produce identified element information 340 when favorable word groupings are associated with the matched elements 412 in accordance with the element rules 318. The identified element information 340 includes a plurality of equation string permutations (i.e., possible concept interpretations). The analyzing includes comparing matched elements 412 with element word group rules of the element rules 318, extracting possible word group concepts from the element rules 318 (i.e., the equation strings), identifying the words of the group and identigens for each word, and forming a tree structure where each branch of the tree structure is a potential interpretation of the concept that maps to each word of the phrase. The concepts include one or more of a starter, a leader, an action, a victim, and a function.

The grouping matching module 404 analyzes, from left to right of the phrase, the identified element information 340 (i.e., each equation string) in accordance with a groupings list 334, where the groupings list 334 includes a list of known valid pairings of adjacent identigens, to produce validated groupings information 416. The validated groupings information 416 includes a short list of possible entigens of a most valid conceptual interpretation of the phrase in accordance with the element rules 318 and the groupings list 334. The analyzing includes comparing a groupings aspect of the identified element information 340 (e.g., for each permutation of groups of elements of possible interpretations such as each equation string along a branch of the tree structure), and generating the validated groupings information 416 to include an identification of potentially valid permutations that align with the groupings list 334. Invalid permutations are eliminated that are inconsistent with conceptual interpretations of the phrase.

The grouping interpretation module 406 interprets the validated groupings information 416 based on question information 346 and in accordance with interpretation rules 320 to produce interpreted information 344. The interpretation rules 320 includes entigens selection rules based on the knowledge database that links identigen permutations to most likely conceptual interpretations of the phrase (e.g., most likely conceptual interpretation, next likely conceptual interpretation, etc.). The interpreting may be based on the plurality of possible conceptual interpretations of possible pairings of identigens. Unlikely pairings are pruned from the tree structure based on interpretation rules 320 in light of other words of the validated groupings information 416 to produce the most likely conceptual interpretation (e.g., consistent with similar previous conceptual interpretations).

Figure 9B:
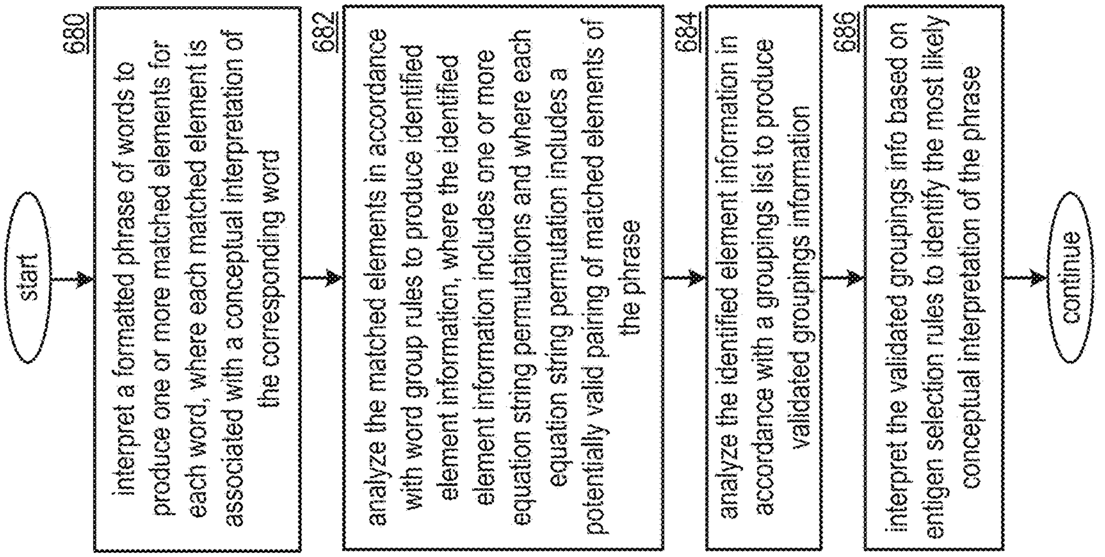
FIG. 9B is a logic diagram of an embodiment of a method for generating an unambiguous interpretation of ingested content within a computing system in accordance with the present invention.

FIG. 9B is a logic diagram of an embodiment of a method for generating an unambiguous interpretation of ingested content within a computing system. In particular, a method is presented for use in conjunction with one or more functions and features described in conjunction with FIGS. 1-8D, 9A, and also FIG. 9B. The method includes step 680 where a processing module of one or more processing modules of one or more computing devices of the computing system interprets a formatted phrase of words to produce one or more matched elements for each word, where each matched element is associated with the conceptual interpretation of the corresponding word. The interpreting includes matching a received element to an element of an element list (e.g., a dictionary) and associating an identifier with each matched element. Types of elements includes one or more of a starter, a leader, an action, a victim, an object, a characteristic, and a function. The element list further includes identification of known words and one or more identigens per word.

The method continues at step 682 where the processing module analyzes the matched elements in accordance with word group rules to produce identified element information. The identified element information includes one or more equation string permutations. Each equation string permutation includes a potentially valid pairing of matched elements of the phrase.

The analyzing includes comparing matched elements with the word group rules, extracting possible word group concepts from the element rules (i.e., the equation strings), and identifying the words of the word group and identigens for each word. The concepts include one or more of a starter, a leader, an action, a victim, etc. to form a tree structure where each branch of the tree structure is a potential interpretation of a concept that maps to each word of the phrase.

The method continues at step 684 where the processing module analyzes the identified element information in accordance with the groupings list to produce validated groupings information. The analyzing includes comparing a groupings aspect of the identified element information (e.g., for each equation string along a branch of the tree structure), and generating the validated groupings information. The validated groupings information includes identification of potentially valid permutations that align with the groupings list to eliminate invalid permutations that are inconsistent with conceptual interpretations of the phrase.

The method continues at step 686 where the processing module interprets the validated groupings information based on entigens selection rules to identify the most likely conceptual interpretation of the phrase. The interpreting may be based on the plurality of possible conceptual interpretations of possible pairings of identigens and may include pruning a plurality of possible conceptual interpretations of the tree structure. The pruning may be based on the interpretation rules in light of other words of the validated groupings information of the word group to produce a most likely conceptual interpretation (e.g., consistent with similar previous conceptual interpretations).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 10A:
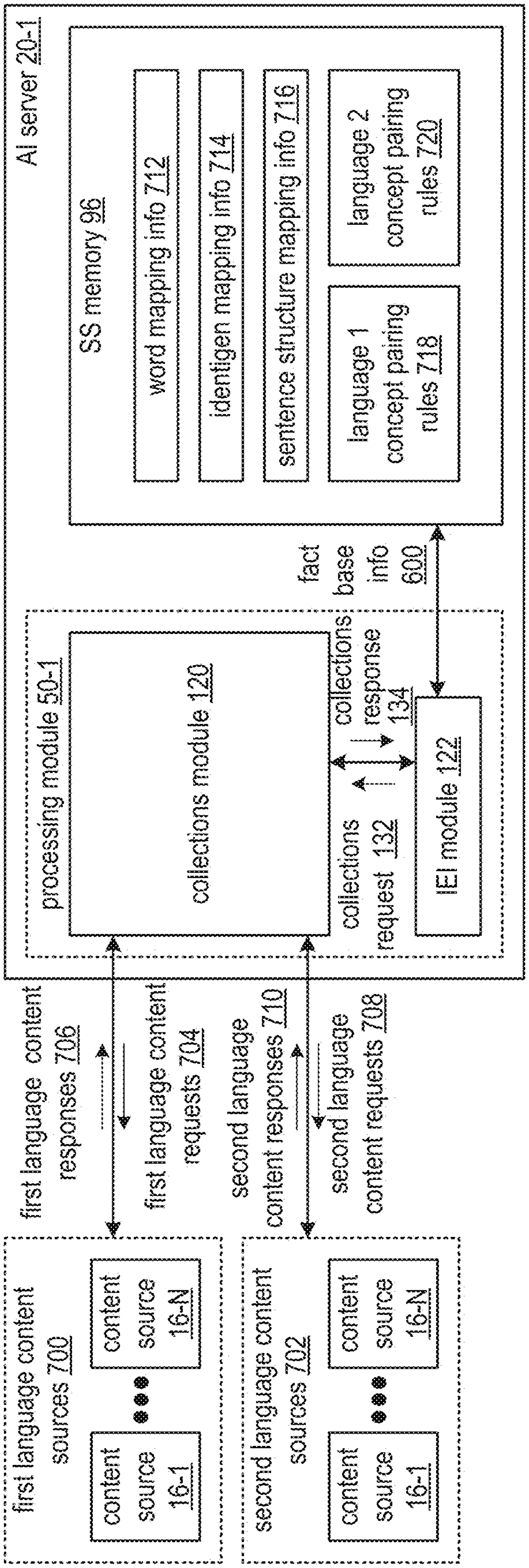
FIG. 10A is a schematic block diagram of another embodiment of a computing system in accordance with the present invention.

FIG. 10A is a schematic block diagram of another embodiment of a computing system that includes first language content sources 700, second language content sources 702, and the AI server 20-1 of FIG. 1. The first and second language content sources 700 and 702 include content sources 16-1 through 16-N of FIG. 1. The AI server 20-1 includes the processing module 50-1 of FIG. 2 and the SS memory 96 of FIG. 2. The processing module 50-1 includes the collections module 120 of FIG. 4A and the IEI module 122 of FIG. 4A. The SS memory 96 includes memory sections allocated to word mapping information 712, identigen mapping information 714, sentence structure mapping information 716, language 1 concept pairing rule 718, and language 2 concept pairing rule 720. Generally, an embodiment of the invention presents solutions where the computing system 10 supports extracting knowledge from content of a second language based on a method for extracting knowledge from content of a first language.

In an example of operation of [the] extracting the knowledge from the content of the second language based on the method for extracting the knowledge from the content of the first language, the IEI module 122 obtains word mapping information 712 to map substantially equivalent words from a first to a second language. The word mapping information 712 connects the word of the first language to the word of a second language. The obtaining includes one or more of receiving (e.g., a word translation dictionary), and facilitating a multilanguage similar content collection campaign to determine the mapping based on a comparison of collections responses 134 based on first language content responses 706 and second language content responses 710 for similar topics inquiries. The collections module 120 issues first language content requests 704 to the first language content sources 700 and second language content requests 708 to the second language content sources 702 when receiving a collections request 132 from the JET module 122 indicating to collect similar content for the campaign.

Having obtained the word mapping information 712, the IEI module 122 obtains identigen mapping information 714 to map substantially equivalent identigens from the first of the second language. The identigen mapping information 714 connects an identigen of the first language to one or more identigens of the second language. The obtaining includes at least one of receiving (e.g., in identigen translation dictionary) and facilitating a multilanguage similar content collection campaign to determine the mapping. The mapping is based on a comparison of collections responses 134 based on first language content responses 706 and second language content responses 710 for similar topics and queries.

The collections module 120 issues first language content requests 704 to the first language content sources 700 and issues second language content requests 708 to the second language content sources 702 when receiving a collections request 132 from the IEI module 122. The request indicates to collect similar content for the campaign followed by mapping known words to known identigens and hence known identigens of the first language to identigens of the second language.

Having obtained the identigen mapping information 714, the IEI module 122 obtains sentence structure mapping information 716 to map substantially equivalent sentences and their structure from the first to the second language. The sentence structure mapping information 716 connects sentence structuring rules of the first language to sentence structuring rules of the second language.

The obtaining includes at least one of receiving (e.g., a language sentence structure rules list), and facilitating a multilanguage similar content collections campaign to determine the mapping. The mapping is based on a comparison of collection responses 134 based on first language content responses 706 and second language content responses 710 for similar topics and queries.

The collections module 120 issues first language content requests 704 to the first language content sources 700 and issues second language content requests 708 to the second language content sources 702 when receiving a collections request 132 from the IEI module 122. The request indicates to collect similar content for the campaign followed by mapping known words to known identigens of the first and second languages, utilizing known rules of the first language to infer sentence structure rules of the second language based on the identigens mapping information.

Having obtained the sentence structure mapping information 716, the IEI module 122 transforms known language 1 concept pairing rule 718 to language 2 concept pairing rule 720 based on one or more of the word mapping information 712, the identigen mapping information 714, and the sentence structure mapping information 716. The transforming enables subsequent concept interpretation of phrases of the second language. The transforming includes, for each identigen pairing rule of the first language, identifying identigens of the second language that map to the identigens of the identigen pairing rule, and generating a second language rule based on the identigen mapping and the sentence structure mapping information 716 for the first and second languages (e.g., a valid combination of identigen pairs and associated concepts that share common concepts between the languages).

Figure 10B:
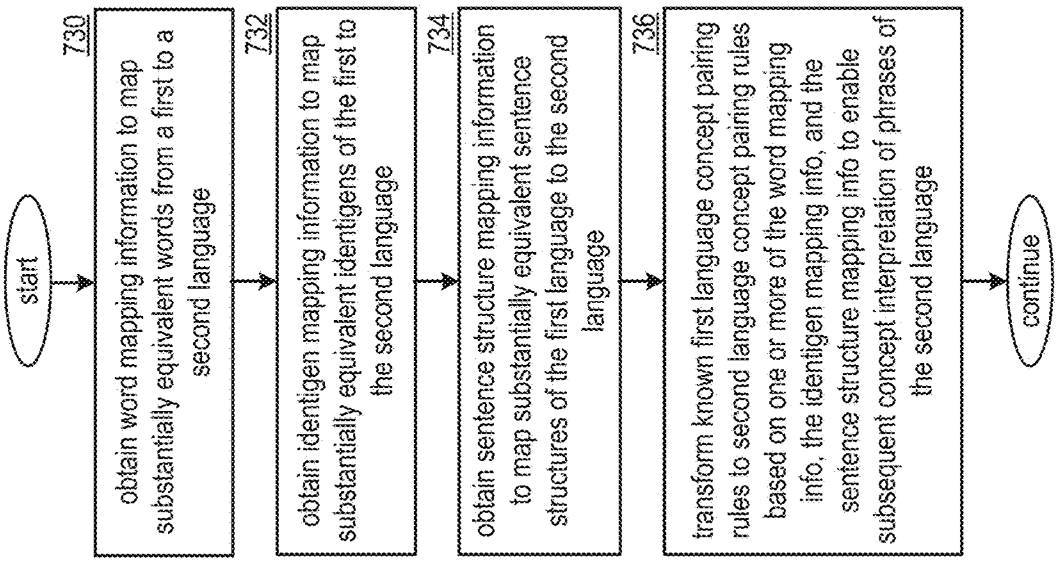
FIG. 10B is a logic diagram of an embodiment of a method for extracting knowledge from content of a second language based on a method for extracting knowledge from content of a first language within a computing system in accordance with the present invention.

FIG. 10B is a logic diagram of an embodiment of a method for extracting knowledge from content of a second language based on a method for extracting knowledge from content of a first language within a computing system. In particular, a method is presented for use in conjunction with one or more functions and features described in conjunction with FIGS. 1-8D, 10A, and also FIG. 10B. The method includes step 730 where a processing module of one or more processing modules of one or more computing devices of the computing system obtains word mapping information to map substantially equivalent words from the first to the second language. The obtaining includes at least one of receiving (e.g., a word translation dictionary), and facilitating a multilanguage similar content collection campaign to determine the mapping based on a comparison of first language content responses and second language content responses from content sources of multiple languages for similar topics and queries in response to first language content requests and second language content requests.

The method continues at step 732 where the processing module obtains identigen mapping information to map substantially equivalent identigens of the first to the second language. The obtaining includes at least one of receiving (e.g., an identigen translation dictionary) and facilitating a multilanguage similar content collection campaign to determine the mapping. The mapping is based on a comparison of first language content responses and second language content responses from content sources of multiple languages for similar topics and queries in response to first language content requests and second language content requests. The mapping further includes mapping known words to known identigens and hence known identigens of the first language to identigens of the second language.

The method continues at step 734 where the processing module obtains sentence structure mapping information to map substantially equivalent sentence structures of the first language to the second language. The obtaining includes at least one of receiving (e.g., a language sentence structure rules list) and facilitating a multilanguage similar content collection campaign to determine the mapping. The mapping is based on a comparison of first language content responses and second language content responses from content sources of multiple languages for similar topics and queries in response to first language content requests and second language content requests. The mapping further includes mapping known words to known identigens and hence known identigens of the first language to identigens of the second language, where the comparison further includes utilizing known rules of the first language to infer sentence structure rules of the second language based on the identigens mapping information.

The method continues at step 736 where the processing module transforms known first language concept pairing rules to second-language concept pairing rules based on one or more of the word mapping information, the identigen mapping information, and the sentence structure mapping information to enable subsequent concept interpretation of phrases of the second language. The transforming includes, for each identigen pairing rule of the first language, identifying identigens of the second language that map to the identigens of the identigen pairing rule. The transforming further includes generating a second language rule based on the identigen mapping and the sentence structure mapping information for the first and second languages (e.g., valid combinations of identigen pairs and associated concepts that share a common concepts between the languages).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIGS. 11A-11E are schematic block diagrams of another embodiment of a computing system illustrating an embodiment of a method for generating an unambiguous interpretation of ingested content to produce knowledge. The computing system includes the content ingestion module 300 of FIG. 5E, the element identification module 302 of FIG. 5E, the interpretation module 304 of FIG. 5E, the answer resolution module 306 of FIG. 5E, a knowledge database 740, and a data source 742. In an embodiment, the knowledge database 740 is implemented utilizing the fact base 592 of FIG. 8A. In an embodiment, the data source 742 is implemented utilizing one or more of the content sources 16-1 through 16-N of FIG. 1.

Figure 11A:
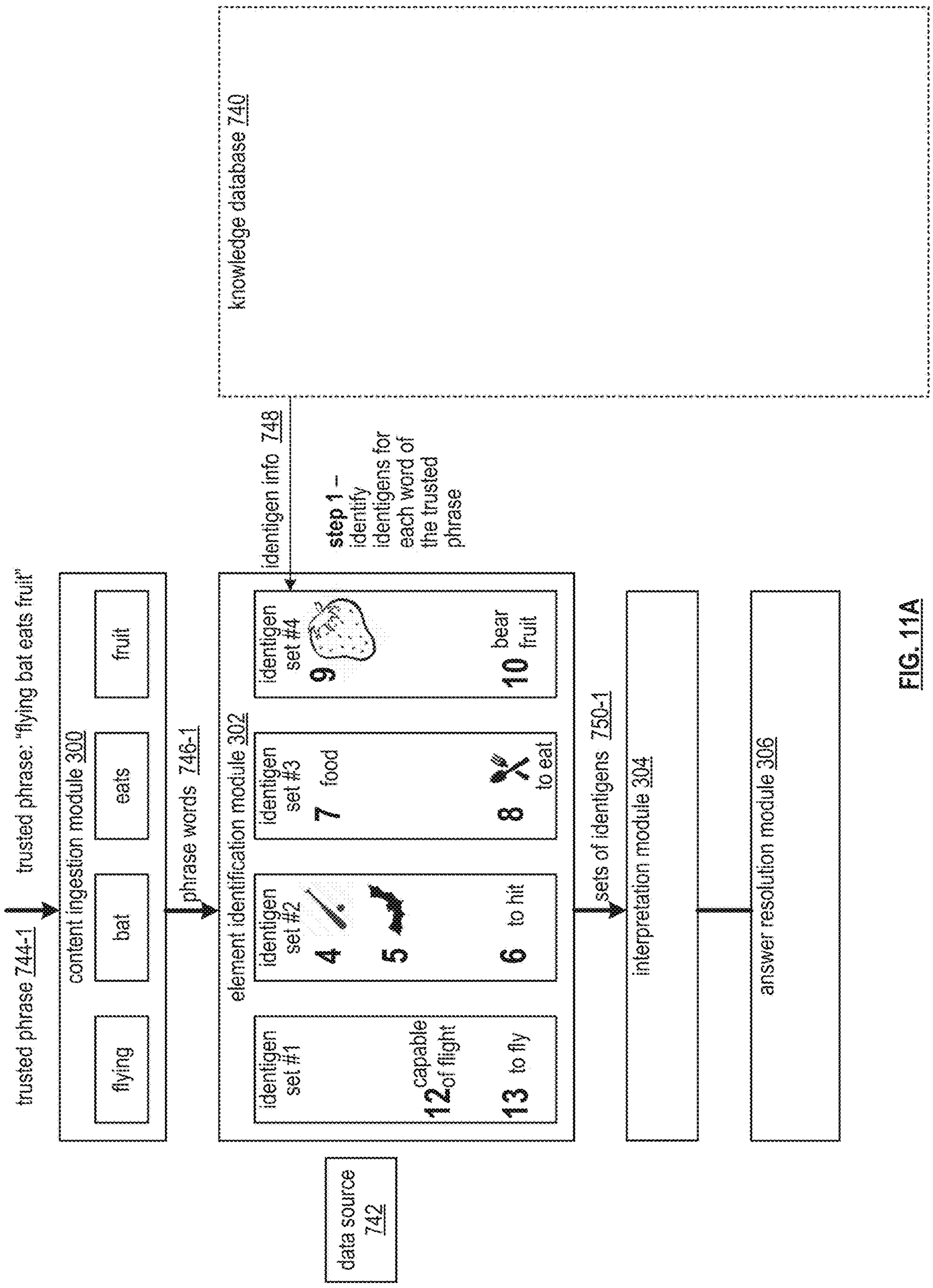
FIGS. 11A-11E are schematic block diagrams of another embodiment of a computing system illustrating an embodiment of a method for generating an unambiguous interpretation of ingested content to produce knowledge.

FIG. 11A illustrates an example of the method of [the] generating the unambiguous interpretation of the ingested content to produce knowledge where the content ingestion module 300 receives a trusted phrase 744-1 and parses the trusted phrase 744-1 to produce phrase words 746-1 that includes a plurality of words. For example, when the trusted phrase 744-1 includes "flying bat eats fruit", the content ingestion module 300 produces the phrase words 746-1 to include "flying", "bat", "eats", and "fruit."

The element identification module 302 identifies identigens for each word of the trusted phrase 744-1 to produce sets of identigens 750-1. As an example of the identifying, the element identification module 302 accesses the knowledge database 740 utilizing the phrase words 746-1 to recover identigen information 748. The identigen information 748 includes, for each word, a set of associated identigens. A set of identigens of the sets of identigens 750-1 includes one or more different meanings of a word of the query. For example, identigens of a first word of the trusted phrase 744-1 includes one or more different meanings of the first word. For instance, meanings of the word "flying" includes an identigen no. 12 for "capable of flight" and another identigen no. 13 for "to fly."

Figure 11B:
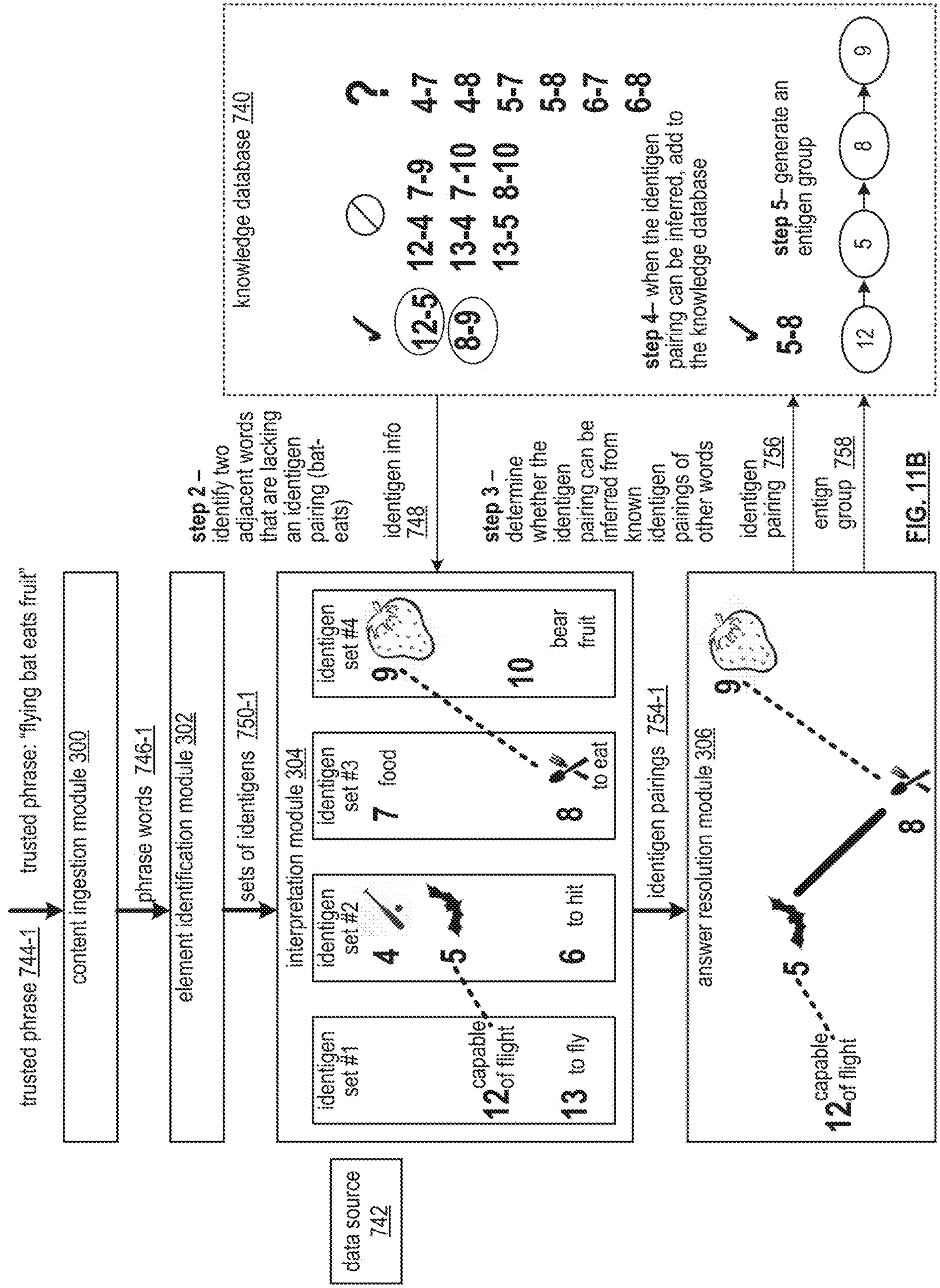

FIG. 11B further illustrates the example of the method of the generating the unambiguous interpretation of the ingested content to produce knowledge where the interpretation module 304 identifies two adjacent words of the trusted phrase that are lacking an identigen pairing. The identigen pairings includes pairs of identigens for adjacent words that are valid (e.g., curated) in accordance with identigen information 748 from the knowledge database 740. The identigen information 748 includes an indication of the valid pairings, invalid pairings, and unknown validity pairings (e.g., uncurated). The interpretation module 304 identifies the two adjacent words of the trusted phrase that are lacking an identigen pairing as "bat" and "eats" when the identigen information 748 does not include a valid identigen pairing of any of the identigens for "bat" with any of the identigens for "eats."

Having identified the two adjacent words, the interpretation module 304 determines whether the identigen pairing can be inferred for the two adjacent words based on known identigen pairings of other words of the trusted phrase 744-1. The determining includes a series of steps. A first step includes determining whether the knowledge database 740 includes a first known identigen pairing of the known identigen pairings for a first adjacent word of the two adjacent words and a first other word of the other words of the trusted phrase. For example, the interpretation module 304 interprets the identigen information 748 to identify the first known identigen pairing as a pairing between identigens 12 and 5 when the first adjacent word of the two adjacent words is "bat" and the first other word of the other words is "flying."

A second step includes determining whether the knowledge database 740 includes a second known identigen pairing of the known identigen pairings for a second adjacent word of the two adjacent words and a second other word of the other words of the trusted phrase. For example, the interpretation module 304 interprets the identigen information 748 to identify the second known identigen pairing as another pairing between identigens 8 and 9 when the second adjacent word of the two adjacent words is "eats" and the second other word of the other words is "fruit."

When the knowledge database 740 includes the first and second known identigen pairings, a third step includes indicating that the identigen pairing can be inferred for the two adjacent words. For example, the interpretation module 304 indicates that identigen pairings 754-1 includes the 12-5 identigen pairing, the 8-9 identigen pairing, and by inference, an identigen pairing between identigens 5 and 8.

When the identigen pairing can be inferred for the two adjacent words, the answer resolution module 306 adds to the knowledge database 740 the identigen pairing of the two adjacent words. For example, the answer resolution module 306 issues the 5-8 identigen pairing 756 to the knowledge database 740 for storage (e.g., as a valid identigen pairing).

Having identified the identigen pairing for the two adjacent words, the answer resolution module 306 generates an entigen group 758 based on the identigen pairing of the two adjacent words of the trusted phrase and the known identigen pairings of the other words of the trusted phrase. The entigen group 758 represents a most likely meaning of the trusted phrase 744-1. For example, the answer resolution module 306 generates the entigen group 758 to include entigen 12 connected to entigen 5 connected to entigen 8 connected to entigen 9. Having generated the entigen group 758, the answer resolution module 306 facilitates storage of the entigen group 758 in the knowledge database 740.

Figure 11C:
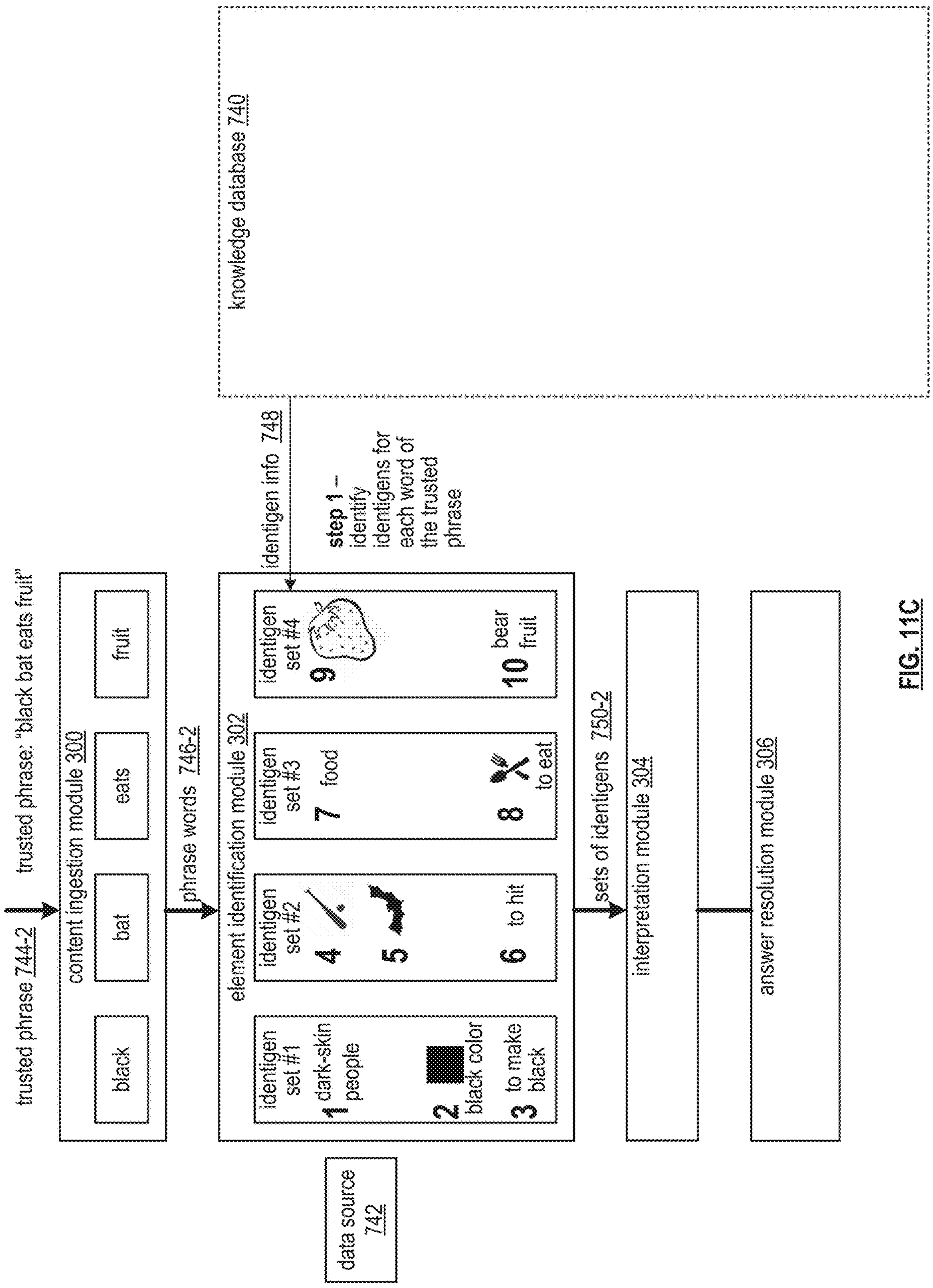

FIG. 11C illustrates a second example of the method of the generating the unambiguous interpretation of the ingested content to produce knowledge where the content ingestion module 300 receives a trusted phrase 744-2 and parses the trusted phrase 744-2 to produce phrase words 746-2 that includes a plurality of words. For example, when the trusted phrase 744-2 includes "black bat eats fruit", the content ingestion module 300 produces the phrase words 746-2 to include "black", "bat", "eats", and "fruit."

The element identification module 302 identifies identigens for each word of the trusted phrase 744-2 to produce sets of identigens 750-2. As an example of the identifying, the element identification module 302 accesses the knowledge database 740 utilizing the phrase words 746-2 to recover identigen information 748. The identigen information 748 includes, for each word, a set of associated identigens. A set of identigens of the sets of identigens 750-2 includes one or more different meanings of a word of the query. For example, identigens of a first word of the trusted phrase 744-2 includes one or more different meanings of the first word. For instance, meanings of the word “black” includes an identigen no. 1 for “dark-skin people”, an identigen no. 2 for “black color”, and another identigen no. 3 for “to make black.”

Figure 11D:
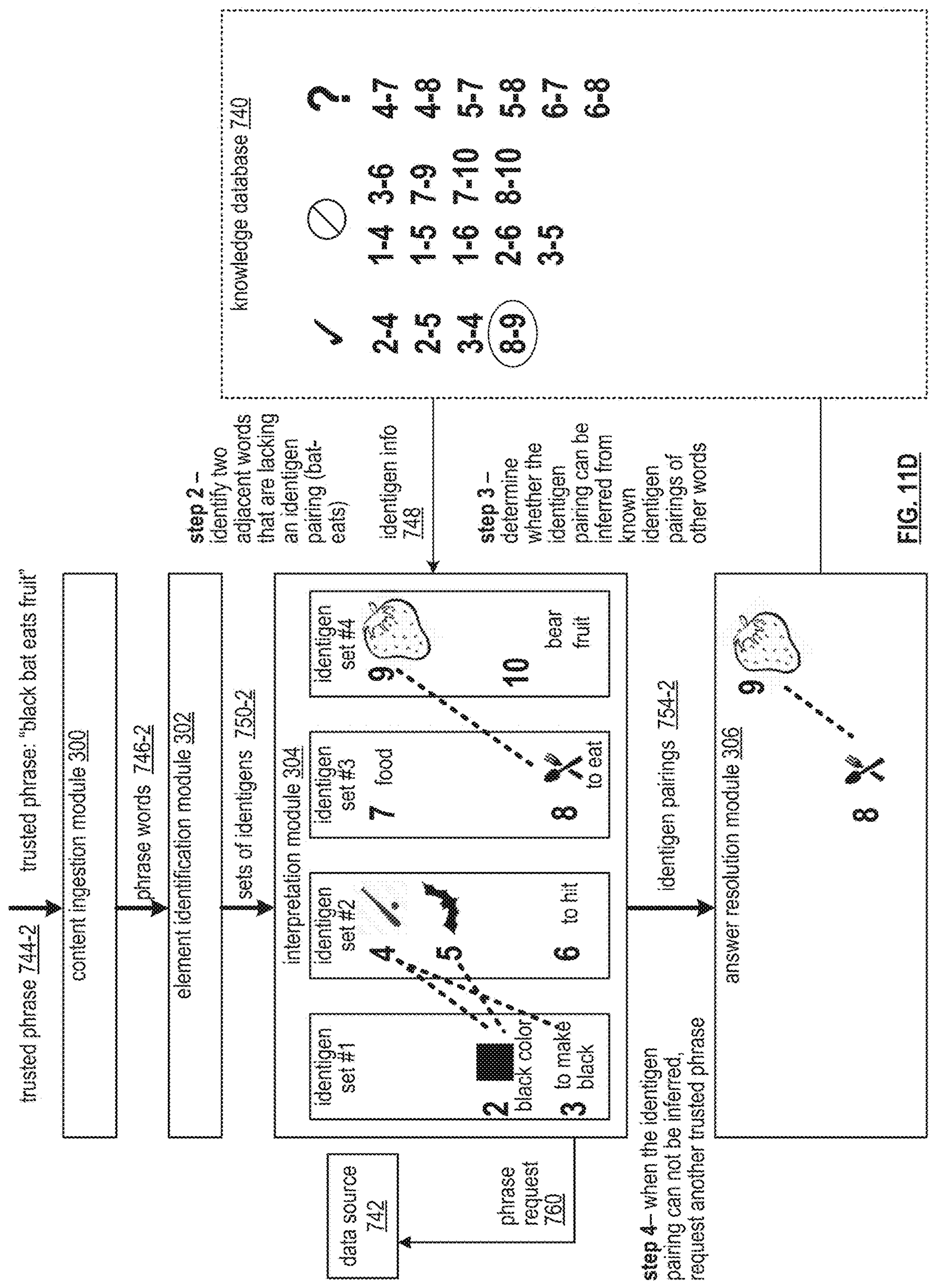

FIG. 11D further illustrates the second example of the method of the generating the unambiguous interpretation of the ingested content to produce knowledge where the interpretation module 304 identifies two adjacent words of the trusted phrase 744-2 that are lacking an identigen pairing. The interpretation module 304 identifies the two adjacent words of the trusted phrase that are lacking an identigen pairing as “bat” and “eats” when the identigen information 748 does not include a valid identigen pairing of any of the identigens for “bat” with any of the identigens for “eats.”

Having identified the two adjacent words, the interpretation module 304 determines whether the identigen pairing can be inferred for the two adjacent words based on known identigen pairings of other words of the trusted phrase 744-2. The determining includes a series of steps. A first step includes determining whether the knowledge database 740 includes a first known identigen pairing of the known identigen pairings for a first adjacent word of the two adjacent words and a first other word of the other words of the trusted phrase. For example, the interpretation module 304 interprets the identigen information 748 to identify several first known identigen pairings to include valid pairings 2-4, 2-5, and 3-4 when the first adjacent word of the two adjacent words is “bat” and the first other word of the other words is “black.” The identifying of several first known identigen pairings does not narrow down to one identigen an identigen selection for the first adjacent word of the two adjacent words “bat.”

A second step includes determining whether the knowledge database 740 includes a second known identigen pairing of the known identigen pairings for a second adjacent word of the two adjacent words and a second other word of the other words of the trusted phrase. For example, the interpretation module 304 interprets the identigen information 748 to identify the second known identigen pairing as another pairing between identigens 8 and 9 when the second adjacent word of the two adjacent words is “eats” and the second other word of the other words is “fruit.”

When the knowledge database 740 does not include unambiguous first and second known identigen pairings (e.g., one each), a third step includes indicating that the identigen pairing can not be inferred for the two adjacent words based on the other words of the trusted phrase 744-2. The interpretation module 304 indicates that identigen pairings 754-2 includes the valid 8-9 identigen pairing.

When the identigen pairing can not be inferred for the two adjacent words, the interpretation module 304 facilitates subsequent identifying of identigens for each word of another trusted phrase by issuing a phrase request 760 to the data source 742, where the other trusted phrase includes at least one of the two adjacent words. For example, the interpretation module 304 identifies the word “bat” as the at least one of the two adjacent words along with the word “black” as identigen pairing ambiguity has been identified to be associated with the sequential words “black bat.” The data source 742 is known to include further associated phrases.

Figure 11E:
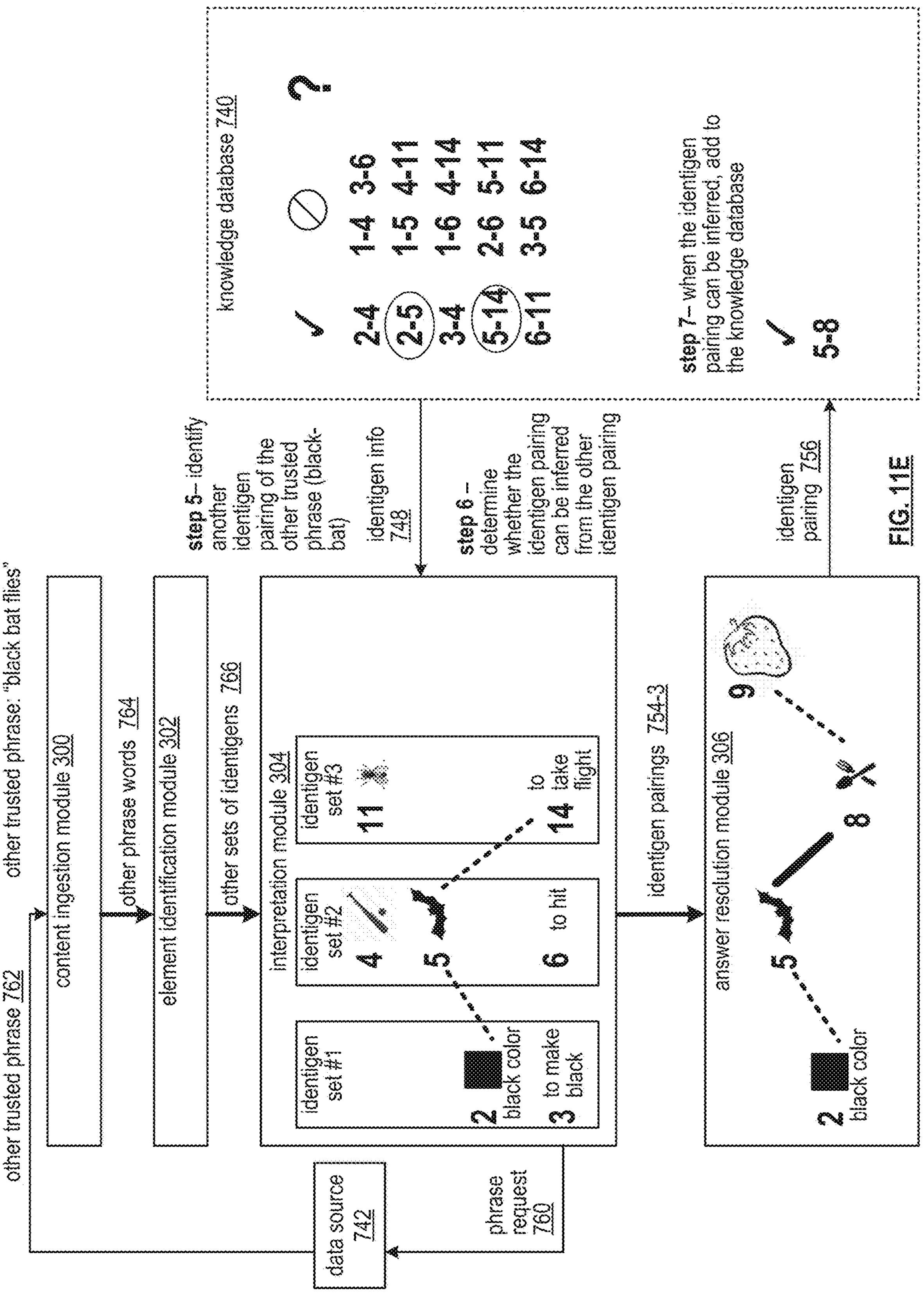

FIG. 11E further illustrates the second example of the method of the generating the unambiguous interpretation of the ingested content to produce knowledge where the content ingestion module 300 receives, in response to the phrase request 760, other trusted phrase 762 from the data source 742. The content ingestion module 300 issues other phrase words 764 to include the words “black, “bat”, and “flies” when the other trusted phrase 762 includes “black bat flies”.

The element identification module 302 identifies identigens for each word of the other trusted phrase 762 to produce other sets of identigens 766. The other trusted phrase 762 includes at least one of the two adjacent words (e.g., “bat”). For example, for each word of the other phrase words 764, the element identification module 302 accesses the knowledge database 740 to obtain identigen information 748 that includes a set of identigens for each word of “black bat flies.” For example, a third set of identigens includes a no. 11 identigen for “insect flies” and a no. 14 identigen for “to take flight.”

The interpretation module 304 identifies another identigen pairing for the at least one of the two adjacent words and another adjacent word of the other trusted phrase 762. For example, the interpretation module 304 identifies valid 2-5 identigen pairing when the at least one of the two adjacent words is “bat” and the other adjacent word of the other trusted phrase is “black” and the 2-5 identigen pairing is listed in identigen information 748 from the knowledge database 740.

The interpretation module 304 determines whether the identigen pairing can be inferred for the two adjacent words (e.g., “bat eats”) based on the other identigen pairing of the other trusted phrase 762. The determining includes determining whether the knowledge database 740 includes the other identigen pairing for the at least one of the two adjacent words and the other adjacent word of the other trusted phrase. For example, the interpretation module 304 indicates that valid 2-5 identigen pairing exists based on the identigen information 748.

When the knowledge database 740 includes the other identigen pairing (e.g., 2-5), the interpretation module 304 indicates that the identigen pairing can be inferred for the two adjacent words. When the identigen pairing can be inferred for the two adjacent words, the interpretation module 304 identifies the identigen pairing of the two adjacent words based on the other identigen pairing of the other trusted phrase. For example, the interpretation module 304 identifies a 5-8 identigen pairing based on the 2-5 identigen pairing and the 8-9 identigen pairing.

When the identigen pairing can be inferred for the two adjacent words, the answer resolution module 306 adds to the knowledge database 740 the identigen pairing of the two adjacent words. For example, the answer resolution module 306 issues the 5-8 identigen pairing 756 to the knowledge database 740 for storage (e.g., as a valid identigen pairing).

When the identigen pairing can not be inferred for the two adjacent words based on the other identigen pairing of the other trusted phrase, the interpretation module 304 obtains yet another trusted phrase to loop back on the method described above until either the identigen pairing can be inferred or a maximum number of loops has been performed. The yet another trusted phrase includes the at least one of the two adjacent words. The answer resolution module 306 obtains the identigen pairing from a manual input (e.g., operator input) when the maximum number of loops has been performed.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 12A:
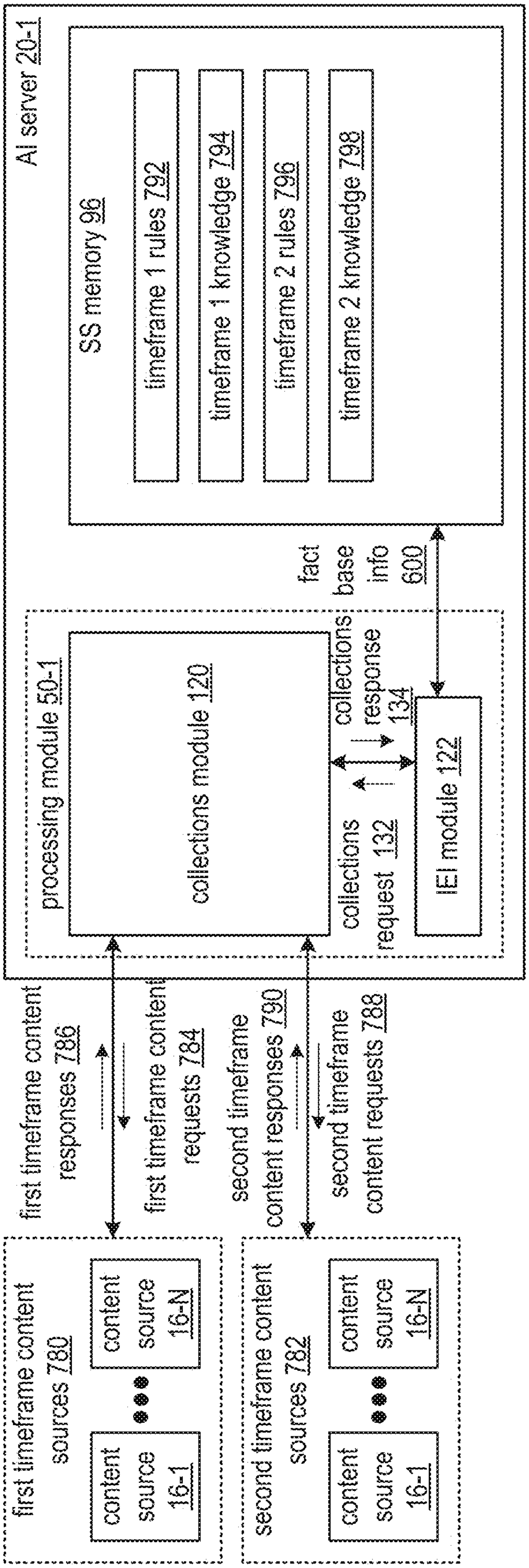
FIG. 12A is a schematic block diagram of another embodiment of a computing system in accordance with the present invention.

FIG. 12A is a schematic block diagram of another embodiment of a computing system that includes first time frame content sources 780, second time frame content sources 782, and the AI server 20-1 of FIG. 1. The first and second time frame content sources 780 and 782 include content sources 16-1 through 16-N of FIG. 1. The AI server 20-1 includes the processing module 50-1 of FIG. 2 and the SS memory 96 of FIG. 2. The processing module 50-1 includes the collections module 120 of FIG. 4A and the IEI module 122 of FIG. 4A. The SS memory 96 includes memory sections allocated to time frame 1 rule 792, timeframe 1 knowledge 794, timeframe 2 rules 796, and timeframe 2 knowledge 798. Generally, an embodiment of the invention presents solutions where the computing system 10 supports updating analysis of subsequent content based on detecting shifts in language utilization of previous content.

In an example of operation of the updating the analysis of the subsequent content based on the detecting of the shifts in the language utilization of the previous content, the IEI module 122 facilitates ingesting of common language content associated with a first time frame to produce first time frame knowledge based on knowledge generation rules. The first time frame knowledge includes knowledge based on the content and a language utilization vector. The language utilization vector includes an indicator of adherence of utilization of common language over time based on timeframe 1 rule 792 (i.e., instances of change of definition of words, instances of change of utilization of pairs of words, instances of changes of sentence structuring, etc.).

The facilitating includes issuing a collections request 132 to the collections module 120, where the collections module 120 issues first time frame content requests 784 to the first time frame content sources 780 to cause receiving of first time frame content responses 786. The collections module 120 generates a collections response 134 based on the first time frame content responses 786. The facilitating further includes IEI processing the received content in accordance with timeframe 1 rules 792 to produce the time frame 1 knowledge 794 for storage as fact base information 600 in the SS memory 96, and analyzing adherence of the utilization of the common language with regards to the timeframe 1 rules 792 to produce the language utilization vector.

The IEI module 122 determines whether a shift in utilization of the common language has occurred. The determining includes indicating that the shift has occurred when the language utilization vector compares unfavorably to a maximum language utilization vector threshold level (e.g., too many instances of new utilization of words, too many instances of utilization of groups of words to convey a new interpretation, etc.).

When the shifting of utilization of the common language has occurred, the IEI module 122 facilitates updating the knowledge generation rules to produce updated knowledge generation rules to enable subsequent ingesting of language content associated with a second time frame to produce second time frame knowledge based on the updated knowledge generation rules. The facilitating includes obtaining timeframe 2 rules 796 (e.g., receive, determine from the changing utilization of the common language), storing the timeframe 2 rules 796 in the SS memory 96 as fact base information 600, and issuing another collections request 132 to the collections module 120.

The collections module 120 issues second time frame content requests 788 to the second time frame content sources 782 to cause receiving of second time frame content responses 790, to further cause receiving of another collections response 134 from the collections module 120 based on the second time frame content responses 790.

The IEI module 122 IEI processes the received content in accordance with timeframe 2 rules 796 to produce the timeframe 2 knowledge 798 for storage as fact base information 600 in the SS memory 96. The IEI module 122 continues to analyze adherence of the utilization of the common language with regards to the timeframe 2 rules 796 to produce an updated language utilization vector to enable subsequent adaptation.

Figure 12B:
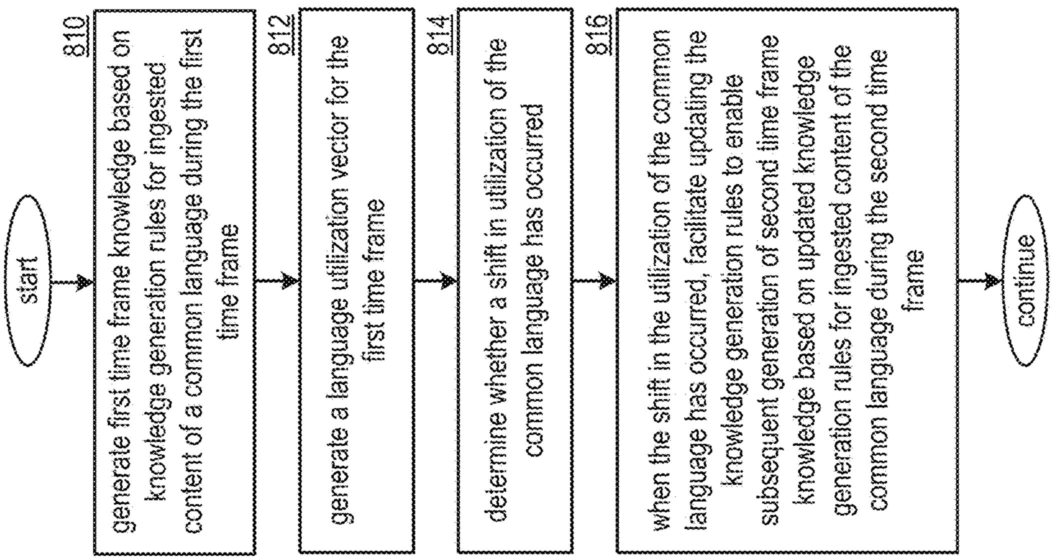
FIG. 12B is a logic diagram of an embodiment of a method for updating analysis of subsequent content based on detecting shifts in language utilization of previous content within a computing system in accordance with the present invention.

FIG. 12B is a logic diagram of an embodiment of a method for updating analysis of subsequent content based on detecting shifts in language utilization of previous content within a computing system. In particular, a method is presented for use in conjunction with one or more functions and features described in conjunction with FIGS. 1-8D, 12A, and also FIG. 12B. The method includes step 810 where a processing module of one or more processing modules of one or more computing devices of the computing system generates first time frame knowledge based on knowledge generation rules for ingested content of a common language during the first time frame. The generating includes causing issuing of first time frame content requests to first time frame content sources to cause receiving of first time frame content responses, and IEI processing the received content in accordance with the knowledge generation rules to produce the first time frame knowledge.

The method continues at step 812 or the processing module generates a language utilization vector for the first time frame. The generating includes analyzing the utilization of the common language with regards to the knowledge generation rules to produce the knowledge utilization vector for the first time frame.

The method continues at step 814 where the processing module determines whether a shift in utilization of the common language has occurred. The determining includes indicating that the shift has occurred when the language utilization vector compares unfavorably to a maximum language utilization vector threshold level (e.g., too many instances of new utilization of words, too many instances of utilization of groups of words to convey new interpretations, etc.).

When the shift in utilization of the common language has occurred, the method continues at step 816 where the processing module facilitates updating the knowledge generation rules to enable subsequent generation of second time frame knowledge based on updated knowledge generation rules for ingested content of the common language during the second time frame. The facilitating includes obtaining updated knowledge generation rules (e.g., receiving, determining from the changing utilization of the common language), causing issuing of second time frame content requests to second time frame content sources to cause receiving of second time frame content responses, and IEI processing the received content in accordance with the updated knowledge generation rules to produce the second time frame knowledge. The facilitating further includes continuing to analyze adherence of the utilization of the common language with regards to the updated knowledge generation rules to produce an updated language utilization vector to enable subsequent adaptation.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 13A:
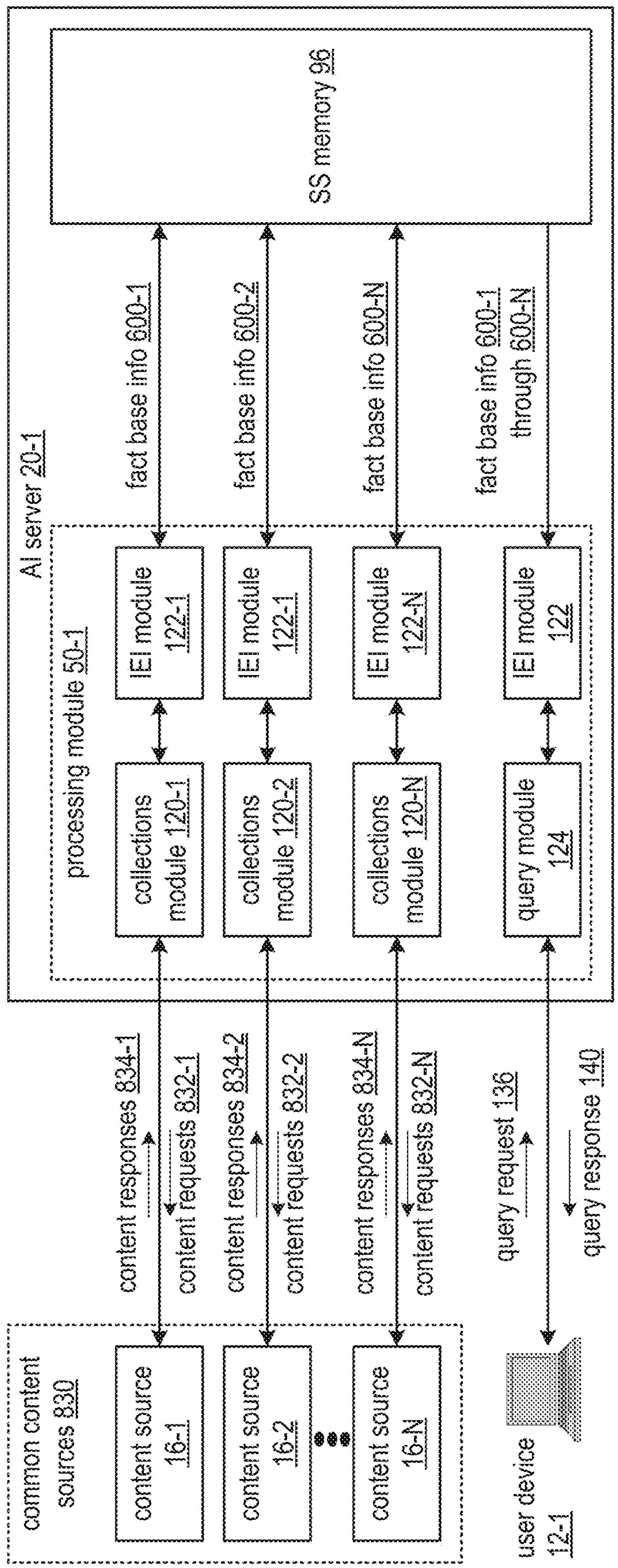
FIG. 13A is a schematic block diagram of another embodiment of a computing system in accordance with the present invention.

FIG. 13A is a schematic block diagram of another embodiment of a computing system that includes common content sources 830, the AI server 20-1 of FIG. 1, and the user device 12-1 of FIG. 1. The common content sources 830 includes the content sources 16-1 through 16-N of FIG. 1. The AI server 20-1 includes the processing module 50-1 of FIG. 2 and the SS memory 96 of FIG. 2. The processing module 50-1 includes the query module 124 of FIG. 4A and the IEI module 122 of FIG. 4A. The processing module 50-1 further includes collections modules 120-1 through 120-N and may be implemented utilizing the collections module 120 of FIG. 4A. The processing module 50-1 further includes IEI modules 122-1 through 122-N and may be implemented utilizing the IEI module 122 of FIG. 4A. Generally, an embodiment of the invention presents solutions where the computing system 10 supports determining a knowledge base quality level.

In an example of operation of the determining of the knowledge base quality level, the IEI modules 122-1 through 122-N facilitate storage of a portion of trusted fact base information based on associated portions of common content. The facilitating includes, for each IEI module 122-1 through 122-N, causing collection of content responses 834-1 through 834-N by causing corresponding collections modules 120-1 through 120-N to issue corresponding content requests 832-1 through 832-N to a corresponding content source 16-1 through 16-N of the common content sources 830.

The IEI module 122 IEI processes the received content to produce an associate a portion of a knowledge base and generates an indication of trust (e.g., generating a block chain over one or more of the portion of the knowledge base, generating identifiers of the content source, including a portion of the corresponding content, etc.). The IEI module 122 further stores the portion of the knowledge base and the indication of trust in the SS memory 96 as fact base information 600-1 through 600-N.

The IEI module 122 generates an answer for a query response to a query request from a requesting entity. The query response is based on two or more portions of the knowledge base. For example, the IEI module 122 receives, via the query module 124, a query request 136 from the user device 12-1, IEI processes the query request 136 to generate a knowledge base query, accesses two or more portions of the fact base information 600-1 through 600-N based on the knowledge base query, and compares the knowledge base query to the two or more portions of the fact base information to produce the answer.

The IEI module 122 interprets an indication of trust associated with each of the two or more portions of the fact base to produce a level of trust associated with the query response. For example, the interpreting includes, for each portion, verifying a block chain when a blockchain is utilized to establish the indication of trust and generating the level of trust associated with the query response based on the block chain verifications. For example, indicate favorable level of trust when all block chains are verified, or indicate a scaler level of trust when one or more block chains verify unfavorably, etc. The IEI module 122 issues, via the query module 124, a query response 140 to the user device 12-1, where the query response 140 includes the answer in the level of trust.

Figure 13B:
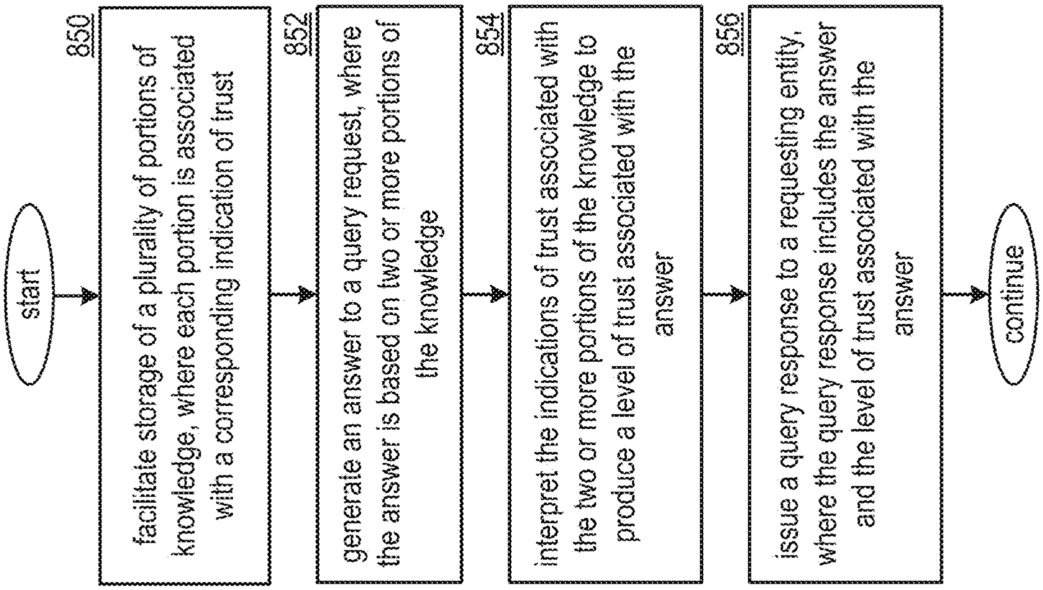
FIG. 13B is a logic diagram of an embodiment of a method for determining a knowledge base quality level within a computing system in accordance with the present invention.

FIG. 13B is a logic diagram of an embodiment of a method for determining a knowledge base quality level within a computing system. In particular, a method is presented for use in conjunction with one or more functions and features described in conjunction with FIGS. 1-8D, 13A, and also FIG. 13B. The method includes step 850 where a processing module of one or more processing modules of one or more computing devices of the computing system facilitates storage of plurality of portions of knowledge, where each portion is associated with a corresponding indication of trust.

The facilitating includes causing collection of content responses by causing issuing of corresponding content requests to a corresponding content source, IEI processing the received content to produce an associated portion of a knowledge database, and generating an indication of trust. The facilitating further includes storing the portion of the knowledge database and the indication of trust in the knowledge base.

The method continues at step 852 where the processing module generates an answer to a query request, where the answer is based on two or more portions of the knowledge. The generating includes receiving the query request, IEI processing the query request to facilitate generating a knowledge base query, and accessing the two or more portions of the knowledge base as indicated by the knowledge base query. The generating further includes comparing the knowledge base query to the two or more portions of the knowledge base to produce the answer.

The method continues at step 854 where the processing module interprets the indications of trust associated with the two or more portions of the knowledge to produce a level of trust associated with the answer. The interpreting includes, for each portion, verifying the block chain when the blockchain is utilized to establish the indication of trust, and generating the level of trust associated with a query response based on the block chain verifications (e.g., indicating a favorable level of trust when all block chains are verified, indicating a scaler value of trust when one or more block chains verify unfavorably, etc.).

The method continues at step 856 where the processing module issues a query response to a requesting entity, where the query response includes the answer in the level of trust associated with the answer. The issuing includes generating the query response to include the answer and the level of trust associated with the answer and sending the query response to the requesting entity.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 14A:
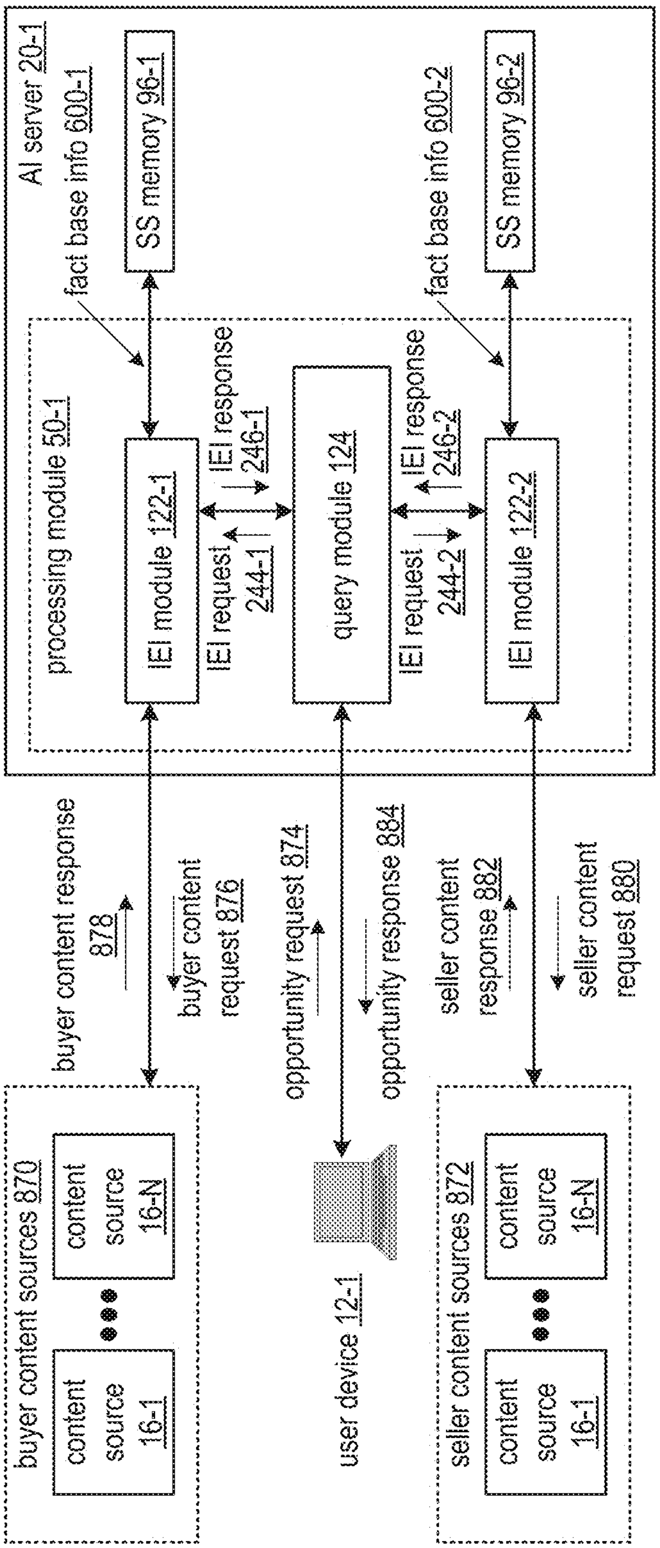
FIG. 14A is a schematic block diagram of another embodiment of a computing system in accordance with the present invention.

FIG. 14A is a schematic block diagram of another embodiment of a computing system that includes buyer content sources 870, seller content sources 872, the user device 12-1 of FIG. 1, and the AI server 20-1 of FIG. 1. Each of the buyer content sources 870 and the seller content sources 872 includes the content sources 16-1 through 16-N of FIG. 1. The AI server 20-1 includes the processing module 50-1 of FIG. 2 and SS memories 96-1 and 96-2, where the SS memories 96-1 and 96-2 may be implemented utilizing the SS memory 96 of FIG. 2. The processing module 50-1 includes the query module 124 of FIG. 4A and IEI modules 122-1 and 122-2, where the IEI modules 122-1 and 122-2 may be implemented utilizing the IEI module 122 of FIG. 4A. Generally, an embodiment of the invention presents solutions where the computing system 10 supports identifying a potential economic transaction.

In an example of operation of the identifying of the potential economic transaction, the IEI module 122-1 facilitates obtaining buyer knowledge for a plurality of buyers. For example, the facilitating includes receiving an IEI request 244-1 from the query module 124, where the query module 124 receives an opportunity request 874 from the user device 12-1, and where the opportunity request 874 requests information with regards to potential economic transactions between sellers and buyers.

The facilitating further includes causing issuing of buyer content requests 876 to one or more of the content sources 16-1 through 16-N of the buyer content sources 870. The buyer content includes one or more of past purchase information, potential future needs, lifestyle information, potential employment related purchases, vacation interest, social connections, etc. The facilitating further includes receiving buyer content responses 878, and IEI processing the buyer content of the buyer content responses 878 to produce the buyer knowledge for storage as fact base information 600-1 in the SS memory 96-1.

The IEI module 122-2 facilitates obtaining seller knowledge for a plurality of sellers. For example, the facilitating includes receiving an IEI request 244-2 from the query module 124 with regards to the opportunity request 874, where the IEI request 244-2 includes one or more of the request for information with regards to the potential economic transactions and at least a portion of the buyer knowledge (e.g., to identify broad potential opportunities such as product areas, regions, high-level demographics, etc.).

The facilitating further includes causing issuing of seller content requests 880 to one or more of the content sources 16-1 through 16-N of the seller content sources 872. The seller content includes, for each seller of the plurality of the sellers, one or more of product and service offerings (e.g., hard products, services, potential services, future product ideas, associated purchase needs, purchase justifications, etc.). The facilitating further includes receiving seller content responses 882 and IEI processing the seller content of the seller content responses 882 to produce the seller knowledge for storage as fact base information 600-2 in the SS memory 96-2.

Having obtained the seller knowledge, the IEI module 122-2 identifies one or more of the potential economic transactions of sellers to buyers. For example, the IEI module 122-2 IEI processes the query with regards to the potential transactions utilizing the buyer knowledge and the seller knowledge to produce at least one potential economic transaction. For instance, the buyer is looking for 10,000 widgets in 60 days and a particular seller is offering at least 10,000 widgets in the timeframe with favorable pricing.

Having identified the one or more of the potential economic transactions, the IEI module 122-2 indicates the one or more potential economic transactions between sellers and buyers. For example, the IEI module 122-2 causes the query module 124 to issue an opportunity response 884 to the user device 12-1 by issuing an IEI response 246-2 to the query module 124, where the IEI response 246-2 includes the at least one potential economic transaction. The indicating may further include issuing one or more notifications to user devices associated with at least one buyer and at least one seller, where the notification includes the potential economic transaction.

Figure 14B:
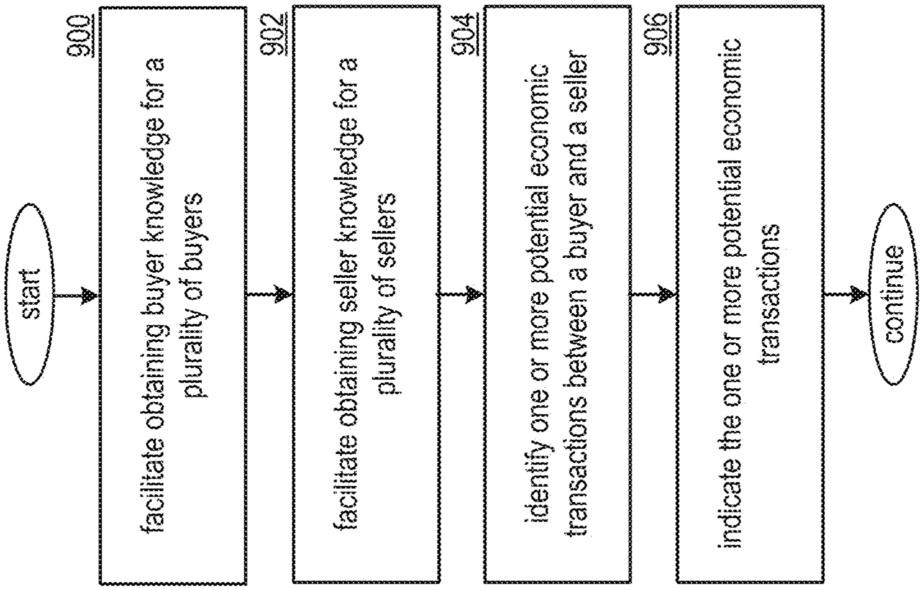
FIG. 14B is a logic diagram of an embodiment of a method for identifying a potential economic transaction within a computing system in accordance with the present invention.

FIG. 14B is a logic diagram of an embodiment of a method for identifying a potential economic transaction within a computing system. In particular, a method is presented for use in conjunction with one or more functions and features described in conjunction with FIGS. 1-8D, 14A, and also FIG. 14B. The method includes step 900 where a processing module of one or more processing modules of one or more computing devices of the computing system facilitates obtaining buyer knowledge for a plurality of buyers. For example, the processing module receives an opportunity request from a requesting entity. The opportunity request includes a request for information with regards to potential economic transactions between sellers and buyers, causes issuing of buyer content requests to one or more content sources of buyer content sources. The processing module receives buyer content responses, and IEI processes the buyer content of the buyer content responses to produce the buyer knowledge for storage.

The method continues at step 902 where the processing module facilitates obtaining seller knowledge for a plurality of sellers. For example, the processing module causes issuing of seller content requests to one or more content sources of seller content sources, receives seller content responses, and IEI processes the seller content of the seller content responses to produce the seller knowledge for storage.

The method continues at step 904 where the processing module identifies one or more potential economic transactions between a buyer and a seller. For example, the processing module IEI processes the query with regards to the potential economic transactions utilizing the buyer knowledge and the seller knowledge to produce at least one potential economic transaction. For instance, the processing module IEI processes a question that includes matching a buyer of a particular late model car to a seller that has the particular late model car in inventory.

The method continues at step 906 for the processing module indicates the one or more potential economic transactions. For example, the processing module issues an opportunity response to the requesting entity, where the opportunity response includes the at least one potential economic transaction. The indicating may further include issuing one or more notifications to user devices associated with at least one buyer and at least one seller, where the notification includes the potential economic transaction. For example, the processing module facilitates issuing a group notification to a group of user devices with regards to purchasing a newly available lifestyle product, where the group of user devices are affiliated with a lifestyle that is targeted by the available lifestyle product.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 15A:
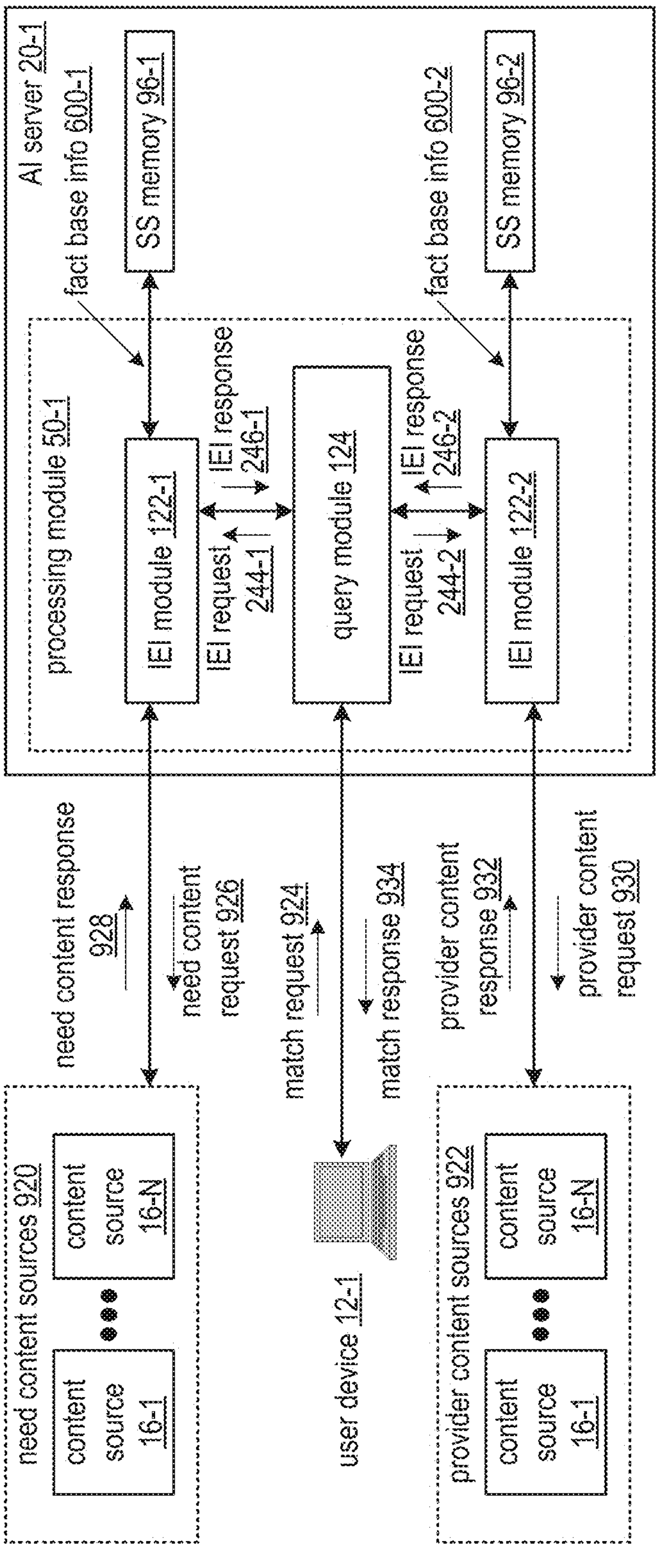
FIG. 15A is a schematic block diagram of another embodiment of a computing system in accordance with the present invention.

FIG. 15A is a schematic block diagram of another embodiment of a computing system that includes need content sources 920, provider content sources 922, the user device 12-1 of FIG. 1, and the AI server 20-1 of FIG. 1. Each of the need content sources 920 and the provider content sources 922 includes the content sources 16-1 through 16-N of FIG. 1. The AI server 20-1 includes the processing module 50-1 of FIG. 2 and SS memories 96-1 and 96-2, where the SS memories 96-1 and 96-2 may be implemented utilizing the SS memory 96 of FIG. 2. The processing module 50-1 includes the query module 124 of FIG. 4A and IEI modules 122-1 and 122-2, where the IEI modules 122-1 and 122-2 may be implemented utilizing the IEI module 122 of FIG. 4A. Generally, an embodiment of the invention presents solutions where the computing system 10 supports brokering a solution for a problem.

In an example of operation of the brokering of the solution for the problem, the IEI module 122-1 facilitates obtaining needs knowledge for a plurality of meeting entities. As an example of the facilitating, the IEI module 122-1 receives and IEI request 244-1 from the query module 124, where the query module 124 receives a match request 924 from the user device 12-1. The match request 924 requests information with regards to unmet needs of the needing entities to providers.

The facilitating further includes issuing of need content requests 926 to one or more of the content sources 16-1 through 16-N of the need content sources 920, where need content includes one or more of unmet needs, partially met needs, previous purchases, previous purchase information, identifiers of providing entities, results of providing needs, etc. The facilitating further includes receiving need content responses 928 and IEI processing need content of the need content responses 928 to produce the needs knowledge for storage as fact base information 600-1 in the SS memory 96-1.

The IEI module 122-2 facilitates obtaining provider knowledge for a plurality of providing entities. As an example of the facilitating, the IEI module 122-2 receives an IEI request 244-2 from the query module 124 with regards to the match request 924. The IEI request 244-2 includes one or more of the request for information with regards to the unmet needs and at least a portion of the needs knowledge (e.g., to identify broad potential matches such as product areas, service areas, etc.).

The facilitating further includes issuing of provider content requests 930 to one or more of the content sources 16-1 through 16-N of the provider content sources 922, where provider content includes one or more of offerings of products, services, support, labor, consulting, etc. The facilitating further includes receiving provider content responses 932 and IEI processing the provider content of the provider content responses 932 to produce the provider content for storage as fact base information 600-2 in the SS memory 96-2.

Having obtained the provider knowledge, the IEI module 122-2 identifies one or more of the matches of needs of needing entities to provider content of the providing entities. As an example of the identifying, the IEI module 122-2 IEI processes the query with regards to the matches utilizing the needing entity knowledge and the provider knowledge to reduce at least one potential match. Examples of outcomes of the IEI processing includes matching a financial product to a client, matching a financial advisor to a client, matching a realtor to a home purchase, matching a family to particular house, matching a car shopper to a particular vehicle for sale, matching a product shopper to a particular distributor, etc.

Having identified one or more of the matches, the IEI module 122-2 indicates the one or more matches of the needs of the needing entities to the provider content of the providing entities. As an example of the indicating, the IEI module 122-2 causes the query module 124 to issue a match response 934 to the user device 12-1 by issuing an IEI response 246-2 to the query module 124, where the IEI response 246-2 includes the at least one match. The indicating may further include issuing one or more notifications to user devices associated with at least one needing entity and at least one entity provider, where the notification includes the associated match.

Figure 15B:
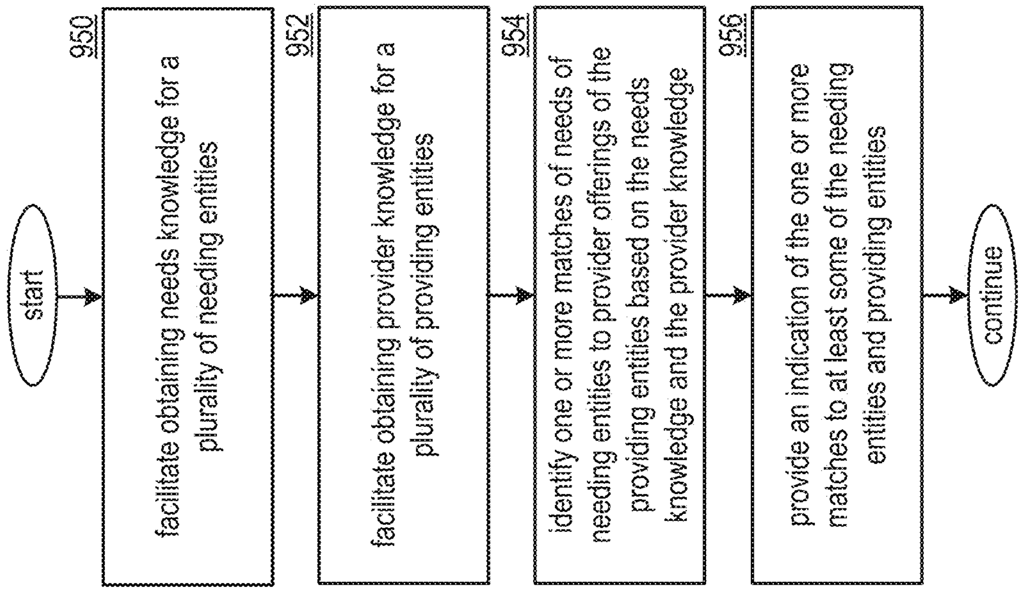
FIG. 15B is a logic diagram of an embodiment of a method for brokering a solution for a problem within a computing system in accordance with the present invention.

FIG. 15B is a logic diagram of an embodiment of a method for brokering a solution for a problem within a computing system. In particular, a method is presented for use in conjunction with one or more functions and features described in conjunction with FIGS. 1-8D, 15A, and also FIG. 15B. The method includes step 950 where a processing module of one or more processing modules of one or more computing devices of the computing system facilitates obtaining needs knowledge for a plurality of meeting entities. For example, the processing module identifies an unmet need by at least one of receiving a match request from a requesting entity and detecting an unmet need, causes issuing of need content requests to one or more of the content sources of need content sources, receives need content responses, and IEI processes the need content of the need content responses to produce the needs knowledge for storage.

The method continues at step 952 where the processing module facilitates obtaining provider knowledge for a plurality of providing entities. For example, the processing module causes issuing of provider content requests to one or more content sources of provider content sources, receives provider content responses, and IEI processes the provider content of the provider content responses to produce the provider knowledge for storage.

The method continues at step 954 where the processing module identifies one or more matches of needs of needing entities to provider offerings of the providing entities based on the needs knowledge and the provider knowledge. For example, the identifying includes IEI processing a query with regards to the matches utilizing the needing entity knowledge and the provider knowledge to produce at least one potential match. Examples of matches includes matching an open employment opportunity to a variety of potential job candidates, matching a particular political candidate up for election to a group of individuals aligned with the potential of the particular political candidate, and matching a college-bound student to a short list of viable candidate colleges to optimize a desired outcome (e.g., graduation).

The method continues at step 956 where the processing module provides an indication of the one or more matches to at least some of the needing entities and providing entities. For example, the processing module issues a match response to the requesting entity, where the match response includes the at least one match. The indicating may further include issuing one or more notifications to user devices associated with at least one needing entity and at least one entity provider, for the notification includes the associated match.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 16A:
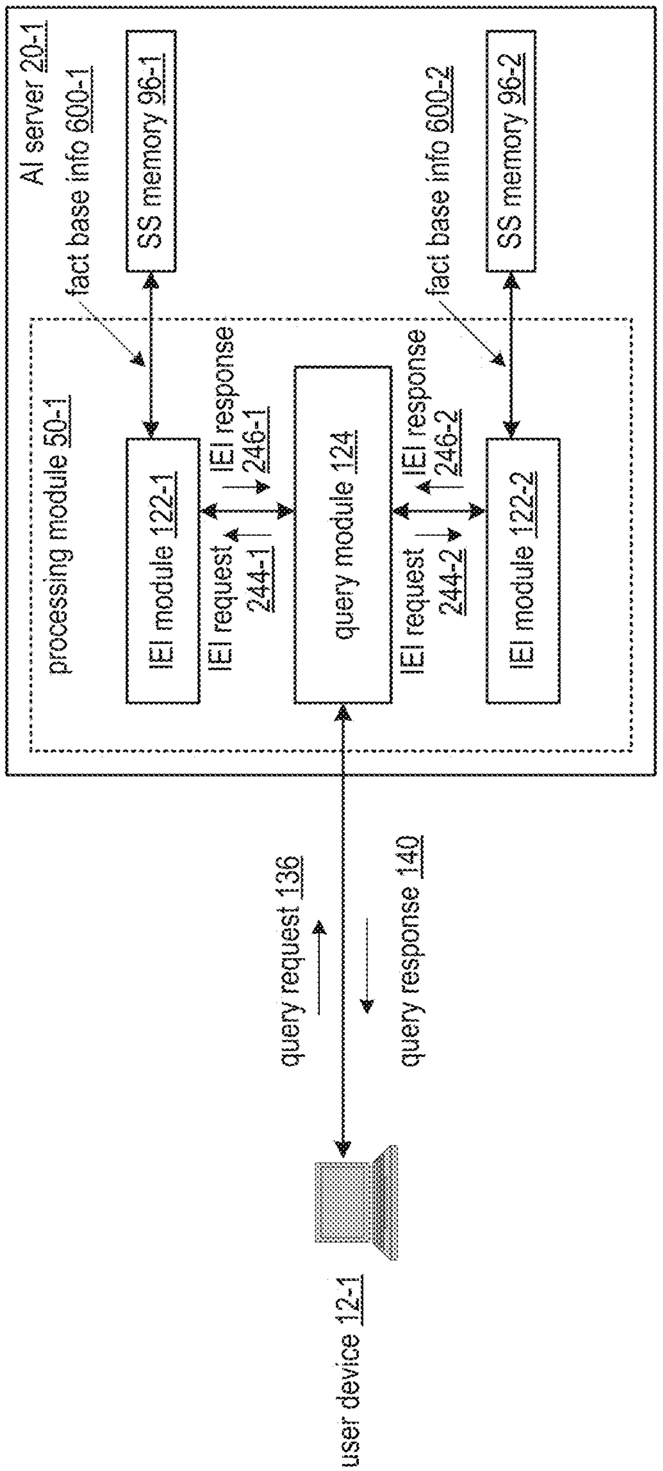
FIG. 16A is a schematic block diagram of another embodiment of a computing system in accordance with the present invention.

FIG. 16A is a schematic block diagram of another embodiment of a computing system that includes the user device 12-1 of FIG. 1 and the AI server 20-1 of FIG. 1. The AI server 20-1 includes the processing module 50-1 of FIG. 2 and SS memories 96-1 and 96-2, where the SS memories 96-1 and 96-2 may be implemented utilizing the SS memory 96 of FIG. 2. The processing module 50-1 includes the query module 124 of FIG. 4A and IEI modules 122-1 and 122-2, where the IEI modules 122-1 and 122-2 may be implemented utilizing the IEI module 122 of FIG. 4A. Generally, an embodiment of the invention presents solutions where the computing system 10 supports resolving conflicting knowledge base information.

In an example of operation of the resolving of the conflicting knowledge base information, the query module 124 detects a query response conflict, where two or more query responses include at least one conflicting aspect (e.g., where the two or more query responses are based on one or more knowledge bases). As an example of the detecting, the query module 124 receives IEI responses 246-1 and 246-2, where the IEI module 122-1 generates the IEI response 246-1 based on IEI processing and IEI request 244-1 utilizing a knowledge base associated with the SS memory 96-1. The query module 124 generates the IEI request 244-1 based on a query request 136 from the user device 12-1. The IEI module 122-2 generates the IEI response 246-2 based on IEI processing and IEI request 244-2 utilizing a knowledge base associated with SS memory 96-2.

The query module 124 generates the IEI request 244-2 based on the query request 136, compares the IEI responses 246-1 and 246-2 to produce a comparison (e.g., comparing one or more aspects of the query responses. The query module 124 indicates the query response conflict when the comparison is unfavorable (e.g., the query responses are different by more than one aspect).

Having detected the query response conflict, the query module 124 determines a conflict resolution approach. Conflict resolution approaches includes one or more of all or nothing using an entire query response, utilizing nothing of the response, piecemeal utilizing aspects of two or more query responses, utilizing weighted comparison parameters, a round-robin approach, a first to respond selection approach, based on a predetermination, based on a request, based on historical records, etc. The determining includes one or more of selecting based on one or more of a predetermination, a knowledge domain of the query request, a level of the query response conflict, the response time requirement of providing a composite query response, extracting a template solution approach from the query request, etc.

Having determined the conflict resolution approach, the query module 124 obtains comparison parameters associated with the query response conflict. The comparison parameters include one or more of time, historical correlations of answers, the trust level of content, a trust level of knowledge, a process utilized to convert content into knowledge, etc. The obtaining includes one or more of extracting from a knowledge base, interpreting a query response, deducing from a pattern associated with the knowledge indicator, extracting from the query request, utilizing predetermined comparison parameters, etc.

Having obtained the comparison parameters, the query module 124 performs a comparison of the two or more query responses utilizing the comparison parameters in accordance with the conflict resolution approach to produce conflict resolution guidance. As an example of the performing, the query module 124 selects aspects of the two or more query responses to produce a composite query response 140 to send to the user device 12-1, where the selection is in accordance with the comparison parameters and conflict resolution approach (e.g., what is important, utilizing the weighting factor, selecting best of, etc.).

Figure 16B:
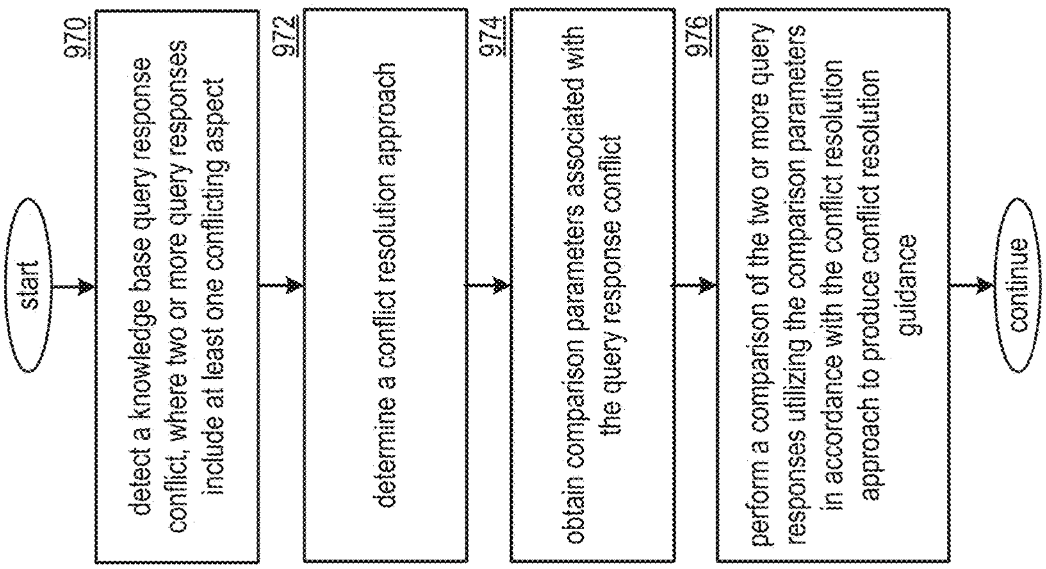
FIG. 16B is a logic diagram of an embodiment of a method for resolving conflicting knowledge base information within a computing system in accordance with the present invention.

FIG. 16B is a logic diagram of an embodiment of a method for resolving conflicting knowledge base information within a computing system. In particular, a method is presented for use in conjunction with one or more functions and features described in conjunction with FIGS. 1-8D, 16A, and also FIG. 16B. The method includes step 970 where a processing module of one or more processing modules of one or more computing devices of the computing system detects a knowledge base query response conflict, where two or more query responses include at least one conflicting aspect, and where the two or more query responses are based on one or more knowledge bases. As an example of the detecting, the processing module receives the two or more query responses, where each query is generated by IEI processing a common query request, compares the two or more query responses to produce a comparison (e.g., comparing one or more aspects), and indicates the query response conflict when the comparison is unfavorable (e.g., the query responses are different by more than one aspect).

The method continues at step 972 where the processing module determines a conflict resolution approach. For example, the processing module selects the conflict resolution approach based on one or more of a predetermination, a knowledge domain of the query request, a level of the query response conflict, the response time requirement of providing composite query responses, extracting the template resolution approach from the query request, etc.

The method continues at step 974 where the processing module obtains comparison parameters associated with the query response conflict. Examples of the obtaining includes extracting from a knowledge base, interpreting a query response, deducing from a pattern associated with the knowledge indicator, extracting from the query request, and utilizing predetermined comparison parameters.

The method continues at step 976 where the processing module performs a comparison of the two or more query responses utilizing the comparison parameters in accordance with the conflict resolution approach to produce conflict resolution guidance. For example, the processing module selects aspects of the two or more query responses to produce a composite query response, where the selection is in accordance with the comparison parameters and topic resolution approach (e.g., prioritizing in a recorder manner, utilizing the weighting factor approach to select based on multiple factors, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 17A:
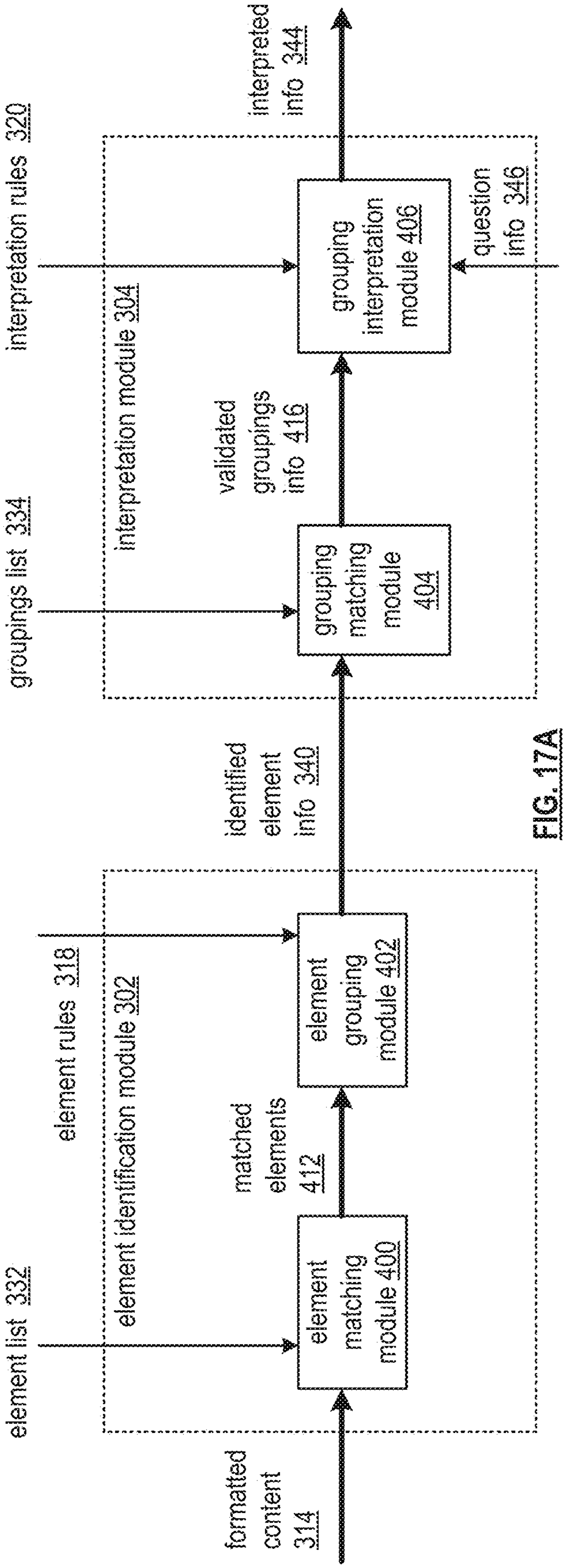
FIG. 17A is a schematic block diagram of another embodiment of a computing system in accordance with the present invention.

FIG. 17A is a schematic block diagram of another embodiment of a computing system that includes the element identification module 302 of FIG. 5E and the interpretation module 304 of FIG. 5E. The element identification module 302 includes the element matching module 400 of FIG. 6A and the element grouping module 402 of FIG. 6A. The interpretation module 304 includes the grouping matching module 404 of FIG. 6A and the grouping interpretation module 406 of FIG. 6A. Generally, an embodiment of the invention presents solutions where the computing system 10 supports interpreting content to produce knowledge.

In an example of operation of the interpreting of the content to produce the knowledge, the element matching module 400 interprets formatted content 314 that includes a phrase of ingested words to produce matched elements 412, where the matched elements 412 includes a word group of a group of known words. The generating includes matching a received element to an element of an element list 332 (e.g., a dictionary), where the element list 332 further includes identification of known words and one or more identigens per word, where an identifier of each identigen is associated with an identifier of each matched element.

The element grouping module 402 analyzes the matched elements 412 in accordance with element rules 318 (e.g., concept identification rules), that further include element word group rules, to produce identified element information 340 when favorable word grouping is associated with the matched elements 412 in accordance with the element rules 318, where the identified element information 340 includes a plurality of equation string permutations (e.g., possible concept interpretations). The analyzing includes comparing matched elements 412 with element word group rules of the element rules 318, extracting possible word group concepts from the element rules 318 (e.g., the equation strings), and identifying the words of the word group and identigens for each word. The concepts include one or more of a starter, a leader, an action, a victim, etc. to form a tree structure. Each branch of the tree structure is a potential interpretation of a concept that maps to each word of the phrase.

The grouping matching module 404 analyzes, from left to right of the phrase, the identified element information 340 (e.g., each equation string) based on entigenic context (e.g., entigenic context includes one or more of the previous sentence information, previous historic matches, source identifier, and interpreting tone, the sarcasm detector, an empathy detector, etc.) in accordance with a groupings list 334. The groupings list 334 includes a list of known valid pairings of adjacent identigens, to identify potentially valid equation strings to produce validated groupings information 416. The validated groupings information 416 includes a short list of possible entigens of the most valid conceptual interpretation of the phrase.

The analyzing includes comparing a groupings aspect of the identified element information 340 (e.g., for each permutation of groups of elements of possible interpretations such as each equation string along a branch of the tree structure) to select a path with a highest viability, utilizing a probability assessment based equation string selection that is most probable, and identification of invalid equation strings (e.g., recursive traversing of an equation string). The analysis includes mapping identigens to candidate entigens and resolving validity based on application of the rules and the entigenic context to indicate which relationship between a group of candidate entigens is most likely valid (e.g., making sense in an interpretation). The analysis further includes generating the validated groupings information 416 to include an identification of potentially valid permutations that align with the groupings list 334 and still further includes eliminating invalid permutations that are inconsistent with conceptual interpretations of the phrase.

The groupings interpretation module 406 interprets the validated groupings information 416 based on question information 346 and in accordance with interpretation rules 320, that includes entigens selection rules based on the knowledge base that links identigen permutations to most likely conceptual interpretations of the phrase, to produce interpreted information 344 (e.g., most likely conceptual interpretation, next likely conceptual interpretation, etc.). The interpreting may be based on the plurality of possible conceptual interpretations inferred from possible pairings of identigens when pruning a plurality of possible conceptual interpretations of the tree structure based on the interpretation rules 320 and in light of other words of the validated groupings information 416 of the word group to produce a most likely conceptual interpretation (e.g., consistent with similar previous conceptual interpretations).

Figure 17B:
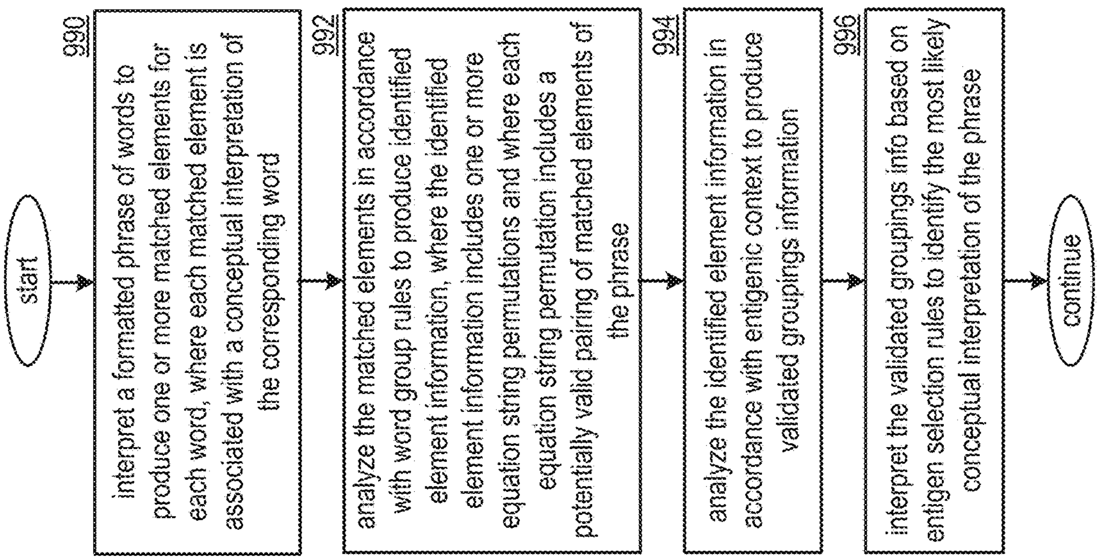
FIG. 17B is a logic diagram of an embodiment of a method for interpreting content to produce knowledge within a computing system in accordance with the present invention.

FIG. 17B is a logic diagram of an embodiment of a method for interpreting content to produce knowledge within a computing system. In particular, a method is presented for use in conjunction with one or more functions and features described in conjunction with FIGS. 1-8D, 17A, and also FIG. 17B. The method includes step 990 where a processing module of one or more processing modules of one or more computing devices of the computing system interprets a formatted phrase of words to produce one or more matched elements for each word, where each matched element is associated with the conceptual interpretation of the corresponding word. The interpreting includes matching a received element to an element of an element list (e.g., a dictionary), where the element list further includes identification of known words and one or more identigens per word, and where the matched element output may also include an associated identifier of each matched element where types of elements includes one or more of a starter, a leader, an action, a victim, an object, the characteristic, a function, etc.

The method continues at step 992 where the processing module analyzes the matched elements in accordance with word group rules to produce identified element information. The identified element information includes one or more equation string permutations where each equation string permutation includes a potentially valid pairing of matched elements of the phrase. The analyzing includes comparing matched elements with the word group rules, extracting possible word group concepts from the element rules (e.g., the equation strings), and identifying the words of the word group and identigens for each word, where the concepts includes one or more of a starter, leader, an action, a victim, to form a tree structure. Each branch of the tree structure is a potential interpretation of a concept that maps to each word of the phrase.

The method continues at step 994 where the processing module analyzes the identified element information in accordance with entigenic context to produce validated groupings information. The analyzing includes comparing a groupings aspect of the identified element information (e.g., for each permutation of groups of elements of possible interpretations where each equation string maps to a branch of a tree structure) to analyze selection of a path with a highest viability.

The analyzing further includes performing a probability assessment to select the equation strings that are most probable and identifying invalid equation strings (e.g., including recursive traversing of the tree structure). The analyzing still further includes mapping identigens to candidate entigens and resolving validity based on application of rules and the entigenic context to indicate which relationships between a group of candidate entigens is most likely valid. The analyzing yet further includes generating the validated groupings information to include and identification of potentially valid permutations that align with a groupings list (e.g., to eliminate invalid permutations that are inconsistent with conceptual interpretations of the phrase).

The method continues at step 996 where the processing module interprets the validated groupings information based on entigens selection rules to identify the most likely conceptual interpretation of the phrase. The interpreting may be based on the plurality of possible conceptual interpretations based on possible pairings of identigens. The processing module prunes a plurality of possible conceptual interpretations of the tree structure based on the interpretation rules in light of other words of the validated groupings information of the word group to produce the most likely conceptual interpretation (e.g., consistent with similar previous conceptual interpretations).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 18A:
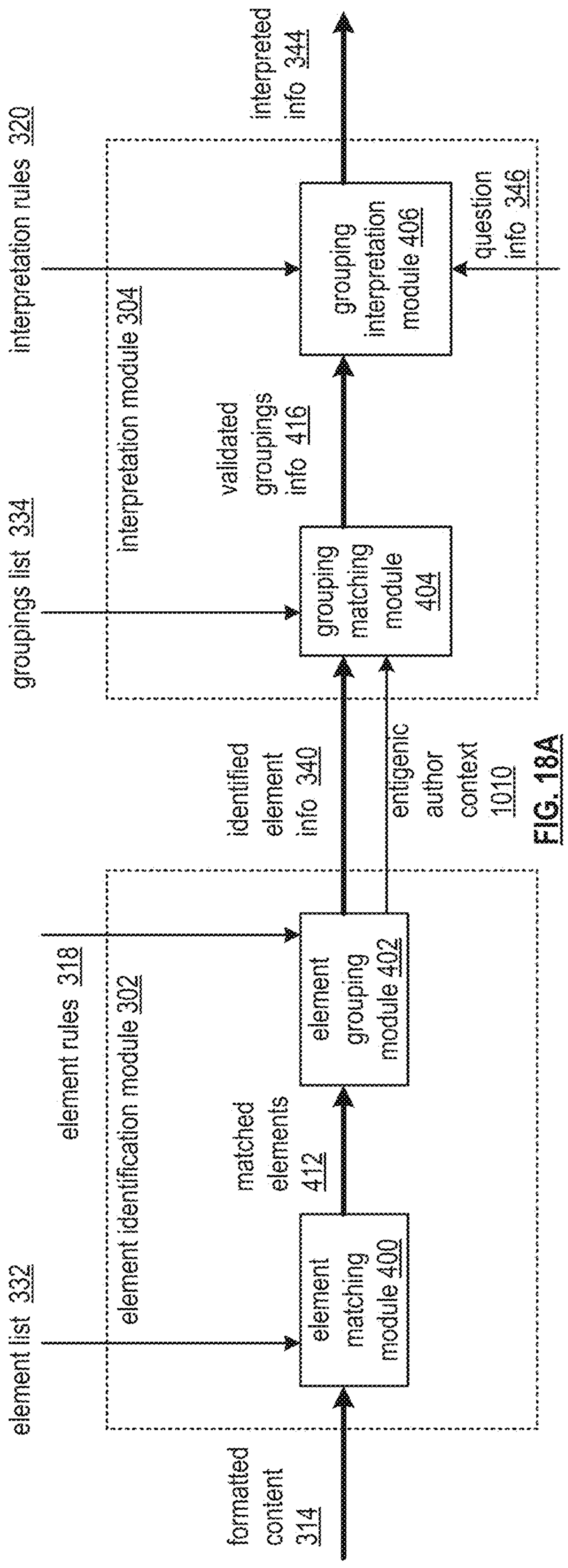
FIG. 18A is a schematic block diagram of another embodiment of a computing system in accordance with the present invention.

FIG. 18A is a schematic block diagram of another embodiment of a computing system that includes the element identification module 302 of FIG. 5E and the interpretation module 304 of FIG. 5E. The element identification module 302 includes the element matching module 400 of FIG. 6A and the element grouping module 402 of FIG. 6A. The interpretation module 304 includes the grouping matching module 404 of FIG. 6A and the grouping interpretation module 406 of FIG. 6A. Generally, an embodiment of the invention presents solutions where the computing system 10 supports interpreting author specific content to produce knowledge.

In an example of operation of the interpreting of the author specific content to produce the knowledge, the element matching module 400 interprets formatted content 314 that includes a phrase of ingested words to produce matched elements 412, where the matched elements 412 includes the word group of a group of known words. The interpreting includes matching a received element to an element of an element list 332 (e.g., a dictionary). The element list 332 further includes identification of known words and one or more identigens per word and/or an associated identifier with each matched element.

The element grouping module 402 analyzes the matched elements 412 in accordance with element rules 318 (e.g., concept identification rules), that further includes element word group rules, to produce identified element information 340 when favorable word groupings are associated with the matched elements 412 in accordance with the element rules 318. The identified element information 340 includes a plurality of equation string permutations (e.g., possible concept interpretations) and further identifies entigenic author context 1010 (e.g., historical use of words and phrases, associated languages and dialects, psychological author profile information, historical experiences associated with the author, and interpretation of tone of the content for the author, etc.).

The analyzing includes comparing matched elements 412 with element word group rules of the element rules 318, and extracting possible word group concepts from the element rules 318. The analyzing further includes identifying the words of the word group and identigens for each word, where the concepts are based on one or more of a starter, a leader, an action, a victim, etc. to form a tree structure. Each branch of the tree structure is a potential interpretation of a concept that maps to each word of the phrase. The analyzing still further includes identifying the entigenic author context based on one or more of interpreting the formatted content 314, interpreting based on the matched elements 412, and extracting the context from one or more of the element list 332 and the element rules 318.

The grouping matching module 404 analyzes, from left to right of the phrase, the identified element information 340 (e.g., each equation string) based on the entigenic author context 1010 and in accordance with a groupings list 334, where the groupings list 334 further includes a list of known valid pairings of adjacent identigens, and identifies potentially valid equation strings to produce validated groupings information 416, where the validated groupings information 416 includes a short list of possible entigens and a most valid conceptual interpretation of the phrase.

The producing includes comparing a groupings aspect of the identified element information 340 (e.g., for each permutation of groups of elements of possible interpretations) to enable selection of a path with the highest viability, performing a probability assessment to select equation strings that are most probable, and identifying invalid equation strings (e.g., recursive traversing of an equation tree). The analysis includes mapping identigens to candidate entigens and resolving validity based on application of the rules and the entigenic author context 1010 to indicate which relationships between a group of candidate entigens is most likely. The analysis further includes generating the validated groupings information 416 to include an identification of potentially valid permutations that align with the groupings list 334.

The grouping interpretation module 406 interprets the validated groupings information 416 based on question information 346 and in accordance with interpretation rules 320, where the interpretation rules 320 further includes entigen selection rules based on the knowledge base that links identigen permutations to most likely conceptual interpretations of the phrase, to produce interpreted information 344 (e.g., most likely conceptual interpretation, next likely conceptual interpretation, etc.). The producing may be based on the plurality of possible conceptual interpretations based on possible pairings of identigens, where the processing module prunes the plurality of possible conceptual interpretations based on the interpretation rules 320 in light of other words of the validated groupings information 416 of the word group to produce a most likely conceptual interpretation that is consistent with similar previous conceptual interpretations.

Figure 18B:
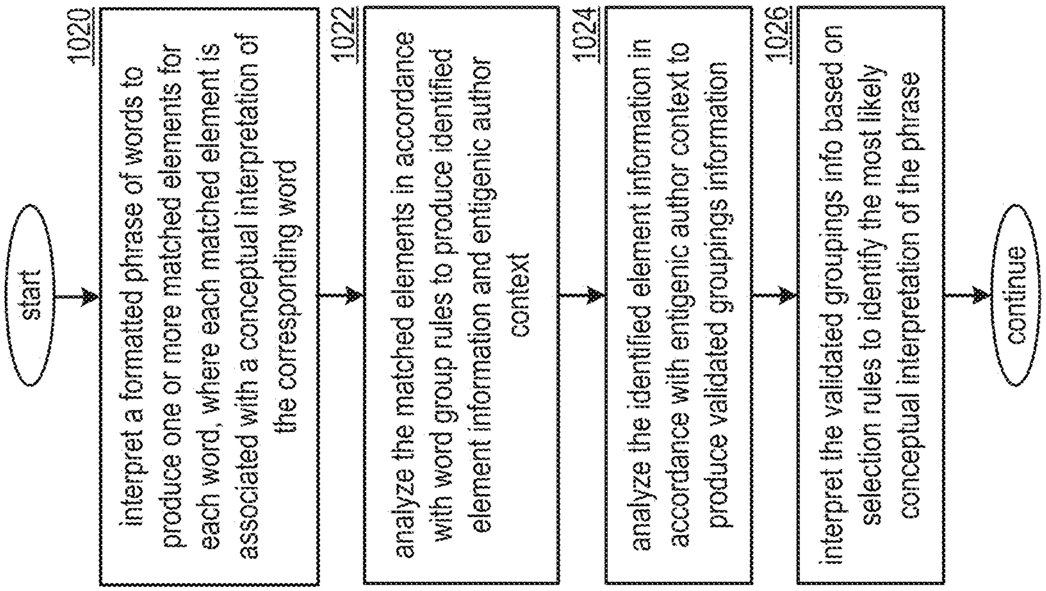
FIG. 18B is a logic diagram of an embodiment of a method for interpreting author specific content to produce knowledge within a computing system in accordance with the present invention.

FIG. 18B is a logic diagram of an embodiment of a method for interpreting author specific content to produce knowledge within a computing system. In particular, a method is presented for use in conjunction with one or more functions and features described in conjunction with FIGS. 1-8D, 18A, and also FIG. 18B. The method includes step 1020 where a processing module of one or more processing modules of one or more computing devices of the computing system interprets a formatted phrase of words to produce one or more matched elements for each word, where each matched element is associated with the conceptual interpretation of the corresponding word. The interpreting includes matching a received element to an element of an element list (e.g., dictionary), where the element list further includes identification of known words and one or more identigens per word, and associating an identifier with each matched element were types of elements includes one or more of a starter, a leader, an action, a victim, an object, a characteristic, and the function.

The method continues at step 1022 where the processing module analyzes the matched elements in accordance with word group rules to produce identified element information and entigenic author context. The identified element information includes one or more equation string permutations, where each equation string permutation includes a potentially valid pairings of matched elements of the phrase by comparing matched elements with the word group rules.

The analyzing includes extracting possible word group concepts from the element rules (e.g., the equation strings), and identifying the words of the word group and identigens for each word. The concepts includes one or more of a starter, a leader, an action, a victim, etc. The analyzing further includes forming a tree structure where each branch of the tree structure is a potential interpretation of a concept that maps to each word of the phrase. The identifying of the entigenic author context is based on one or more of interpreting the formatted content and/or matched elements and extracting the context from one or more of the element list and the element rules.

The method continues at step 1024 where the processing module analyzes the identified element information in accordance with entigenic author context to produce validated groupings information. The analyzing includes comparing a groupings aspect of the identified element information (e.g., for each permutation of groups of elements of possible interpretations where each equation string traverses a branch of the tree structure) to select a path with a highest viability.

The analyzing further includes performing a probability assessment to select an equation string that is most probable and identifying invalid equation strings through a recursive traversing of the tree structure. The analyzing still further includes mapping identigens to candidate entigens and resolving validity based on application of the rules and the entigenic author context to indicate which relationships between a group of candidate entigens is most likely valid. The analyzing also includes generating the validated groupings information to include identification of potentially valid permutations that align with a groupings list to eliminate invalid permutations that are inconsistent with conceptual interpretations of the phrase.

The method continues at step 1026 where the processing module interprets the validated groupings information based on selection rules to identify the most likely conceptual interpretation of the phrase. The interpreting may be based on the plurality of possible conceptual interpretations based on possible pairings of identigens to enable pruning of a plurality of possible conceptual interpretations based on the interpretation rules in light of other words of the validated groupings information of the word group to produce a most likely conceptual interpretation that is consistent with similar previous conceptual interpretations.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:

interpreting, based on curated identigen pairing rules of a knowledge database and uncurated identigen pairing rules of the knowledge database, all pairs of all permutations of sequentially adjacent identigens of adjacent sets of identigens of a multitude of sets of identigens to determine a most likely meaning interpretation of a multitude of words of a phrase of a topic and produce an entigen group comprising a multitude of entigens, wherein the curated identigen pairing rules includes utilization of identifiers of the sequentially adjacent identigens to match against known valid and curated combinations of identifiers of the multitude of entigens and excludes utilization of grammar rules by word type, wherein each identigen of the multitude of sets of identigens includes a meaning identifier, an instance identifier, and a time reference, wherein each meaning identifier associated with a particular set of identigens of the multitude of sets of identigens represents a different meaning of one or more different meanings of a corresponding word of the multitude of words, wherein each time reference provides time information when a corresponding different meaning of the one or more different meanings applies, wherein the knowledge database includes a multitude of entigen groups associated with a multitude of topics, wherein the multitude of topics includes the topic, wherein each entigen group of the multitude of entigen groups includes a corresponding plurality of entigens and one or more entigen relationships between at least some of the corresponding plurality of entigens, wherein the entigen group represents the most likely meaning interpretation of the phrase, wherein each entigen of the entigen group corresponds to a selected identigen of a particular set of identigens having a selected meaning of the one or more different meanings of each word of the multitude of words of the phrase, wherein each entigen of the entigen group represents a single conceivable and perceivable thing in space and time that is independent of language and corresponds to a time reference of the selected identigen associated with the entigen group, wherein the selected identigen affirmatively pairs with at least one corresponding sequentially adjacent identigen of another set of identigens of the multitude of sets of identigens based on the curated identigen pairing rules and the uncurated identigen pairing rules of the knowledge database, wherein the interpreting the sequentially adjacent identigens of the adjacent sets of identigens of the multitude of sets of identigens to determine the most likely meaning interpretation of the multitude of words of the phrase of the topic and produce the entigen group based on the curated identigen pairing rules and the uncurated identigen pairing rules of the knowledge database further includes:

extracting a set of at least two identigens for each word of at least ten words of the phrase of the topic from the knowledge database to produce the multitude of sets of identigens;

identifying two adjacent sets of identigens of the multitude of sets of identigens that correspond to two adjacent words of the phrase that are lacking a curated identigen pairing rule of the knowledge database between any identigen of a first adjacent set of identigens and any identigen of a second adjacent set of identigens of the two adjacent sets of identigens;

determining whether the curated identigen pairing rule that is lacking between the two adjacent sets of identigens can be inferred based on other curated identigen pairing rules associated with other words of the phrase; and when the curated identigen pairing rule that is lacking between the two adjacent sets of identigens can be inferred based on the other curated identigen pairing rules, adding the curated identigen pairing rule to the knowledge database to produce the curated identigen pairing rules of the knowledge database.

2. The method of claim 1 further comprises:

inferring the curated identigen pairing rule that is lacking between the two adjacent sets of identigens based on further curated identigen pairing rules associated with further words of the phrase.

3. The method of claim 1, wherein the determining whether the identigen pairing rule can be inferred for the two adjacent sets of identigens based on the other curated pairing rules associated with the other words of the phrase comprises:

determining whether the knowledge database includes a first curated identigen pairing rule of the other curated identigen pairing rules for a first adjacent word of the two adjacent words and a first other word of the other words of the phrase;

determining whether the knowledge database includes a second curated identigen pairing rule of the other curated identigen pairing rules for a second adjacent word of the two adjacent words and a second other word of the other words of the phrase; and when the knowledge database includes the first curated and second curated identigen pairing rules, indicating that the curated identigen pairing rule can be inferred.

4. The method of claim 1 further comprises:

when the curated identigen pairing rule can not be inferred based on the other curated identigen pairing rules associated with the other words of the phrase:

identifying a set of identigens for each word of another phrase to produce another multitude of sets of identigens, wherein the other phrase includes at least one of the two adjacent words of the phrase;

identifying another curated identigen pairing rule of the knowledge database that includes at least one of the two adjacent sets of identigens that correspond to the two adjacent words of the phrase and another set of identigens of the other multitude of sets of identigens of the other phrase;

determining whether the curated identigen pairing rule can be inferred based on the other curated identigen pairing rule associated with the other phrase; and when the curated identigen pairing rule can be inferred based on the other curated identigen pairing rule, identifying the curated identigen pairing rule for the two adjacent words of the phrase based on the other curated identigen pairing rule associated with the other phrase.

5. The method of claim 4, wherein the determining whether the curated identigen pairing rule can be inferred based on the other curated identigen pairing rule associated with the other phrase comprises:

determining whether the knowledge database includes the other curated identigen pairing rule for the at least one of the two adjacent words and the other set of identigens of the other multitude of sets of identigens of the other phrase; and when the knowledge database includes the other curated identigen pairing rule, indicating that the curated identigen pairing rule can be inferred for the two adjacent words.

6. The method of claim 4 further comprises:

when the curated identigen pairing rule can not be inferred for the two adjacent words based on the other curated identigen pairing rule associated with the other phrase, obtaining yet another phrase, wherein the yet another phrase includes the at least one of the two adjacent words of the phrase.

7. A computing device of a computing system, the computing device comprises:

an interface;

a local memory; and a processing module operably coupled to the interface and the local memory, wherein the processing module functions to:

interpret, based on curated identigen pairing rules of a knowledge database and uncurated identigen pairing rules of the knowledge database, all pairs of all permutations of sequentially adjacent identigens of adjacent sets of identigens of a multitude of sets of identigens to determine a most likely meaning interpretation of a multitude of words of a phrase of a topic and produce an entigen group comprising a multitude of entigens, wherein the curated identigen pairing rules includes utilization of identifiers of the sequentially adjacent identigens to match against known valid and curated combinations of identifiers of the multitude of entigens and excludes utilization of grammar rules by word type, wherein each identigen of the multitude of sets of identigens includes a meaning identifier, an instance identifier, and a time reference, wherein each meaning identifier associated with a particular set of identigens of the multitude of sets of identigens represents a different meaning of one or more different meanings of a corresponding word of the multitude of words, wherein each time reference provides time information when a corresponding different meaning of the one or more different meanings applies, wherein the knowledge database includes a multitude of entigen groups associated with a multitude of topics, wherein the multitude of topics includes the topic, wherein each entigen group of the multitude of entigen groups includes a corresponding plurality of entigens and one or more entigen relationships between at least some of the corresponding plurality of entigens, wherein the entigen group represents the most likely meaning interpretation of the phrase, wherein each entigen of the entigen group corresponds to a selected identigen of a particular set of identigens having a selected meaning of the one or more different meanings of each word of the multitude of words of the phrase, wherein each entigen of the entigen group represents a single conceivable and perceivable thing in space and time that is independent of language and corresponds to a time reference of the selected identigen associated with the entigen group, wherein the selected identigen affirmatively pairs with at least one corresponding sequentially adjacent identigen of another set of identigens of the multitude of sets of identigens based on the curated identigen pairing rules and the uncurated identigen pairing rules of the knowledge database, wherein the processing module interprets the sequentially adjacent identigens of the adjacent sets of identigens of the multitude of sets of identigens to determine the most likely meaning interpretation of the multitude of words of the phrase of the topic and produce the entigen group based on the curated identigen pairing rules and the uncurated identigen pairing rules of the knowledge database further by:

extracting a set of at least two identigens for each word of at least ten words of the phrase of the topic from the knowledge database to produce the multitude of sets of identigens;

identifying two adjacent sets of identigens of the multitude of sets of identigens that correspond to two adjacent words of the phrase that are lacking a curated identigen pairing rule of the knowledge database between any identigen of a first adjacent set of identigens and any identigen of a second adjacent set of identigens of the two adjacent sets of identigens;

determining whether the curated identigen pairing rule that is lacking between the two adjacent sets of identigens can be inferred based on other curated identigen pairing rules associated with other words of the phrase; and when the curated identigen pairing rule that is lacking between the two adjacent sets of identigens can be inferred based on the other curated identigen pairing rules, adding the curated identigen pairing rule to the knowledge database to produce the curated identigen pairing rules of the knowledge database.

8. The computing device of claim 7, wherein the processing module further functions to:

infer the curated identigen pairing rule that is lacking between the two adjacent sets of identigens based on further curated identigen pairing rules associated with further words of the phrase.

9. The computing device of claim 7, wherein the processing module functions to determine whether the identigen pairing rule can be inferred for the two adjacent sets of identigens based on the other curated pairing rules associated with the other words of the phrase by:

determining whether the knowledge database includes a first curated identigen pairing rule of the other curated identigen pairing rules for a first adjacent word of the two adjacent words and a first other word of the other words of the phrase;

determining whether the knowledge database includes a second curated identigen pairing rule of the other curated identigen pairing rules for a second adjacent word of the two adjacent words and a second other word of the other words of the phrase; and when the knowledge database includes the first curated and second curated identigen pairing rules, indicating that the curated identigen pairing rule can be inferred.

10. The computing device of claim 7, wherein the processing module further functions to:

when the curated identigen pairing rule can not be inferred based on the other curated identigen pairing rules associated with the other words of the phrase:

identify a set of identigens for each word of another phrase to produce another multitude of sets of identigens, wherein the other phrase includes at least one of the two adjacent words of the phrase;

identify another curated identigen pairing rule of the knowledge database that includes at least one of the two adjacent sets of identigens that correspond to the two adjacent words of the phrase and another set of identigens of the other multitude of sets of identigens of the other phrase;

determine whether the curated identigen pairing rule can be inferred based on the other curated identigen pairing rule associated with the other phrase; and when the curated identigen pairing rule can be inferred based on the other curated identigen pairing rule, identify the curated identigen pairing rule for the two adjacent words of the phrase based on the other curated identigen pairing rule associated with the other phrase.

11. The computing device of claim 10, wherein the processing module functions to determine whether the curated identigen pairing rule can be inferred based on the other curated identigen pairing rule associated with the other phrase by:

determining whether the knowledge database includes the other curated identigen pairing rule for the at least one of the two adjacent words and the other set of identigens of the other multitude of sets of identigens of the other phrase; and when the knowledge database includes the other curated identigen pairing rule, indicating that the curated identigen pairing rule can be inferred for the two adjacent words.

12. The computing device of claim 10, wherein the processing module further functions to:

when the curated identigen pairing rule can not be inferred for the two adjacent words based on the other curated identigen pairing rule associated with the other phrase, obtain yet another phrase, wherein the yet another phrase includes the at least one of the two adjacent words of the phrase.

13. A non-transitory computer readable memory comprises:

a first memory element that stores operational instructions that, when executed by a processing module, causes the processing module to:

interpret, based on curated identigen pairing rules of a knowledge database and uncurated identigen pairing rules of the knowledge database, all pairs of all permutations of sequentially adjacent identigens of adjacent sets of identigens of a multitude of sets of identigens to determine a most likely meaning interpretation of a multitude of words of a phrase of a topic and produce an entigen group comprising a multitude of entigens, wherein the curated identigen pairing rules includes utilization of identifiers of the sequentially adjacent identigens to match against known valid and curated combinations of identifiers of the multitude of entigens and excludes utilization of grammar rules by word type, wherein each identigen of the multitude of sets of identigens includes a meaning identifier, an instance identifier, and a time reference, wherein each meaning identifier associated with a particular set of identigens of the multitude of sets of identigens represents a different meaning of one or more different meanings of a corresponding word of the multitude of words, wherein each time reference provides time information when a corresponding different meaning of the one or more different meanings applies, wherein the knowledge database includes a multitude of entigen groups associated with a multitude of topics, wherein the multitude of topics includes the topic, wherein each entigen group of the multitude of entigen groups includes a corresponding plurality of entigens and one or more entigen relationships between at least some of the corresponding plurality of entigens, wherein the entigen group represents the most likely meaning interpretation of the phrase, wherein each entigen of the entigen group corresponds to a selected identigen of a particular set of identigens having a selected meaning of the one or more different meanings of each word of the multitude of words of the phrase, wherein each entigen of the entigen group represents a single conceivable and perceivable thing in space and time that is independent of language and corresponds to a time reference of the selected identigen associated with the entigen group, wherein the selected identigen affirmatively pairs with at least one corresponding sequentially adjacent identigen of another set of identigens of the multitude of sets of identigens based on the curated identigen pairing rules and the uncurated identigen pairing rules of the knowledge database, wherein the processing module interprets the sequentially adjacent identigens of the adjacent sets of identigens of the multitude of sets of identigens to determine the most likely meaning interpretation of the multitude of words of the phrase of the topic and produce the entigen group based on the curated identigen pairing rules and the uncurated identigen pairing rules of the knowledge database further by:

extracting a set of at least two identigens for each word of at least ten words of the phrase of the topic from the knowledge database to produce the multitude of sets of identigens;

a second memory element that stores operational instructions that, when executed by the processing module, causes the processing module to further function to interpret the sequentially adjacent identigens of the adjacent sets of identigens of the multitude of sets of identigens to determine the most likely meaning interpretation of the multitude of words of the phrase of the topic and produce the entigen group based on the curated identigen pairing rules and the uncurated identigen pairing rules of the knowledge database by:

identifying two adjacent sets of identigens of the multitude of sets of identigens that correspond to two adjacent words of the phrase that are lacking a curated identigen pairing rule of the knowledge database between any identigen of a first adjacent set of identigens and any identigen of a second adjacent set of identigens of the two adjacent sets of identigens;

a third memory element that stores operational instructions that, when executed by the processing module, causes the processing module to further function to interpret the sequentially adjacent identigens of the adjacent sets of identigens of the multitude of sets of identigens to determine the most likely meaning interpretation of the multitude of words of the phrase of the topic and produce the entigen group based on the curated identigen pairing rules and the uncurated identigen pairing rules of the knowledge database by:

determining whether the curated identigen pairing rule that is lacking between the two adjacent sets of identigens can be inferred based on other curated identigen pairing rules associated with other words of the phrase; and a fourth memory element that stores operational instructions that, when executed by the processing module, causes the processing module to further function to interpret the sequentially adjacent identigens of the adjacent sets of identigens of the multitude of sets of identigens to determine the most likely meaning interpretation of the multitude of words of the phrase of the topic and produce the entigen group based on the curated identigen pairing rules and the uncurated identigen pairing rules of the knowledge database by:

when the curated identigen pairing rule that is lacking between the two adjacent sets of identigens can be inferred based on the other curated identigen pairing rules, adding the curated identigen pairing rule to the knowledge database to produce the curated identigen pairing rules of the knowledge database.

14. The non-transitory computer readable memory of claim 13 further comprises:

a fifth memory element that stores operational instructions that, when executed by the processing module, causes the processing module to:

infer the curated identigen pairing rule that is lacking between the two adjacent sets of identigens based on further curated identigen pairing rules associated with further words of the phrase.

15. The non-transitory computer readable memory of claim 13, wherein the processing module functions to execute the operational instructions stored by the third memory element to cause the processing module to determine whether the identigen pairing rule can be inferred for the two adjacent sets of identigens based on the other curated pairing rules associated with the other words of the phrase by:

determining whether the knowledge database includes a first curated identigen pairing rule of the other curated identigen pairing rules for a first adjacent word of the two adjacent words and a first other word of the other words of the phrase;

determining whether the knowledge database includes a second curated identigen pairing rule of the other curated identigen pairing rules for a second adjacent word of the two adjacent words and a second other word of the other words of the phrase; and when the knowledge database includes the first curated and second curated identigen pairing rules, indicating that the curated identigen pairing rule can be inferred.

16. The non-transitory computer readable memory of claim 13 further comprises:

the third memory element further stores operational instructions that, when executed by the processing module causes the processing module to:

when the curated identigen pairing rule can not be inferred based on the other curated identigen pairing rules associated with the other words of the phrase:

identify a set of identigens for each word of another phrase to produce another multitude of sets of identigens, wherein the other phrase includes at least one of the two adjacent words of the phrase;

identify another curated identigen pairing rule of the knowledge database that includes at least one of the two adjacent sets of identigens that correspond to the two adjacent words of the phrase and another set of identigens of the other multitude of sets of identigens of the other phrase;

determine whether the curated identigen pairing rule can be inferred based on the other curated identigen pairing rule associated with the other phrase; and when the curated identigen pairing rule can be inferred based on the other curated identigen pairing rule, identify the curated identigen pairing rule for the two adjacent words of the phrase based on the other curated identigen pairing rule associated with the other phrase.

17. The non-transitory computer readable memory of claim 16, wherein the processing module functions to execute the operational instructions stored by the third memory element to cause the processing module to determine whether the curated identigen pairing rule can be inferred based on the other curated identigen pairing rule associated with the other phrase by:

determining whether the knowledge database includes the other curated identigen pairing rule for the at least one of the two adjacent words and the other set of identigens of the other multitude of sets of identigens of the other phrase; and when the knowledge database includes the other curated identigen pairing rule, indicating that the curated identigen pairing rule can be inferred for the two adjacent words.

18. The non-transitory computer readable memory of claim 16 further comprises:

the third memory element further stores operational instructions that, when executed by the processing module causes the processing module to:

when the curated identigen pairing rule can not be inferred for the two adjacent words based on the other curated identigen pairing rule associated with the other phrase, obtain yet another phrase, wherein the yet another phrase includes the at least one of the two adjacent words of the phrase.

* * * * *